(12) United States Patent
Tanaka et al.

(10) Patent No.: US 6,434,333 B2
(45) Date of Patent: *Aug. 13, 2002

(54) DRIVING MECHANISM USING SHAPE-MEMORY ALLOY

(75) Inventors: Yoshiharu Tanaka, Kawachinagano; Junichi Tanii, Izumi; Shoichi Minato, Sakai, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,676

(22) Filed: Apr. 29, 1998

(30) Foreign Application Priority Data

| May 1, 1997 | (JP) | ............................................... 9-113804 |
| May 8, 1997 | (JP) | ............................................... 9-118177 |
| May 8, 1997 | (JP) | ............................................... 9-118178 |
| Mar. 19, 1998 | (JP) | ........................................... 10-069667 |

(51) Int. Cl.[7] ................................................. G03B 3/10
(52) U.S. Cl. ...................................... 396/132; 396/418
(58) Field of Search ............................ 396/72, 85, 86, 396/87, 89, 133, 439, 418, 387, 411, 132

(56) References Cited

U.S. PATENT DOCUMENTS

| 4,664,493 | A | * | 5/1987 | Takagi ........................ 396/452 |
| 4,860,040 | A | * | 8/1989 | Tamamura et al. ........... 396/89 |
| 4,932,210 | A | * | 6/1990 | Julien et al. ................... 60/527 |
| 5,185,621 | A | * | 2/1993 | Kagechika ................... 396/443 |
| 5,459,544 | A | * | 10/1995 | Emura ......................... 396/257 |
| 5,628,041 | A | * | 5/1997 | Ezawa ......................... 396/418 |

FOREIGN PATENT DOCUMENTS

JP            1-287648           11/1989

* cited by examiner

*Primary Examiner*—David M. Gray
(74) *Attorney, Agent, or Firm*—Sidley Austin Brown & Wood LLP

(57) ABSTRACT

A driving mechanism is disclosed that utilizes a shape-memory alloy. In particular, mechanical components are movably positioned by a member composed of shape-memory alloy, which changes shape when heated. The present invention reduces the number of mechanical components in a driving mechanism, thereby reducing size and improving performance. One of many applications of the present invention is a camera application.

33 Claims, 41 Drawing Sheets

Fig. 28
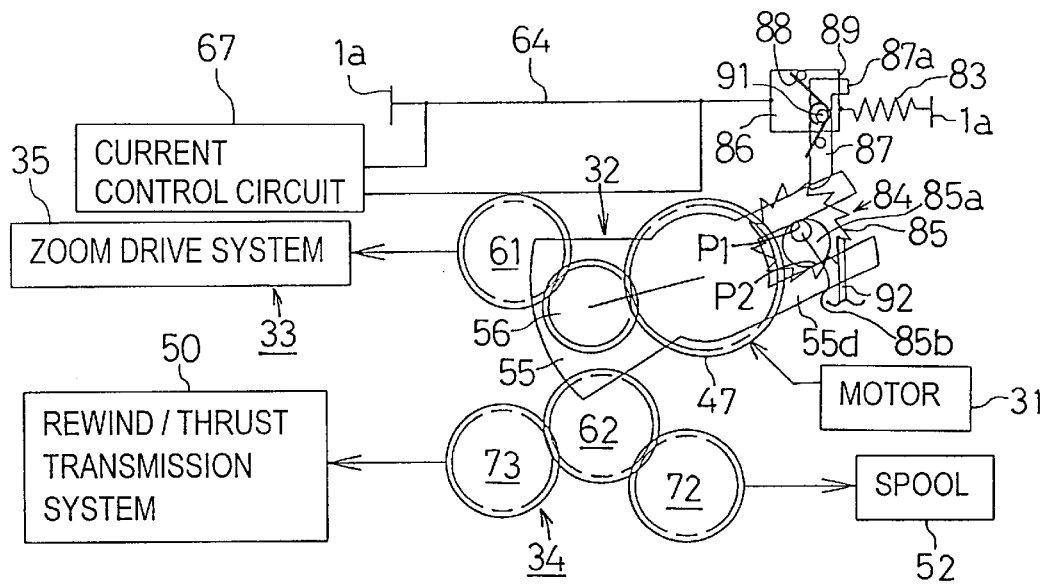
Fig. 29B
Fig. 29A
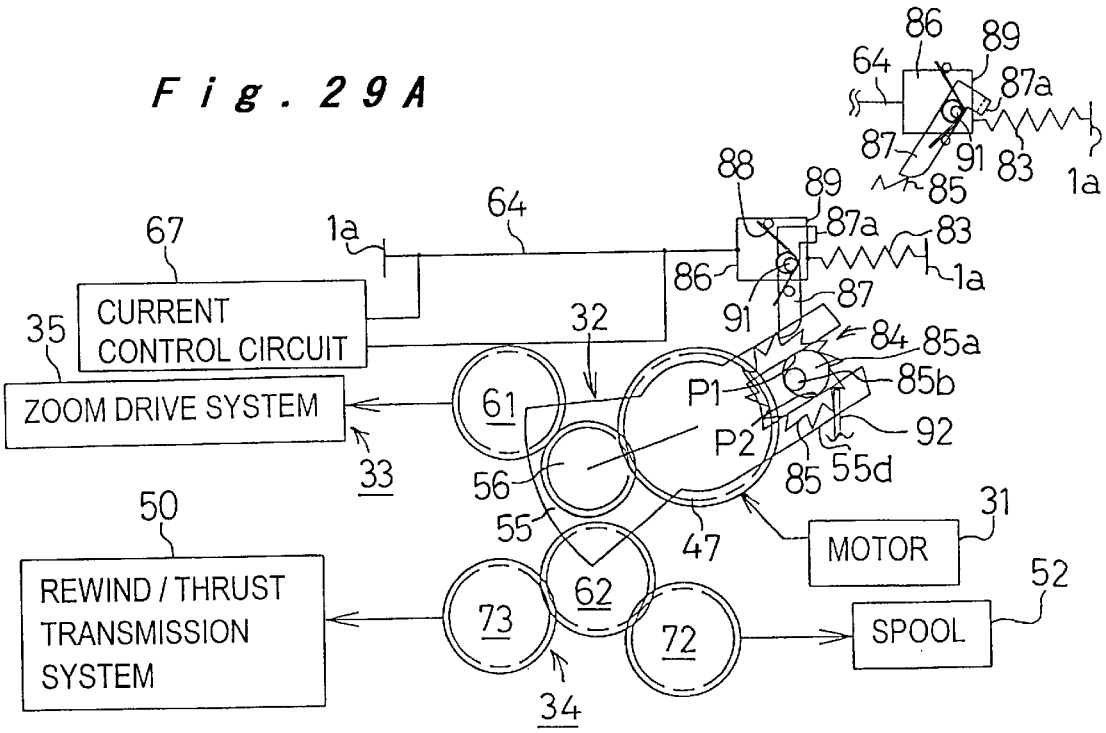

DRIVING MECHANISM USING SHAPE-MEMORY ALLOY

BACKGROUND OF THE INVENTION

1. Technical Field of the Invention

This application is based on applications Nos. 9-113804, 9-118177, 9-118178, and 10-69667, filed in Japan, the contents of which are hereby incorporated by reference.

The present invention relates to a driving mechanism, and particularly to a driving mechanism which utilizes changes in the shape of a shape-memory alloy for various mechanical actions.

2. Description of Related Art

There are many different kinds of mechanical actions, and driving mechanisms for these actions are respectively designed in accordance with different purposes. However, while various appliances are desired to be multifunctional and high speed, demands which are contradictory to each other and thus difficult to accomplish, such as minimization, higher precision, quietness of the actions, have been increased. Taking cameras as the example, some of the conventional driving mechanisms as well as their problems will be hereinafter described.

A built-in pop-up flash of a camera is constructed as shown in FIG. 1, in which a flash 102 is urged upwardly by a spring 104 but is normally retained in a housed position (initial position) by a lever 111 against the force of the spring 104. The lever 111 is urged by a spring 113 to remain in a locking position, and when the lever 111 is released from this state, the flash 102 is popped up by the force of the spring 104. Such release is made either manually with an operative member or automatically in accordance with automatic measurement of light.

FIG. 2 shows a sequence of actions in the flash pop-up mode in which the case using a plunger 113 shown in FIG. 1 is taken as an example. First, an electric current is applied to the electromagnetic plunger 117, by which the lever 111 releases a hold of the flash 102, which is freed and popped up by the urging force of the spring 104 from the housed position shown in FIG. 1A to a state shown in FIG. 1B. At the same time a switch 119 is turned off, and the application of the electric current to the electromagnetic plunger 117 is ended by this switch-off signal, whereby the camera is set to a standby mode. When the electricity to the electromagnetic plunger 117 is shut off, the lever 111 is freed and returned to the locking position by the urging force of the spring 113 as shown in FIG. 1C so as to prepare for the next locking action when the flash 102 is housed again. In this example, the flash 102 is housed by pushing it in by a hand.

In such a construction, however, the camera cannot be further minimized in dimensions since the plunger has a large volume and needs to be disposed on an upper part of the camera. It is possible to provide a motor instead of the plunger to allow the lock of the flash to be released by a rotational force of the motor. However, such provision of the motor specially for the lock releasing action would be also disadvantageous for minimization of the camera. The necessity of providing an additional motor may be obviated by using a part of rotation of a motor for charging shutter, but in that case it will be further necessary to provide a linking mechanism and a drive force switchover mechanism and the like between the two, leading to an increase in number of components as well as causing the structure to be complicated, thus ending up to be disadvantageous for minimization of the mechanism and reduction of cost.

A second example of driving mechanism is designed for a film feeding system and a zooming system of cameras, which are driven by a drive force switched over from a single motor and transmitted to either of them depending on needs. Such driving mechanism allows a multifunctional camera to have fewer number of motors.

In the zooming system, a lens tube is driven tele- and wide-scopically, instantly responding to operations by a user.

In the film feeding system, for example, in the case of an advanced photo system camera, since the film is pushed out from a cartridge or rewound into the cartridge, a fork shaft which is engaged with a cartridge spool needs to be rotated in both regular and reverse directions. A take-up spool inside the camera also needs to be rotated in a film take-up direction for a so-called thrust drive when the fork is rotated in a direction to push out the film from the cartridge. For satisfying these demands, rewinding of the film is achieved by the rotation of the motor in one direction, and the thrust drive and spool take-up drive are achieved by the rotation in the reverse direction in an ordinary mechanism.

In such a case, it is necessary to switch over the rotation of the motor in normal and reverse directions to the zooming system and the film feeding system. A switchover means which the applicant of the present invention has previously proposed as disclosed in Japanese Published Unexamined Patent Application No. 1-287648 employs a friction planet gear mechanism. As the transmission is changed over from one to another by the rotation of motor in either one of directions in this mechanism, it is necessary to lock the planet gear so as to prevent the transmission from being changed over when transmitting a drive force and to release the lock of the planet gear when changeover of transmission is required. Such locking and releasing may be achieved using actions of an electromagnetic plunger. However, as a plunger takes up a lot of space, its usage is limited within a compact camera. Also, it is necessary to supply electricity to two loads at the same time since the changeover of the planet gear is performed such that an electric current is applied to the motor while electricity is also applied to the plunger. This increases the load on a battery, and the capacity of motor will have to be reduced, which will result in decrease in driving speed.

For focusing lenses in cameras, it is required to move a focusing lens to a predetermined position and stop it there in accordance with the distance to an object to be photographed. Also, for driving a zooming action of a flash, it is required to move a reflector umbrella to a prescribed position and stop it there in accordance with a zooming action of a photographing lens. Each are generally driven by a motor which is supplied with electricity from a battery. The motor is electrically controlled according to position detecting signals from a position detector which judges whether a driven member is located at the prescribed position, whereby the driven member is moved to a desired position and stopped there.

However, the motor has a large volume and requires a gear or the like for transmitting the rotation thereof to the driven member, and may further require a motion converting mechanism for converting rotation into a linear movement in case the movement of the driven member is reciprocating motion of one dimension. It is possible to employ another driving mechanism cooperatively with the motor to avoid increase in volume, in which case the construction will be any way complicated because a drive switchover mechanism and a transmission mechanism are necessary.

Further, when a motor or a gear is employed, since motors emit vibration sounds and gears emit noises generated by toothed gears meshing with each other, they are unsuitable for use under a quiet circumstance. Also, in the case of using gears, position control of the driven member will be more difficult due to backlash that is specific to a gear transmission system. It is especially disadvantageous for driving reciprocating motions such as when zooming tele- or widescopically.

These problems are not limited to cameras but commonly found in other driving mechanisms under similar circumstances for various purposes.

BRIEF SUMMARY OF THE INVENTION

In view of the foregoing, it is a primary object of the present invention to provide a driving mechanism which is capable of favorable drive in accordance with various demands as described above utilizing a shape change stroke of a shape-memory alloy back to its memorized shape.

The above said object is addressed by one aspect of the present invention which provides a novel driving mechanism including a driven member biased toward one direction from an initial position, a locking mechanism for retaining the driven member at the initial position against a biasing force, a shape-memory alloy of which transformation into a memorized shape by electric heating is used for lock release operation for releasing the lock by the locking mechanism, and a controller by which electric heating of the shape-memory alloy for releasing the lock is completed after a predetermined period of time has passed since the start of electricity supply.

To accomplish the said object, a driving mechanism for driving a plurality of driven members selectively according to another aspect of the present invention comprises a first driving power source which is a motor, a second driving power source which is a shape-memory alloy, a transmission changeover mechanism for selectively transmitting a drive force from the first driving power source to a specific one of the plurality of driven members, wherein the transmission changeover mechanism performs a transmission changeover action by utilizing a shape change of the second driving power source.

A driving mechanism according to yet another aspect of the present invention comprises a driven member, a shape-memory alloy having a predetermined memorized shape, a driver for driving the driven member utilizing transformation of the shape-memory alloy, a sensor for detecting displacement of the driven member, and a controller for controlling the driver based on data from the sensor which detects displacement of the driven member.

Other and further objects, features and advantages of the invention will appear more fully from the following description.

BRIEF DESCRIPTION OF THE DRAWINGS

FIG. 28 is a plan view showing a transmission changeover state of a transmission changeover mechanism in a driving mechanism of an eighth example in which the zoom drive system is selected;

FIGS. 29A and 29B are plan views showing a state of the transmission changeover mechanism of the driving mechanism of FIG. 28 in which changeover has started from a state wherein the zoom drive system is selected to a state wherein the film feed system is selected, respectively illustrating a state of feeding a ratchet toothed wheel by supplying electricity to the shape-memory alloy and a state of returning the ratchet toothed wheel by shutting off electricity to the shape-memory alloy;

DETAILED DESCRIPTION OF THE PREFERRED EMBODIMENTS

Preferred embodiments of the present invention will be hereinafter described in conjunction with the accompanying drawings.

(First Embodiment)

Figure 1A:
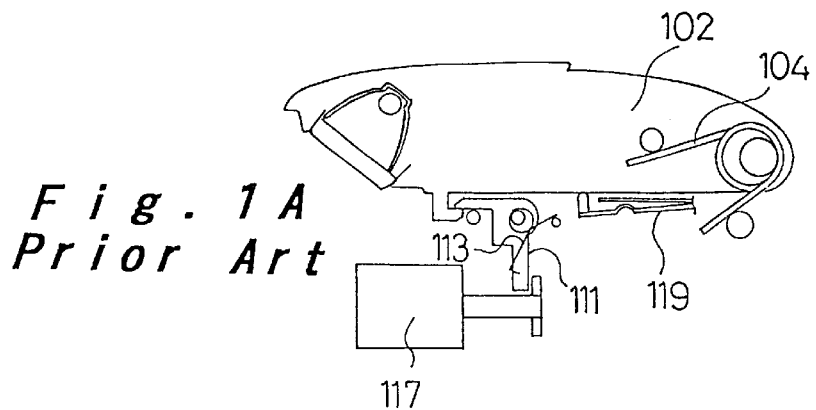
FIGS. 1A–1C are cross-sectional views illustrating states of a conventional flash section in action including a lock release mechanism, in which 1A shows a state where the flash is housed, 1B shows a state when the lock is released and the flash is popped up, and 1C shows a state where a locking lever is returned to its initial position after the lock release.
Figure 1B:
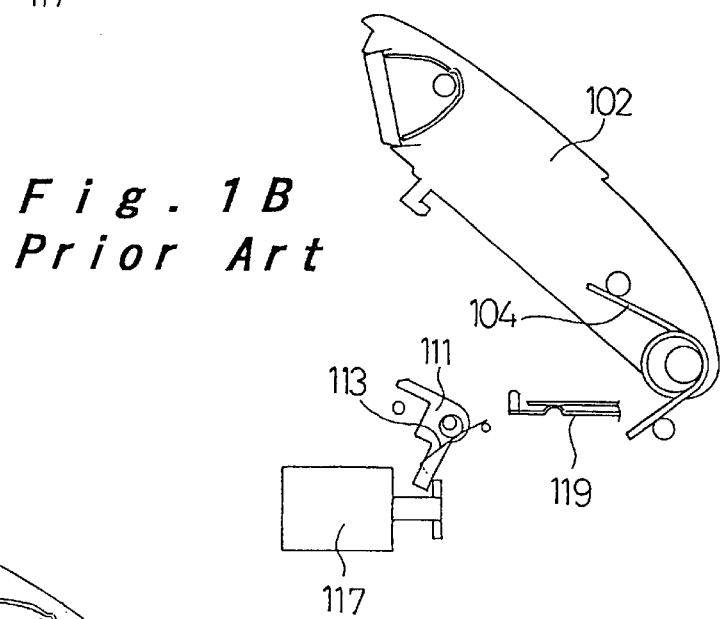
Figure 1C:
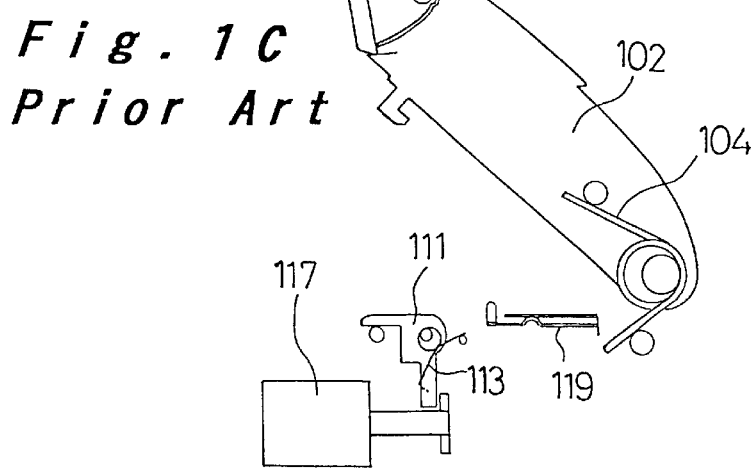
Figure 2:
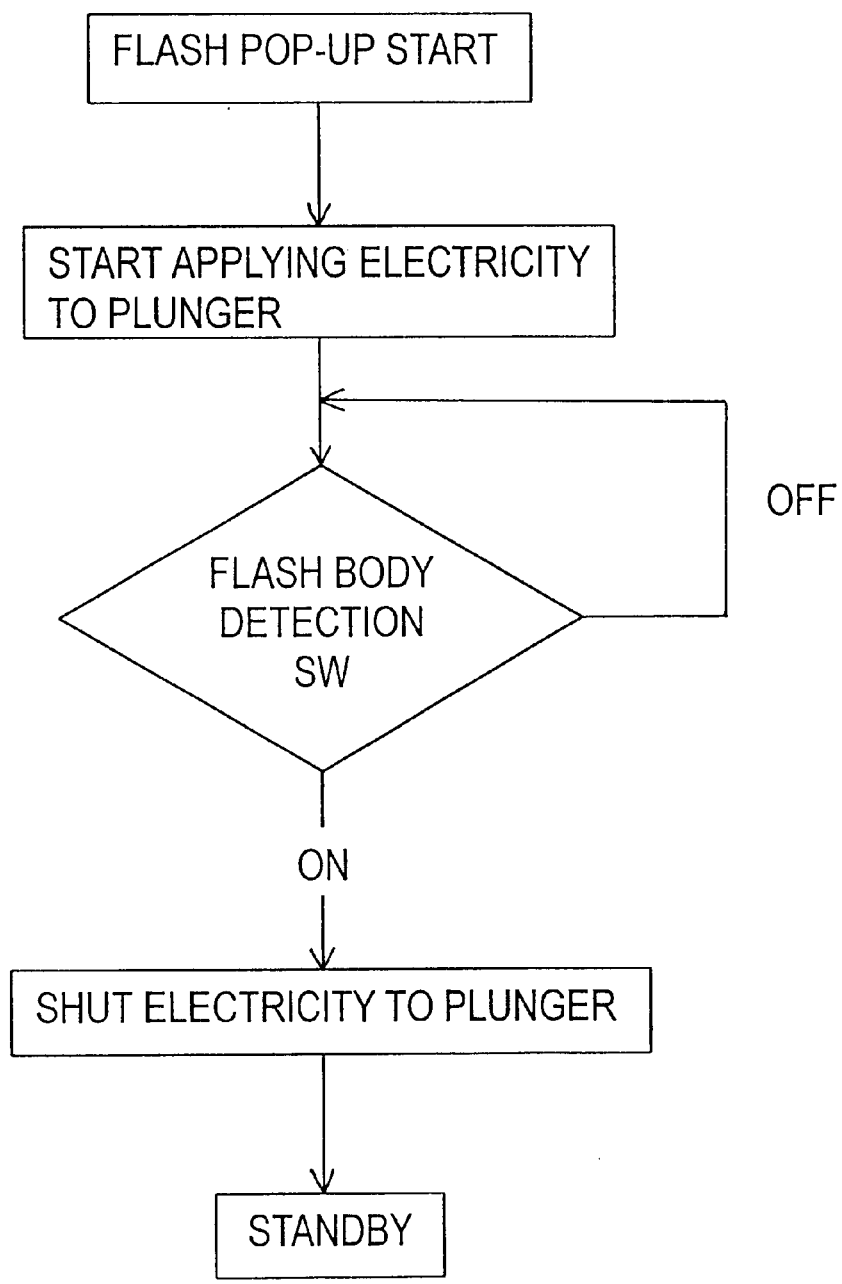
FIG. 2 is a flowchart of a sequence of actions for releasing the lock of the flash in FIG. 1.
Figures 3A, 3B, 3C:
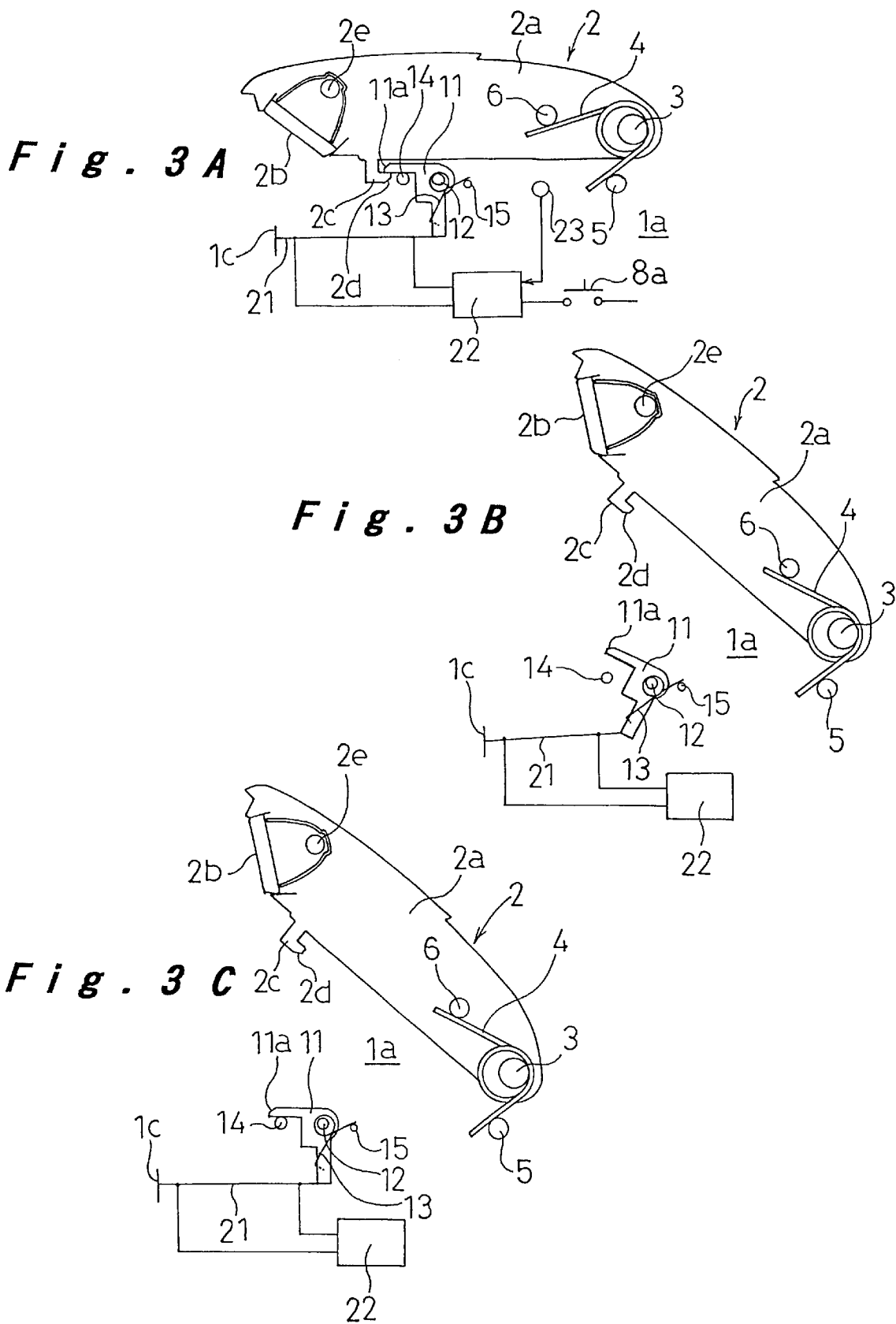
FIGS. 3A–3C are cross-sectional views illustrating states of a flash section in action including a lock release mechanism according to one embodiment of the present invention, in which 3A shows a state where the flash is housed, 3B shows a state when the lock is released and the flash is popped up, and 3C shows a state where a locking lever is returned to its initial position after the lock release.
Figure 4:
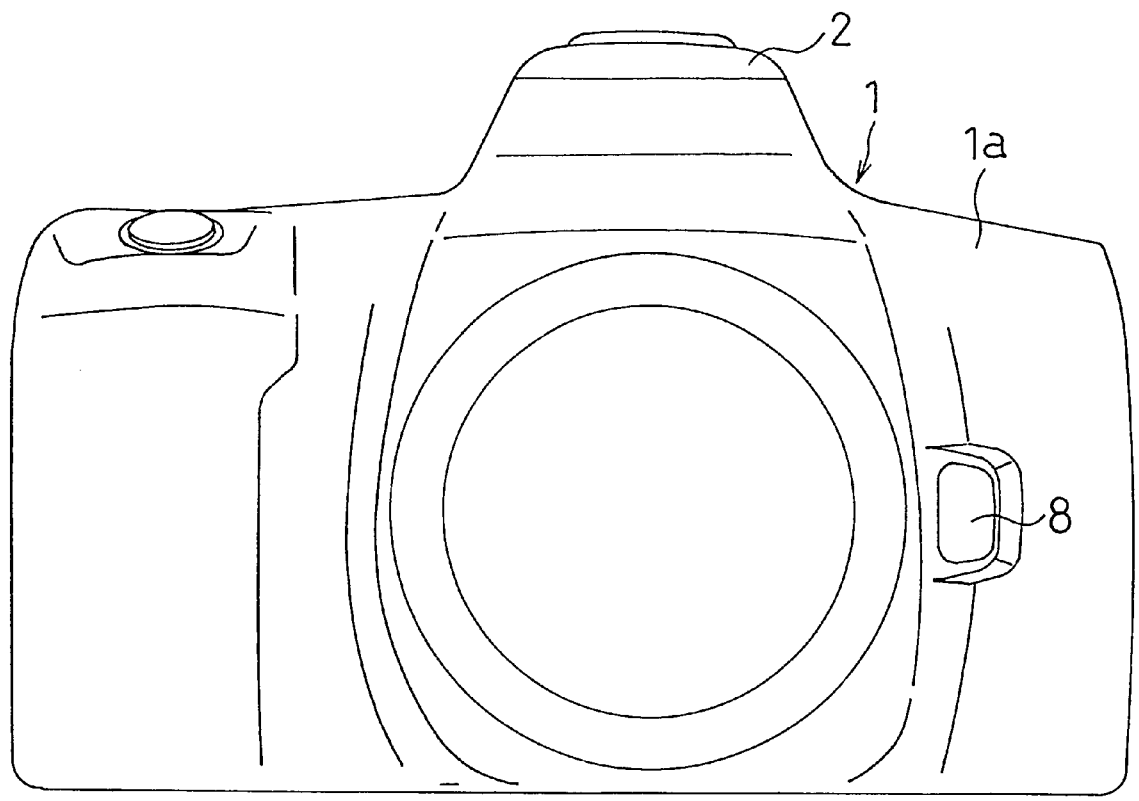
FIG. 4 is a front view of a camera having the flash section of FIG. 3 in a state where the flash is housed in the camera.
Figure 5:
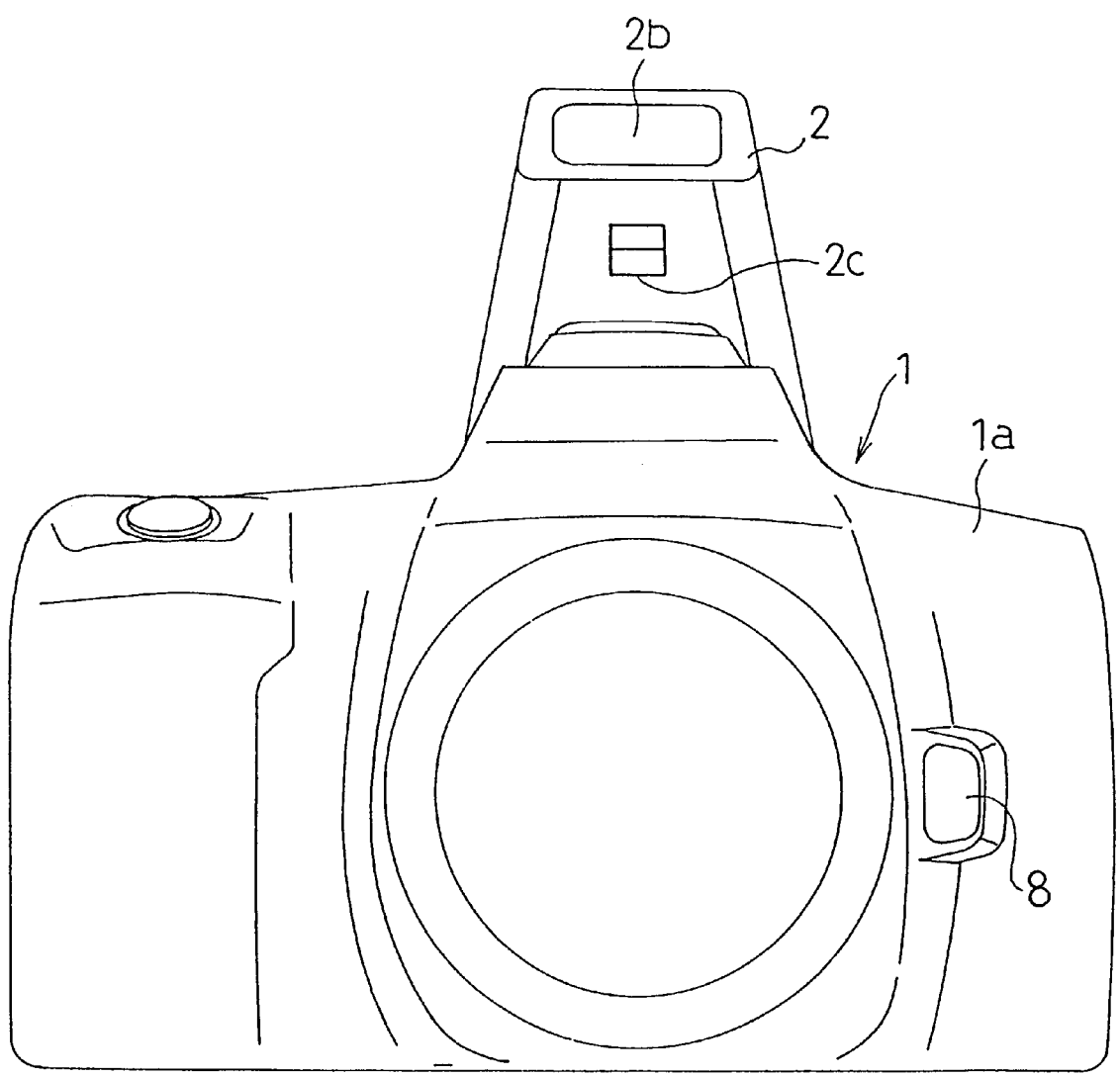
FIG. 5 is a front view of a camera having the flash section of FIG. 3 in a state where the flash is popped out from the camera.

FIGS. 3A–3C to FIG. 6 show a first embodiment of the resent invention, in which an object to be driven is an electronic flash 2 incorporated in a camera 1 as shown in FIG. 4 and FIG. 5. A main body 2a of the flash 2 is supported to a camera body 1a around a shaft 3 so that it can rotate between a housed position shown in FIG. 3A and a popped-up position shown in FIGS. 3B, 3C, and FIG. 5, and is urged by a spring 4 in one direction from its housed position as an initial position towards the popped-up position. The spring 4 is mounted such as to surround the shaft 3 and applied between a shaft 5 on the camera body 1a and a shaft 6 on the flash main body 2a. It is of course possible to variously modify the style of movement of the flash 2 and its supporting structure, as well as the type of spring 4 and the way of its application.

The flash 2 has a luminous panel 2b at its distal end facing to the front side in the popped-up state, as shown in FIGS. 3B, 3C, and FIG. 5, through which light is emitted from a light source 2e in synchronism with shutter release. Light adjustment control may be further performed in accordance with measurement of light or distance depending on cases.

On the front side of the flash main body 2a is a hook-like catching piece 2c, which is for example integrally formed thereon, to be coupled with a locking lever 11 on the camera body 1a side for retaining the flash 2 in its housed position. The locking lever 11 in this embodiment is a bell crank type supported on the camera body 1a around a shaft 12, but any other appropriate configurations may be employed in accordance with the size or shape of an available inner space of the camera body 1a. The locking lever 11 is mounted around the shaft 12 and urged by a spring 13, which is inserted to act between the locking lever 11 and a shaft 15 in an upper part of the camera body 1a, to stay in its locking position shown in FIGS. 3A and 3C. By this arrangement, at the last stage of pressing the flash 2 by a hand from the popped-up position to the housed position, when the catching piece 2c comes into contact with an end of the locking lever 11, they slide with each other by their respective sliding surfaces 11a and 2d which are rounded or inclined, so that the locking lever 11 is pushed against the force of the spring 13 from the locking position shown in FIG. 3A toward the lock release side shown in FIG. 3B before the flash 2 reaches its housed position. When the flash 2 comes to the housed position, the catching piece 2c is released from the end of the locking lever 11, by which the freed locking lever 11 returns to its locking position by the force of the spring 13, where it couples with the caching piece 2c of the flash main body 2a which is now housed, so as to hold the flash 2 in its housed position shown in FIG. 3A. The locking position of the locking lever 11 is restricted by a stopper 14.

A shape-memory alloy 21 in a linear form is employed as an actuator for an automatic lock release operation of the locking lever 11. One end of the shape-memory alloy 21 is connected to the proximal end of the locking lever 11, whereas the other end is connected to a fixed portion 1c of the camera body 1a such as would keep a tense state between both ends. Electric power supply to the shape-memory alloy 21 is controlled with an electric current control circuit 22, and when an electric current is applied to the shape-memory alloy 21, it heats itself to a higher temperature to change into a memorized shape. In this first embodiment, the shape-memory alloy 21 shrinks and changes from the stretched state shown in FIG. 3A to be the contracted form shown in FIG. 3B which is the memorized shape. Due to this shape change, the shape-memory alloy 21 pulls the proximal end of the locking lever 11 toward the fixed portion 1c side, causing the locking lever 11 to rotate in a clockwise direction in FIGS. 3A–3C to be released from the catching piece 2c. The lock of the flash 2 at its housed position is thereby released, and the flash 2 pops up by the force of the spring 4 to be in its popped-up position shown in FIG. 3B.

When the electric current supply is shut off, the shape-memory alloy 21 stops generating heat, and when its temperature lowers, the retaining force for remaining in the memorized shape also decreases, so it returns to its stretched form by the force of the spring 13 so as to cause the locking lever 11 to return to its locking position shown in FIG. 3C and stand by the next time when the flash 2 is housed. Normally, it requires a longer time for the temperature to fall, and thus the shape-memory alloy 21 returns to the initial shape at a quite low rate as compared to the speed of its transformation into the contracted form. However, the flash 2 is not housed again immediately after it is popped up in most cases, so it hardly happens that the flash 2 cannot be locked when it is housed again under normal uses. There will be less limitation depending on selection of materials of the shape-memory alloy 21 or on development of new materials in future.

The shape-memory alloy 21 causes the locking lever 11, which is a locking mechanism for retaining the driven member or the flash 2 at its initial position, to move to a lock release position to release the lock by transforming to the memorized shape when heated by electricity so that the flash 2 is moved to the popped-up position by the force of the spring 4. Here, since the transformation of the shape-memory alloy 21 is made linearly, the volume required for the mechanism is small and, for example, the mechanism can be installed between an upper cover of the camera body 1a and the main body, by which the space is saved, preventing the appliances such as cameras incorporating the mechanism from becoming bulky. Specifically in the first embodiment which utilizes linear transformation of the shape-memory alloy 21, there is an advantage of having such other possibilities of arrangement that the shape-memory alloy 21 can even be disposed in a curved gap within the camera body 1a with the provision of a roller or a wall or any such guiding members for guiding the shape-memory alloy 21 to stretch and contract in a linear form while tension is maintained at the curved portion.

The transformation stroke may be variously set according to the length or other properties of the shape-memory alloy 21, or a required stroke length may be fulfilled by arranging the proportion of levers such as the locking lever 11. It is also possible to employ a locking mechanism for locking the driven member such as the flash 2 or the like and for releasing the lock which does not use a lever, or to employ a mechanism which uses a locking member which moves linearly. Also, the present invention can be applied to any other driven members other than the flash 2, as long as it is urged by a spring to remain at an initial position toward one direction, and styles of movement of the driven member from the initial position toward one direction or a specific supporting structure may be freely designed.

Figure 6:
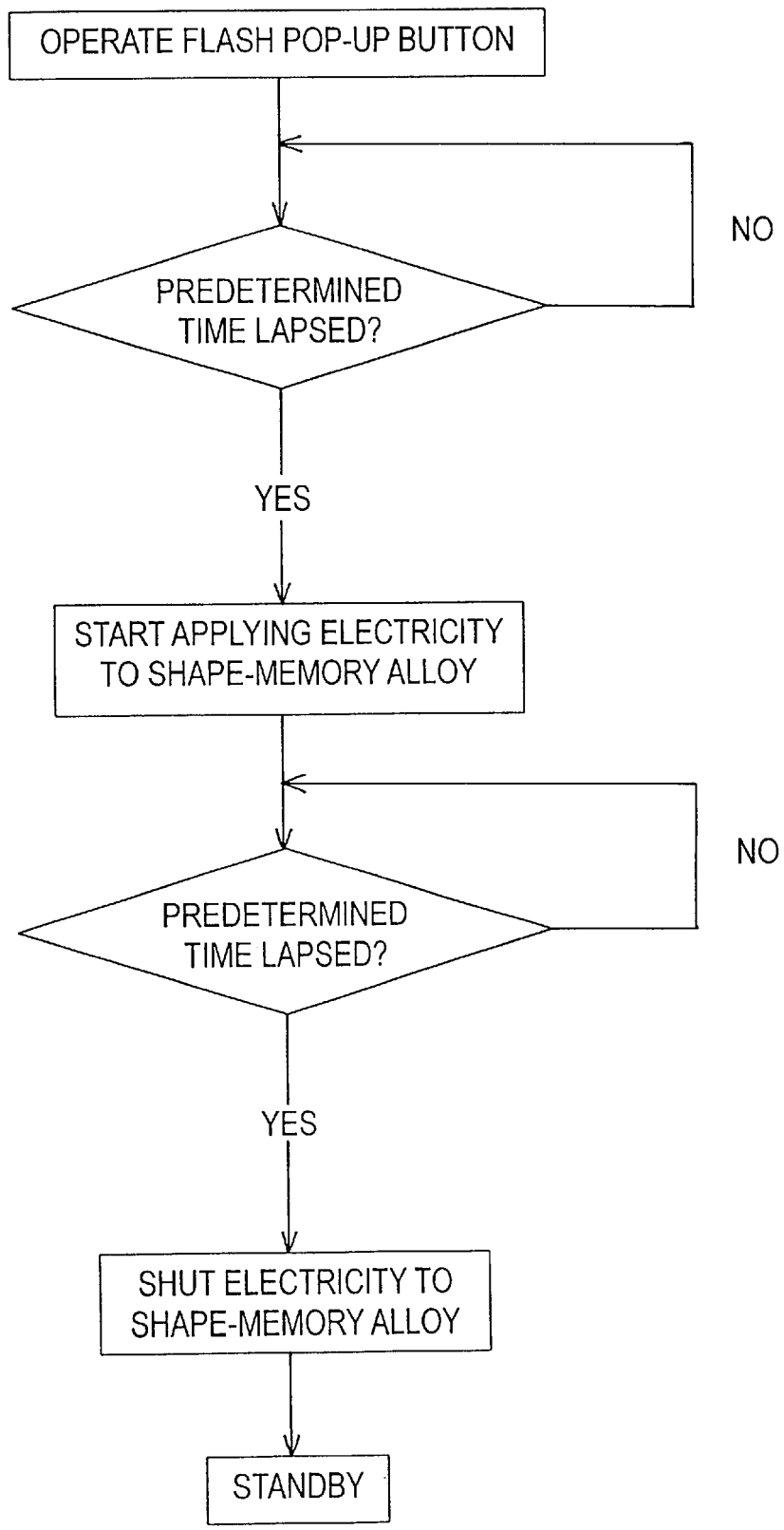
FIG. 6 is a flowchart of a sequence of actions for releasing the lock of the flash in FIG. 3.

The flash pop-up mode is implemented according to the sequence of actions, for example, as shown in FIG. 6, and a temperature sensor 23 for detecting environmental temperature of the camera body 1a and a key switch 8a of an operative button 8 provided on the front side of the camera body 1a for manual flash pop-up operation are connected to the electric current control circuit 22.

A microcomputer installed in the camera body 1a for controlling actions may be commonly used as the electric current control circuit 22. However, it is not limited to this, and a special control unit may be used, as well as other control units may be commonly used.

Description of the flash pop-up mode will now be made in accordance with the sequence of actions shown in FIG. 6. First it is judged whether the operative button 8 has been operated or not, and when the operative button 8 has been operated, it is started to heat the shape-memory alloy 21 by electricity after a certain period of time has lapsed, which is counted by an inner timer function or the like of the electric current control circuit 22. The timing for starting electric heating of the shape-memory alloy 21 with respect to the operation timing of the operative button 8 can be freely set by determining this certain period of time. Particularly in this embodiment, the period of time is altered by the electric current control circuit 22 in accordance with, for example, a certain table corresponding to environmental temperature of the camera body 1a detected by the temperature sensor 23. More specifically, when the temperature is high, the period of time is set shorter, and when the temperature is low, the period of time is set longer. The transformation speed of the shape-memory alloy 21 into the memorized shape by electric heating is thereby prevented from varying depending on differences in temperature, and it is avoided that the time between the operation of the operative button 8 and the lock release varies, which would annoy the user of the camera. In other words, the period of time is set such as to be the longest time for the shape-memory alloy 21 to transform into the memorized shape from the moment when the operative button 8 is operated.

In case of an automatic flash pop-up mode without operation of the operative button 8, such consideration as mentioned above is unnecessary, and it is favorable to set such that the flash 2 pops up as quickly as possible. Thus the electric heating of the shape-memory alloy 21 may be immediately started when it is judged that the flash 2 needs to be popped up by automatic settings. However, it is not limited to this, and it is of course possible to control the timing similarly in the case of manual operation of the operative button 8.

The electric heating of the shape-memory alloy 21 is ended after a certain period of time has lapsed. The timing of ending the electric current supply to the shape-memory alloy 21 can also be set using the inner timer function of the electric current control circuit 22, eliminating the necessity of providing an additional switch. It is thus not only advantageous from the viewpoint of space saving, but also helps reduce the cost with fewer number of components and assembling steps.

Particularly in this embodiment, the period of time is altered by the electric current control circuit 22 in accordance with, for example, a certain table corresponding to environmental temperature of the camera body 1a detected by the temperature sensor 23. More specifically, when the temperature is high, the period of time is set shorter, and when the temperature is low, the period of time is set longer. By varying the certain period of time between the start and the end of the electric heating, it is ensured that the lock of the flash 2 is reliably released so that the flash 2 is certainly moved by the urging force of the spring, whereas the time of electric heating is reduced to a minimum depending on the temperature thereby saving electricity, so it is advantageous in the case of using an electric power source built in the camera 1.

When electric current supply to the shape-memory alloy 21 is finished, the flash 2 stands by photographing under the flash mode. Meanwhile, the shape-memory alloy 21 starts to cool after the end of the electric heating and returns to be its initial form.

(Second Embodiment)

Figure 7:
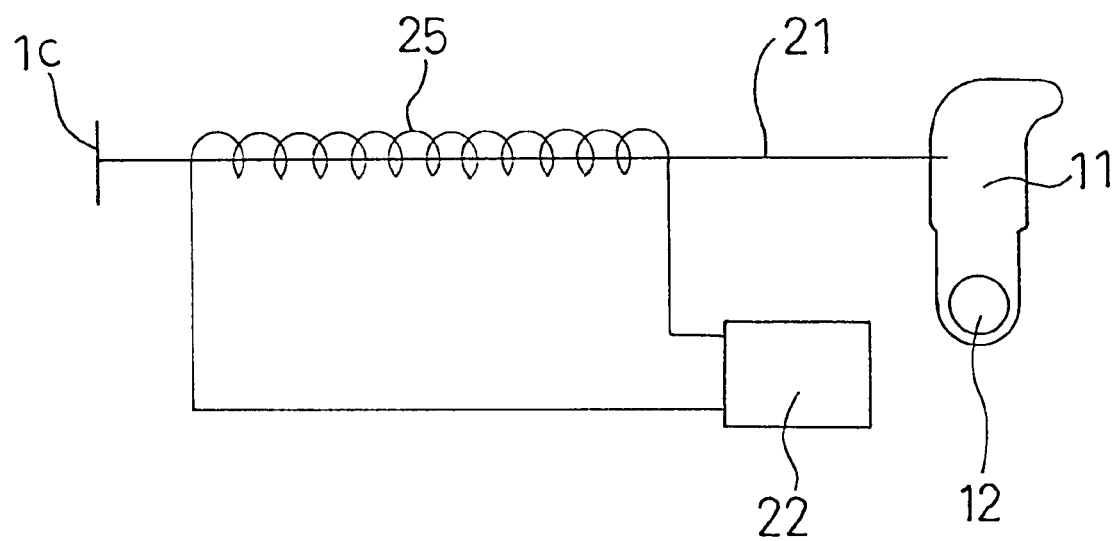
FIG. 7 is a side view showing a lock release mechanism of a second embodiment of the present invention.

FIG. 7 shows a second embodiment, in which a heater 25 is provided to heat the shape-memory alloy 21, and an electric current is applied to the heater 25 by the electric current control circuit 22. By heating the shape-memory alloy 21 by means of the heater 25, a complicated operation of connecting a current circuit to the shape-memory alloy 21 can be avoided, as compared with a case of directly heating the shape-memory alloy 21 by electricity.

The heater 25 is coiled around the shape-memory alloy 21. However, it is not limited to this configuration, and the heater may be just touched with the shape-memory alloy, or the shape-memory alloy may be interposed between heaters or covered with a tube-like heater, or any other various arrangements may be employed.

(Third Embodiment)

This embodiment is an example of a driving mechanism in which a plurality of driven members are selectively driven by one motor, the drive transmission being changed over from one to another by using a friction planet gear mechanism in a camera. For example, in a camera 1 of an advanced photo system type shown in FIG. 8 to FIG. 10, the rotation of a motor 31 is selectively transmitted to a zoom system 33 and a film feed system 34 by an action of a transmission changeover unit 32 shown in FIG. 11 to FIG. 14 as one example of transmission changeover means.

Figure 12:
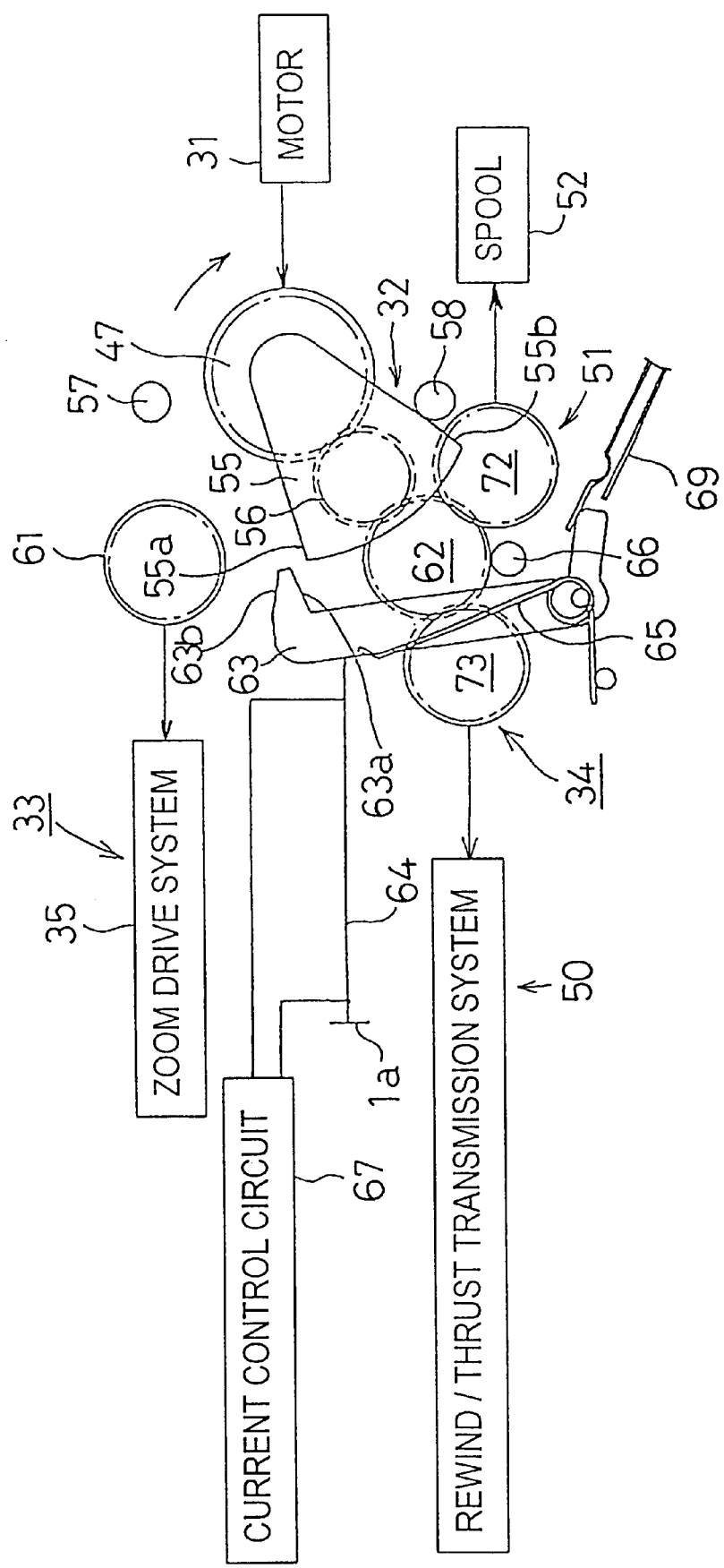
FIG. 12 is a plan view showing a lock release state of the transmission changeover mechanism of FIG. 11 under the transmission changeover state in which the film feed system is selected.
Figure 13:
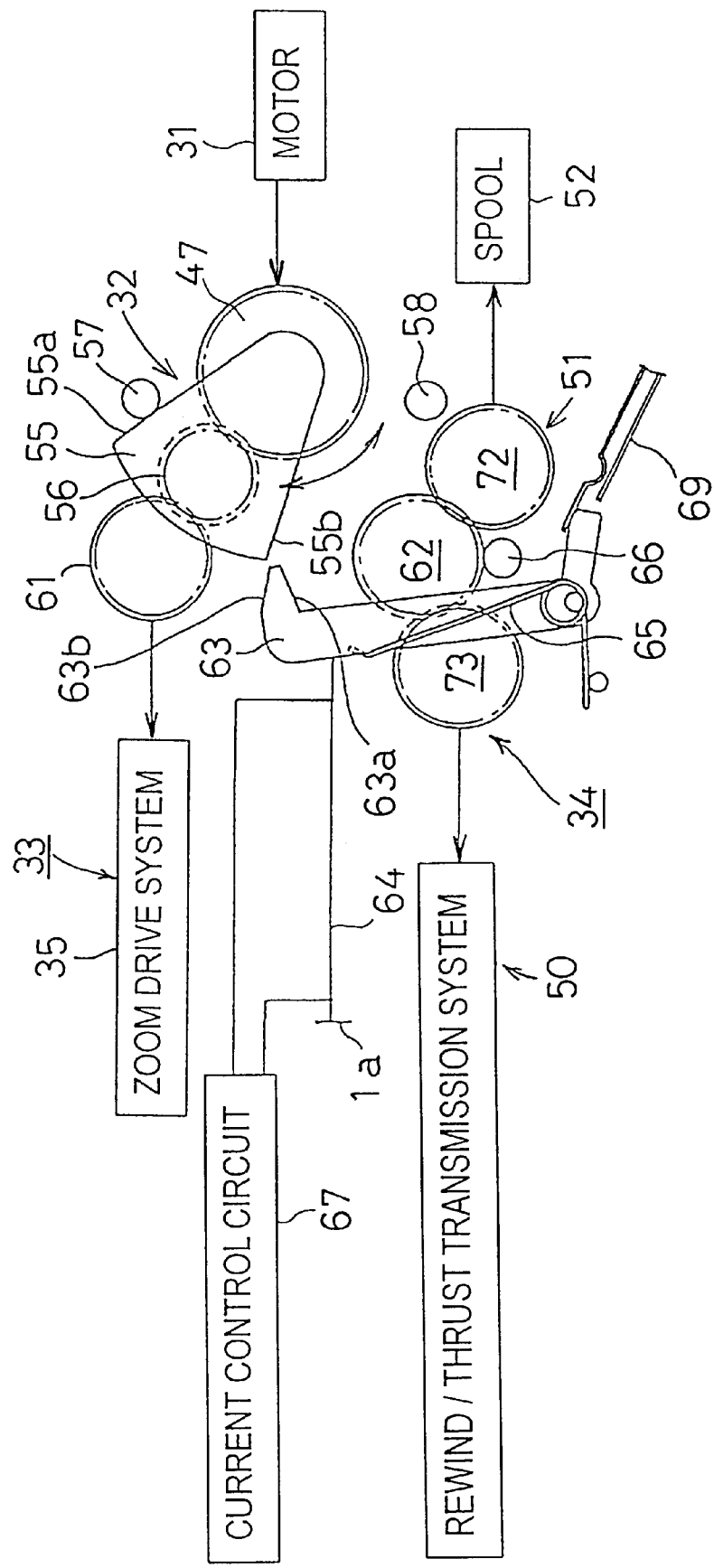
FIG. 13 is a plan view showing a transmission changeover state of the transmission changeover mechanism of FIG. 11 in which a zoom system is selected from the transmission changeover state in which the film feed system is selected.
Figure 14:
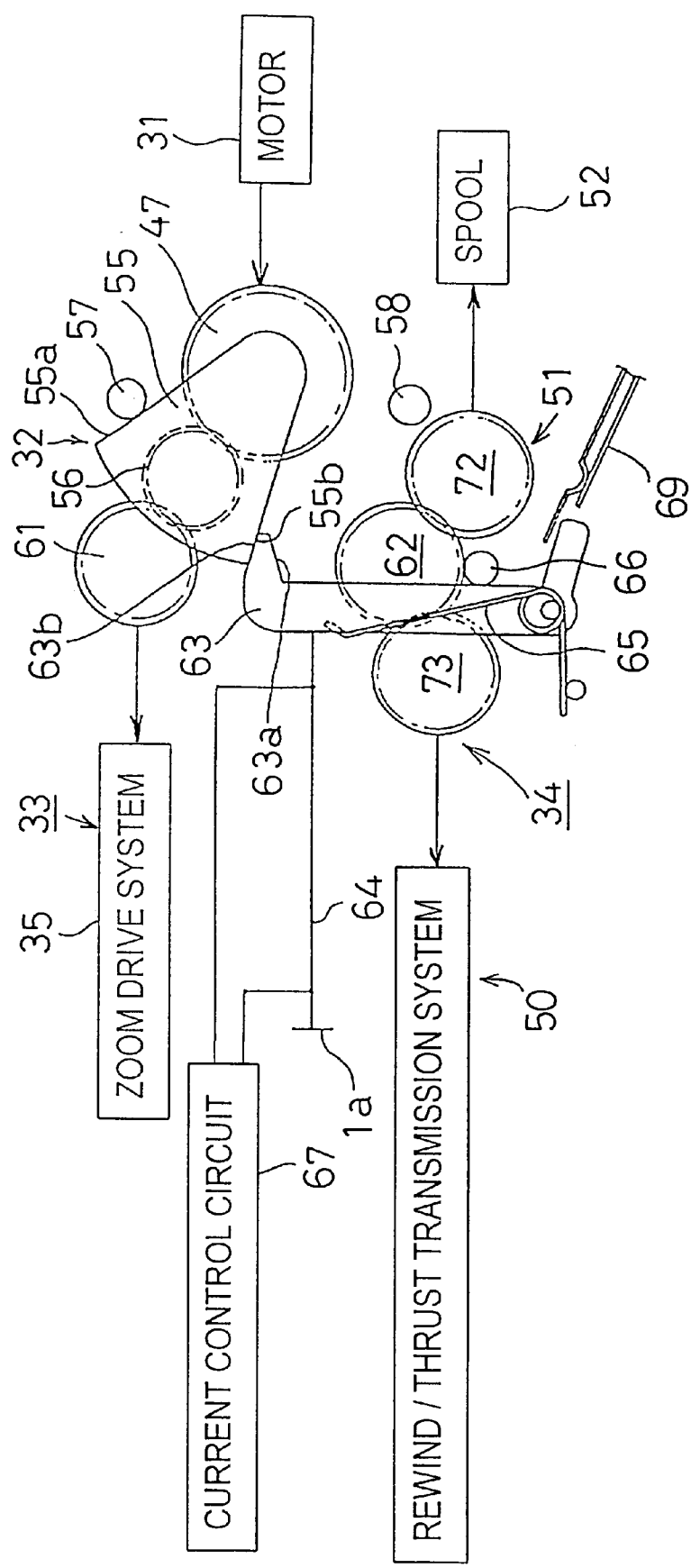
FIG. 14 is a plan view showing the transmission changeover mechanism which is locked to be in the transmission changeover state of FIG. 11.

When the transmission changeover unit 32 is connected to a zoom system gear 61 for transmitting a drive force to the zoom system 33 as shown in FIG. 14, a barrel 36 is extended or retracted by means of, for example, a reversible rotation of the motor 1 as a first driving power source, via a zoom drive system 35 shown in FIG. 10 to FIG. 14 for achieving the zoom driving.

Figure 9:
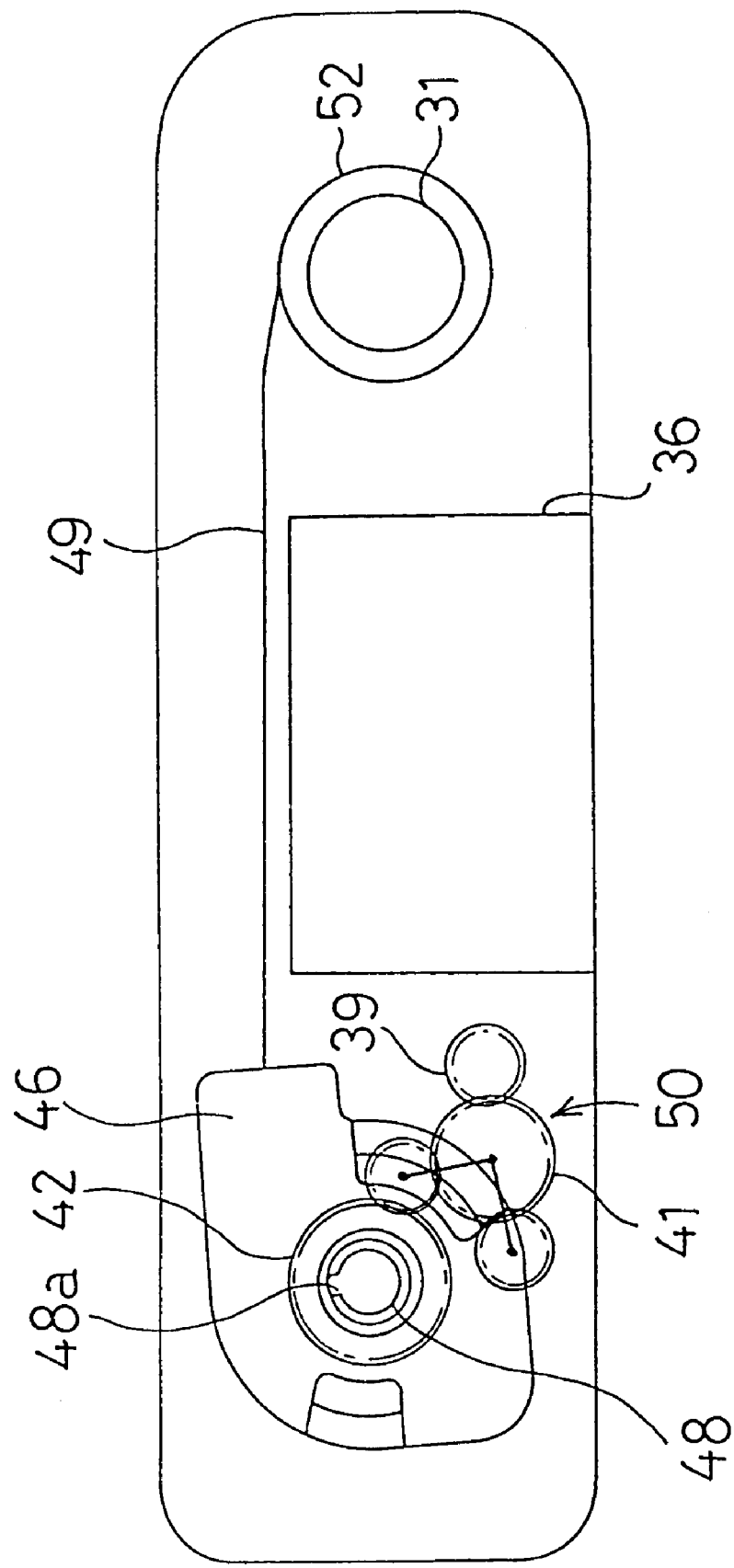
FIG. 9 is a top plan view of the camera of FIG. 8.
Figure 10:
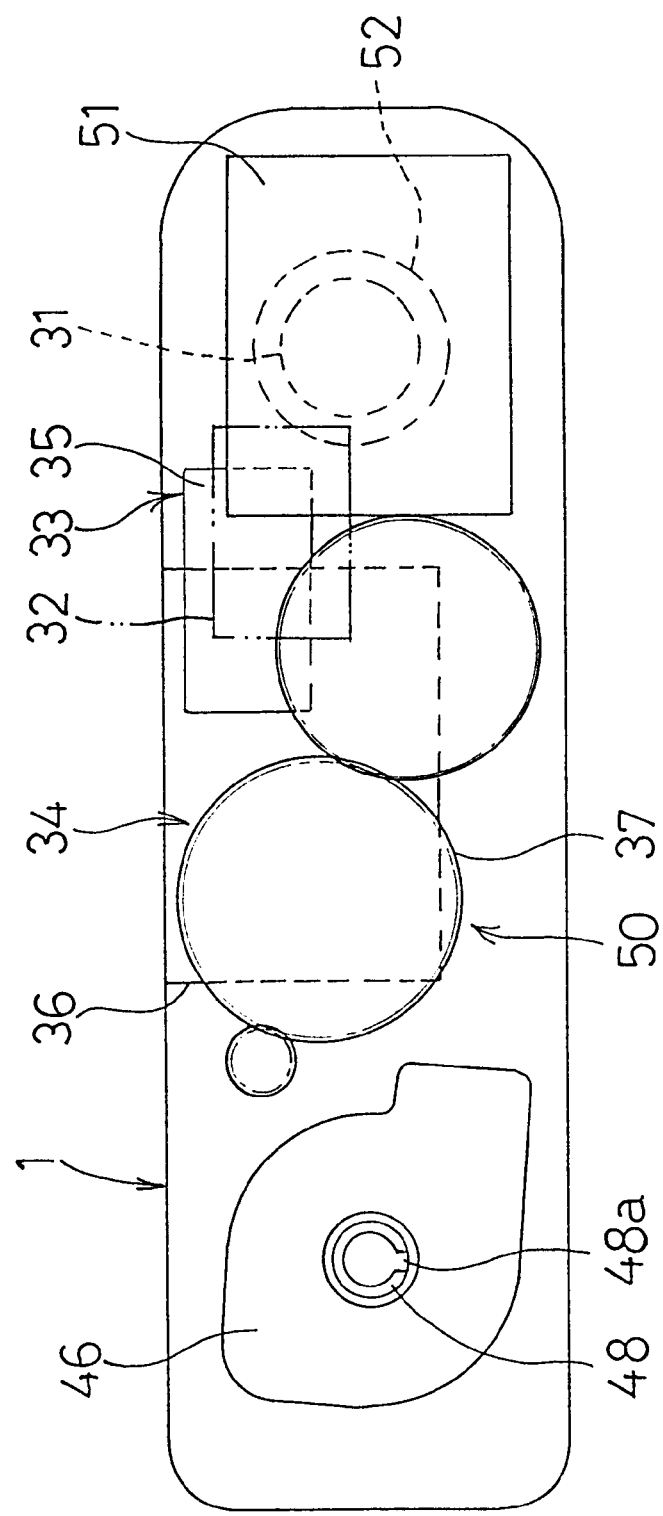
FIG. 10 is a bottom plan view of the camera of FIG. 8.
Figure 11:
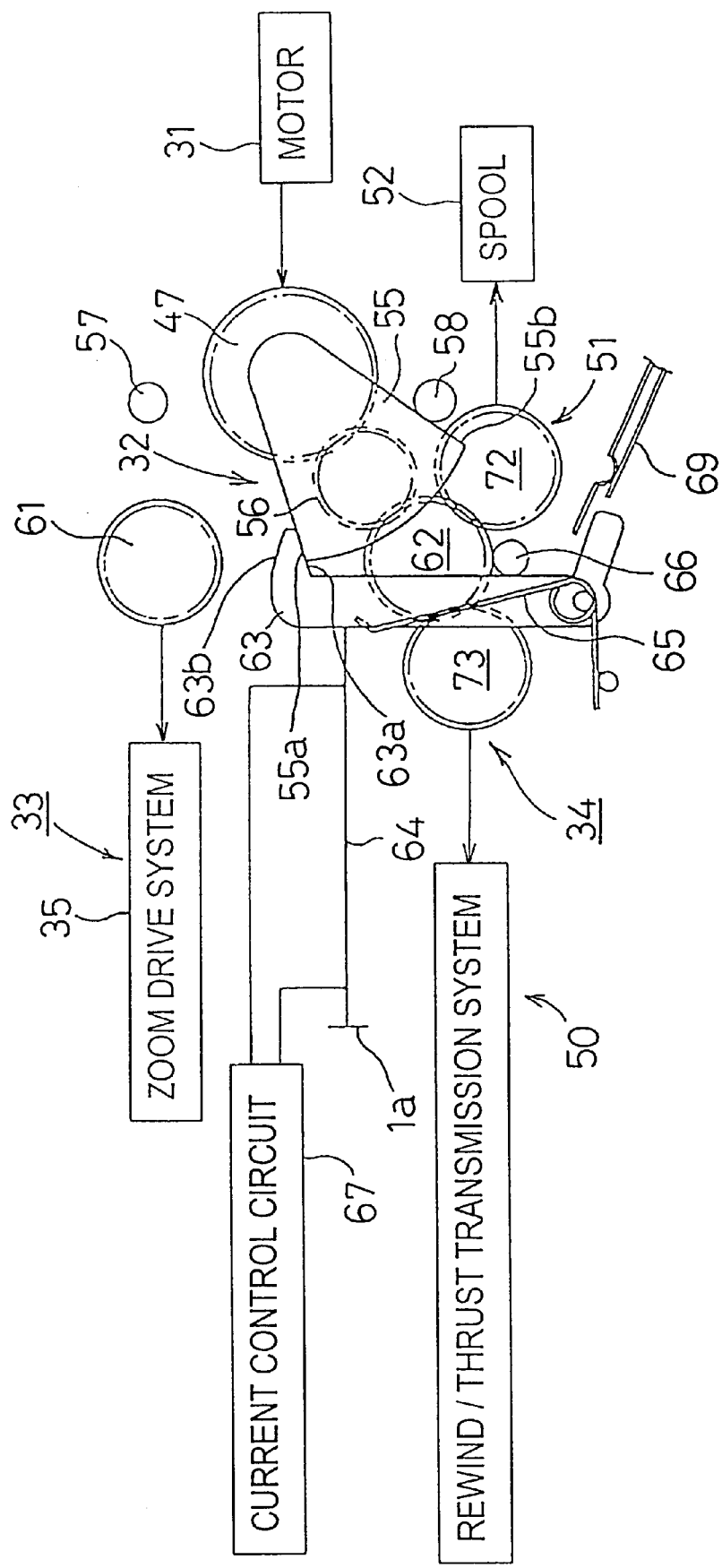
FIG. 11 is a plan view showing a transmission changeover state of a transmission changeover mechanism in a driving mechanism of the camera of FIG. 8 in which a film feed system is selected.

When the transmission changeover unit 32 is connected to a film feed system gear 62 for transmitting a drive force to the film feed system 34 as shown in FIG. 11, a fork shaft 42 is rotated by the reversible rotation of the motor 31 through a fork transmission gear 73, a rewind/thrust transmission train 37 of a rewind/thrust transmission system 50, a transmission shaft 38, a transmission shaft gear 39, and a rewind/thrust drive mechanism 41 shown in FIG. 8 to FIG. 14, and the rotation of the motor 31 is also transmitted to a cartridge spool 48 of a cartridge 46 via another transmission system (not shown).

The fork gear 42 is rotated counterclockwise via the rewind/thrust drive mechanism 41 by the clockwise rotation of the transmission shaft gear 39. A fork shaft 44 is integrally provided to the fork gear 42, and the fork shaft 44 is provided with a retractable fork key 45, which couples with a spool key groove 48a of the cartridge spool 48. The cartridge spool 48 is rotated counterclockwise by the rotation of the fork gear 42 in the same direction which is driven by the clockwise rotation of an output gear (not shown) of the motor 31, by which a film 49 shown in FIG. 9 is rolled into the cartridge 46.

When the cartridge spool 48 is rotated clockwise by the clockwise rotation of the fork gear 42 which is driven by a counterclockwise rotation of the output gear of the motor 31, the film 49 is pushed out from the cartridge 46 and fed toward a take-up spool 52 shown in FIG. 8 to FIG. 14 within the camera 1.

Figure 8:
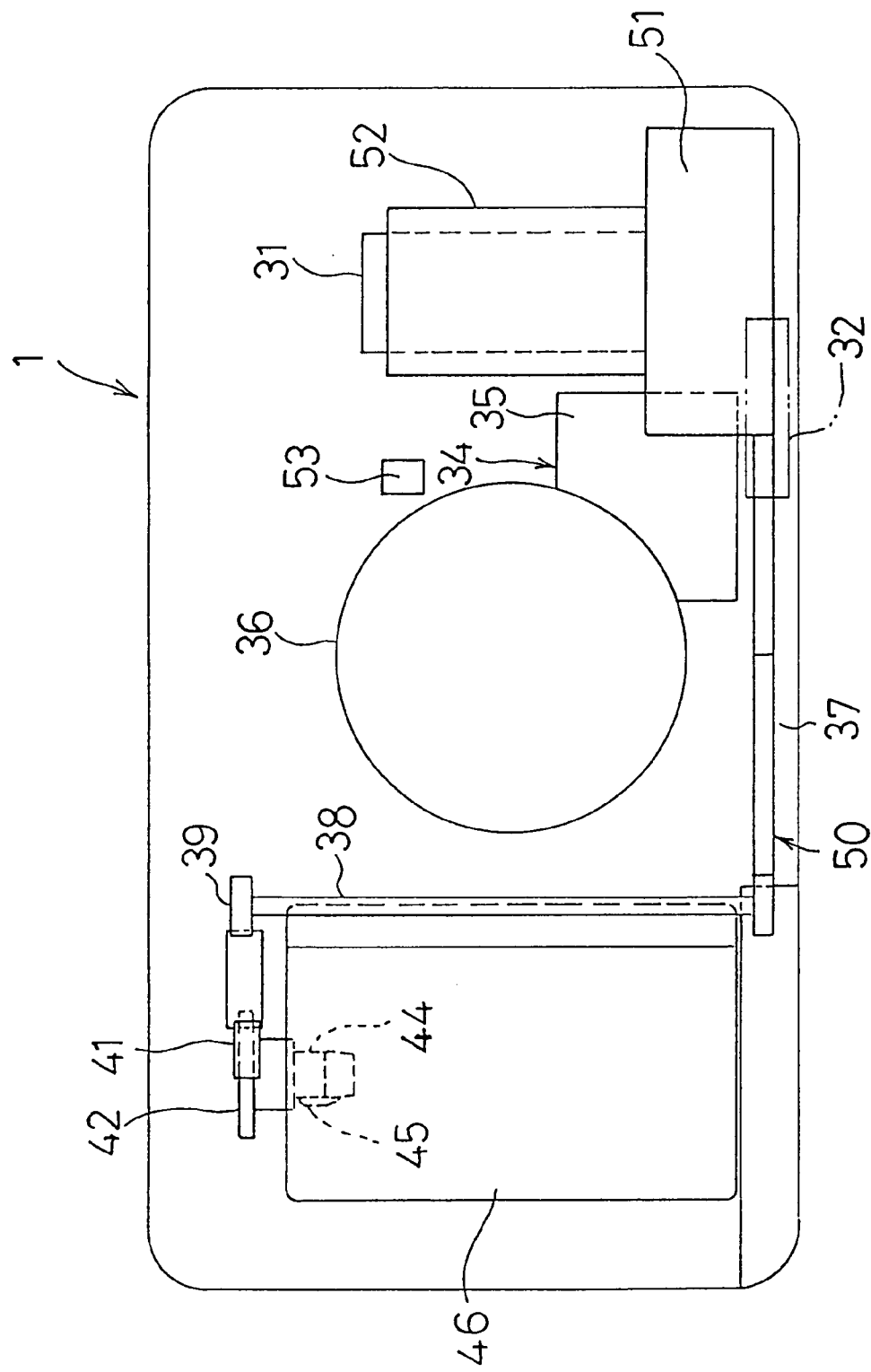
FIG. 8 is a front view of a camera representative of one of the embodiments according to the present invention.

In the film feed system 34, the take-up spool 52 shown in FIG. 8 to FIG. 10 within the camera 1 is rotated clockwise by the rotation of the motor 31 in the same direction via a spool transmission gear 72 of a take-up drive system 51, and the transmission of the drive force from the motor 31 to the spool 52 is cut by the reverse rotation of the motor 31 in the take-up drive system 51.

A roller (not shown) is pressed against the take-up spool 52, by which the film 49 being fed thereto is pressed against the spool 52 to generate a frictional force therebetween, so that the film 49 is pulled by the spool 52 rotating in the take-up direction and rolled around the spool 52.

A perforation sensor 53 shown in FIG. 8 is an optical sensor, of which output varies depending on existence of perforations in the film 49.

As shown in FIG. 11 to FIG. 14, the transmission changeover unit 32 has a sun gear 47 which is linked to the output gear of the motor 31 and a planet lever 55 which is provided on an identical shaft of the sun gear 47. A planet gear 56 which meshes with the sun gear 47 is axially supported on the planet lever 55. A friction mechanism is further provided either between the sun gear 47 and the planet lever 55 or between the planet lever 55 and the planet gear 56. When the planet lever 55 is in a free state, the planet lever 55 and the planet gear 56 rotate integrally with the sun gear 47 by frictional resistance of the friction mechanism. By this means, the planet lever 55 and the planet gear 56 are pivotally reciprocated between stoppers 57, 58 by the reversible rotation of the motor 31, so that it is changed over appropriately such that the planet gear 56 selectively meshes with the zoom system gear 61 for transmitting the drive force to the zoom system 33 or with the film feed system gear 62 for transmitting the drive force to the film feed system 34, respectively shown in FIG. 11 and FIG. 14.

In these connected states shown in FIG. 11 and FIG. 14, when the rotation of the planet lever 55 is stopped, the rotation of the sun gear 47 overcomes the frictional resistance of the friction mechanism and is transmitted to the planet gear 56 which is axially supported on the planet lever 55. By this means, the rotation is transmitted to the zoom system gear 61 or the film feed system gear 62 being meshed with the planet gear 56, so as to drive either the zoom system 33 or the film feed system 34 as mentioned above.

A lock lever 63 is used for locking the planet lever 55 at its transmission changeover position shown in FIG. 11 and FIG. 14. This lock lever 63 is urged clockwise by a spring 65 so as to be always located at the lock position shown in FIG. 11 where it contacts to a stopper 66. In the state shown in FIG. 11, a connected state is maintained in which a contact portion 63a of the lock lever 63 is in contact with a contact portion 55a of the planet lever 55 so as to lock the planet lever 55 to be in contact with the stopper 58 and prevent the planet lever 55 to rotate clockwise, and the rotation of the motor 31 in both directions is transmitted to the film feed system 34.

Here, a shape-memory alloy 64 as a second driving power source is linearly disposed, one end of which is attached to the lock lever 63 while the other end is connected to the camera body 1a. The memorized shape of the shape-memory alloy 64 is shorter than the length shown in FIG. 11, and when an electric current is applied from a current control circuit 67 to the shape-memory alloy 64, it generates heat and returns to its original shorter form. When the shape-memory alloy 64 is shortened, the lock lever 63 is rotated counterclockwise against the force of the spring 65 to cause its contact portion 63a to depart from the contact portion 55a of the planet lever 55 as shown in FIG. 12, so as to allow the planet lever 55 to rotate clockwise. Also, when the lock lever 63 is rotated counterclockwise, a switch 69 is turned off, by which it is detected that the amount of transformation of the shape-memory alloy 64 has reached a predetermined value and the lock lever 63 has been released to allow the transmission to be changed over.

In this state, when the sun gear 47 is rotated clockwise by the drive force from the motor 31, the planet lever 55, which is in a free state, is integrally rotated clockwise with the sun gear 47 due to the frictional resistance by the friction mechanism, until the planet lever 55 strikes the stopper 57 as shown in FIG. 13, by which the clockwise rotation of the planet lever 55 is stopped. In a state that the planet lever 55 is in contact with the stopper 57, the planet gear 56 is meshed with the zoom system gear 61.

When the electric current supply to the shape-memory alloy 64 is stopped, its temperature gradually decreases, thus reducing its transforming force, in accordance with which the urging force of the spring 65 overcomes the force from the shape-memory alloy 64. As a result, the lock lever 63 is rotated clockwise by the force of the spring 65, bringing its contact portion 63b into contact with the contact portion 55b of the planet lever 55 as shown in FIG. 14 so as to retain the planet lever 55 at the position for driving the zoom system 33. When the lock lever 63 comes to the position for locking the planet lever 55 as shown in FIG. 14, the transmission of the force to the zoom drive system 35 by the counterclockwise rotation of the sun gear 47 is enabled. The switchover of transmission from the zoom system 33 driving state shown in FIG. 14 to the film feed system 34 driving state shown in FIG. 11 is achieved by reversely performing the actions that have been described above.

As set forth above, the transmission changeover unit 32 is capable of switching over transmission of the force from the motor 31 to one of a plurality of driven members such as the zoom system 33 and the film feed system 34 selectively, utilizing thermal transformation of the shape-memory alloy 64. Since the shape-memory alloy 64 changes its shape by heat quickly, transmission changeover can be achieved without much dead time. Even when the heating of the shape-memory alloy 64 is stopped at the same time when the transmission changeover by the motor 31 is started, since it restores slowly and thus does not obstruct the transmission changeover by the motor 31, the time for applying electricity can be minimized as in this embodiment in which the heating is achieved by electricity supply. Moreover, since the transformation of the shape-memory alloy 64 is made linearly as in this embodiment, the volume required for the mechanism is small and, for example, the mechanism can be installed between a bottom cover of the camera 1 and the camera body 1a, by which the space is saved, permitting the camera to be compact.

Furthermore, the mechanism is free from unfavorable properties of a holding mechanism which utilizes attraction consisting of an electromagnet and an armature, which is susceptible to shocks and easily decreased in attracting force by dust. A mechanism with a plunger or an electromagnet has a disadvantage that its driving force is declined as its electromagnetic force decreases with the fall of the voltage from the electric power source while applying electricity, whereas the shape-memory alloy 64 keeps generating a certain amount of transforming force even during a longer heating time, thus assuring stable actions.

In order for implementing the above described transmission changeover and various driving actions, a CPU is used as a control unit 68 in this embodiment, to which the motor 31 and the electric current control circuit 67 are connected as well as the switch 69, which detects whether the amount of transformation of the shape-memory alloy 64 has reached a predetermined value or whether the lock by the lock lever 63 has been released. Also connected is the perforation sensor 53 for correctly rewinding and taking up the film 49. Further, a zoom switch 71 which detects a zooming position of the barrel 36 is connected to the CPU for performing a correct driving action of the zoom system 33. The CPU which controls overall actions of the camera 1 or any other control units may be commonly used as the control unit 68, or a special unit may be additionally provided.

Figure 16:
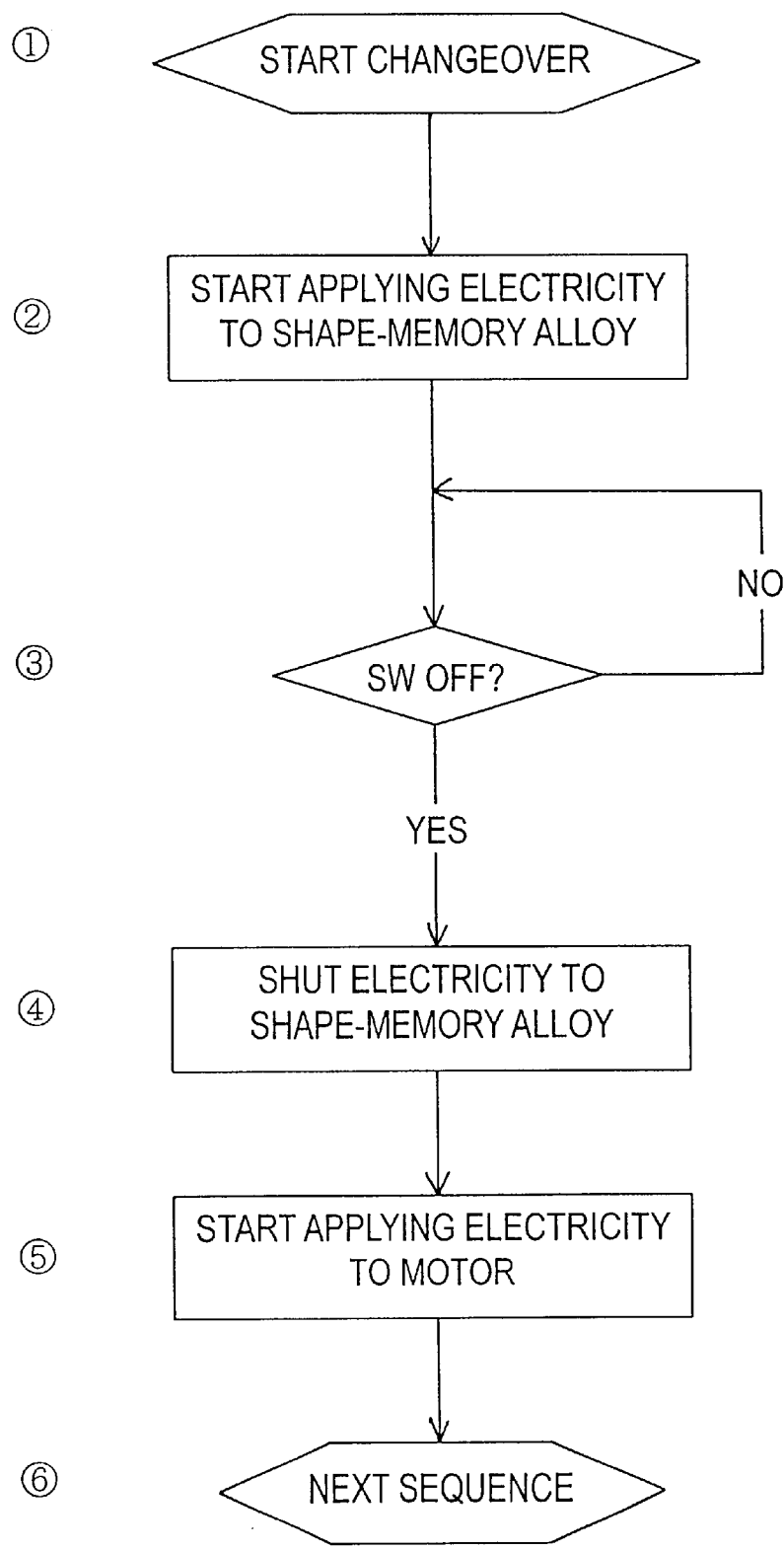
FIG. 16 is a flow chart of a sequence showing a first example of transmission changeover operation.

In a first example of sequence of actions shown in FIG. 16, the camera is in a state shown in FIG. 11 at step ①, and when electricity supply to the shape-memory alloy is started at step ②, the alloy is heated and transforms to the memorized length, with which the lock lever 63 starts to rotate counterclockwise.

At step ③, the lock lever 63 leaves the planet lever 55 and further rotates counterclockwise until the switch 69 is turned off as shown in FIG. 12.

In response to the switch 69 being turned off, the electricity supply to the shape-memory alloy 64 is stopped at step ④.

At step ⑤, as the electricity to the shape-memory alloy 64 is ended, the transforming force of the shape-memory alloy 64 decreases with its temperature goes down, as a result of which the lock lever 63 rotates clockwise by the force of the spring 65 as shown in FIG. 13, but since it takes time for the lock lever 63 to come into the track of the planet lever 55, it is started to apply electricity to the motor 31 to cause the planet lever 55 to rotate in a clockwise direction, so as to change over the planet lever 55 from the film feed system 34 to the zoom system 33.

At step ⑥, the action proceeds to the next sequence. Here, as the planet lever 55 is locked at the zoom system driving position by the lock lever 63 after a predetermined period of time has lapsed since the end of electricity supply to the shape-memory alloy 64, the driving of the zoom system 33 in both directions is performed after the locking is completed as shown in FIG. 14. This is because the planet lever 55 would be changed over to the film feed system 34 if the sun gear 47 were rotated counterclockwise before the lock lever 63 reaches the position for locking the planet lever 55. The timing of driving in the next sequence may be set such as to be started when the switch 69 is turned on, or according to a timer setting by counting the time from when the electricity supply to the shape-memory alloy 64 is shut off. In the case of using a timer, the timer setting may be altered according to the temperature detected by a temperature sensor (not shown) provided in the camera 1. This is because the cooling time of the shape-memory alloy varies depending on the ambient temperature.

As set forth above, when changing over transmission, it is possible to prevent such a disadvantage as to apply electricity to the motor 31 and to the shape-memory alloy 64 at the same time, as well as to achieve the transmission changeover reliably by starting electricity supply to the motor 31 after the electric heating of the shape-memory alloy 64 is stopped.

Further, the shape change of the shape-memory alloy 64 or the switchover actions of the lock lever 63 is detected by the switch 69, by which the electric current to the shape-memory alloy 64 is shut off at the time when or after the amount of transformation of the shape-memory alloy 64 by electric heating has reached a predetermined value. It is thus possible to save electricity by minimizing the time for applying an electric current to the shape-memory alloy 64 and to ensure that the transmission changeover is certainly achieved by the transformation of the shape-memory alloy 64 by electric heating.

Figure 17:
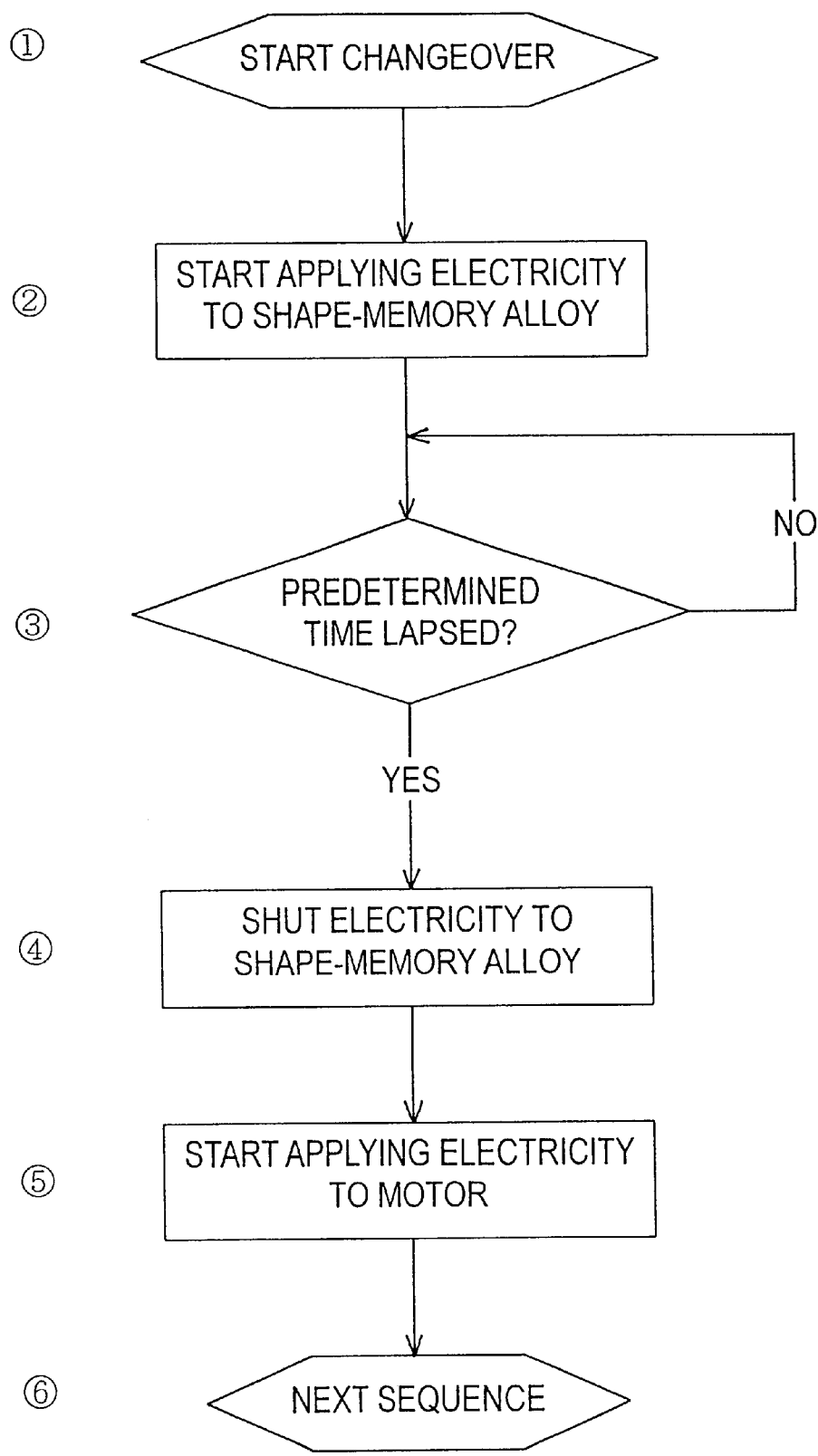
FIG. 17 is a flow chart of a sequence showing a second example of transmission changeover operation.

In a second example of sequence of actions shown in FIG. 17, the camera is in a state shown in FIG. 11 at step ①, and when electricity supply to the shape-memory alloy 64 is started at step ②, the alloy is heated and transforms to the memorized length, with which the lock lever 63 starts to rotate counterclockwise.

At step ③, it is judged whether a predetermined period of time which is set in a timer has lapsed since the start of electricity supply to the shape-memory alloy 64, by which it is supposed that the lock lever 63 left the planet lever 55 and reached the position shown in FIG. 12.

After the predetermined time has lapsed, the electric current to the shape-memory alloy 64 is shut off at step ④. The timer setting time, i.e., the above mentioned predetermined period of time may be changed according to the temperature detected by a temperature sensor (not shown) provided in the camera 1. This is because the cooling time of the shape-memory alloy varies depending on the ambient temperature.

At step ⑤, as the electricity to the shape-memory alloy 64 is shut off, the transforming force of the shape-memory alloy 64 decreases with its temperature goes down, as a result of which the lock lever 63 rotates clockwise by the force of the spring 65 as shown in FIG. 13, but since it takes time for the lock lever 63 to come into the track of the planet lever 55, it is started to apply electricity to the motor 31 to cause the planet lever 55 to rotate in a clockwise direction, so as to change over the planet lever 55 from the film feed system 34 to the zoom system 33.

At step ⑥, the action proceeds to the next sequence. Here, as the planet lever 55 is locked at the zoom system driving position by the lock lever 63 after a predetermined period of time has lapsed since the end of electricity supply to the shape-memory alloy 64, the driving action of the zoom system 33 in both directions is performed after the locking is completed as shown in FIG. 14. This is because the planet lever 55 would be changed over to the film feed system 34 if the sun gear 47 were rotated counterclockwise before the lock lever 63 reaches the position for locking the planet lever 55. The timing of driving in the next sequence may be set such as to be started when the switch 69 is turned on, or according to a timer setting by counting the time from when the electricity supply to the shape-memory alloy 64 is shut off. In the case of using a timer, the timer setting may be altered according to the temperature detected by a temperature sensor (not shown) provided in the camera 1. This is because the cooling time of the shape-memory alloy varies depending on the ambient temperature.

Figure 15:
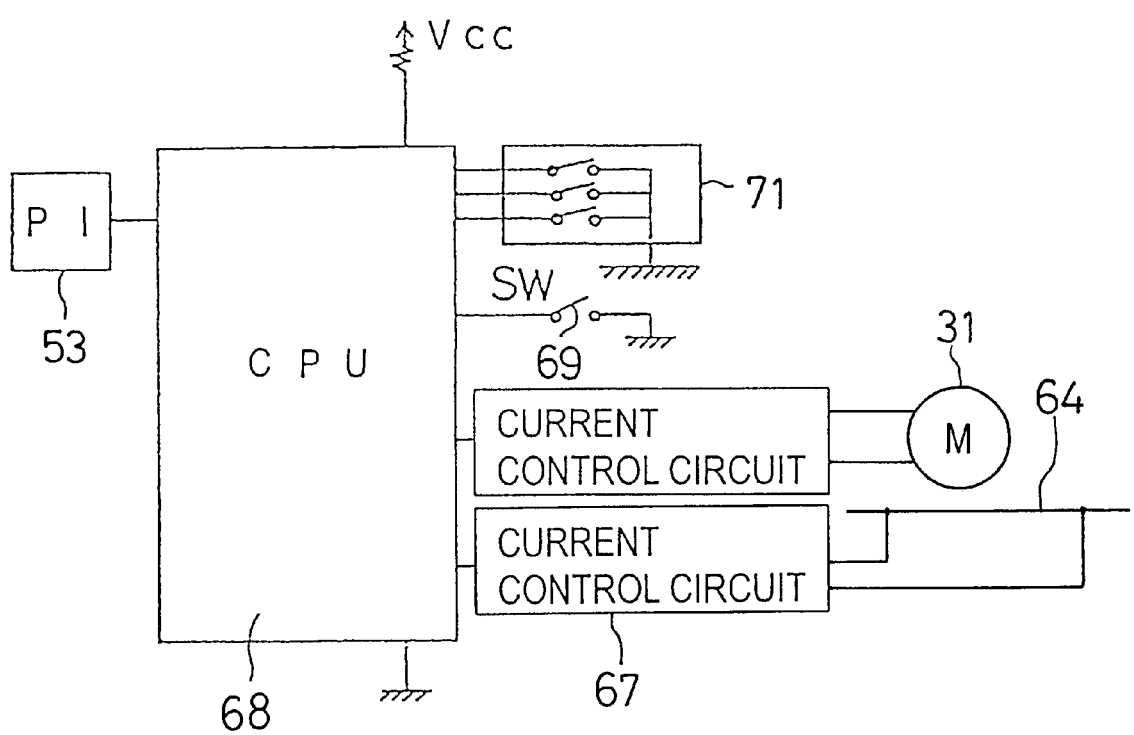
FIG. 15 is a block diagram showing a control unit of a driving mechanism.

As set forth above, the second example is different from the first example in that the timing for stopping electric heating of the shape-memory alloy 64 is set such as to be after a predetermined period of time has lapsed since the start of heating of the shape-memory alloy 64, by which it is assured that the transmission changeover by the transformation of the shape-memory alloy 64 is reliably achieved before the electric heating is stopped without any special detecting means, thanks to an inner counting function provided in the control unit 68 shown in FIG. 15. By changing the time setting according to the ambient temperature, it is prevented that the amount of transformation of the shape-memory alloy 64 by electric heating varies depending on the ambient temperature, by which it is avoided that, due to such variation of the amount of transformation, the transmission changeover is not achieved because the timing of ending electric heating is too early, or that the timing is too late and electric power is wasted.

Figure 18:
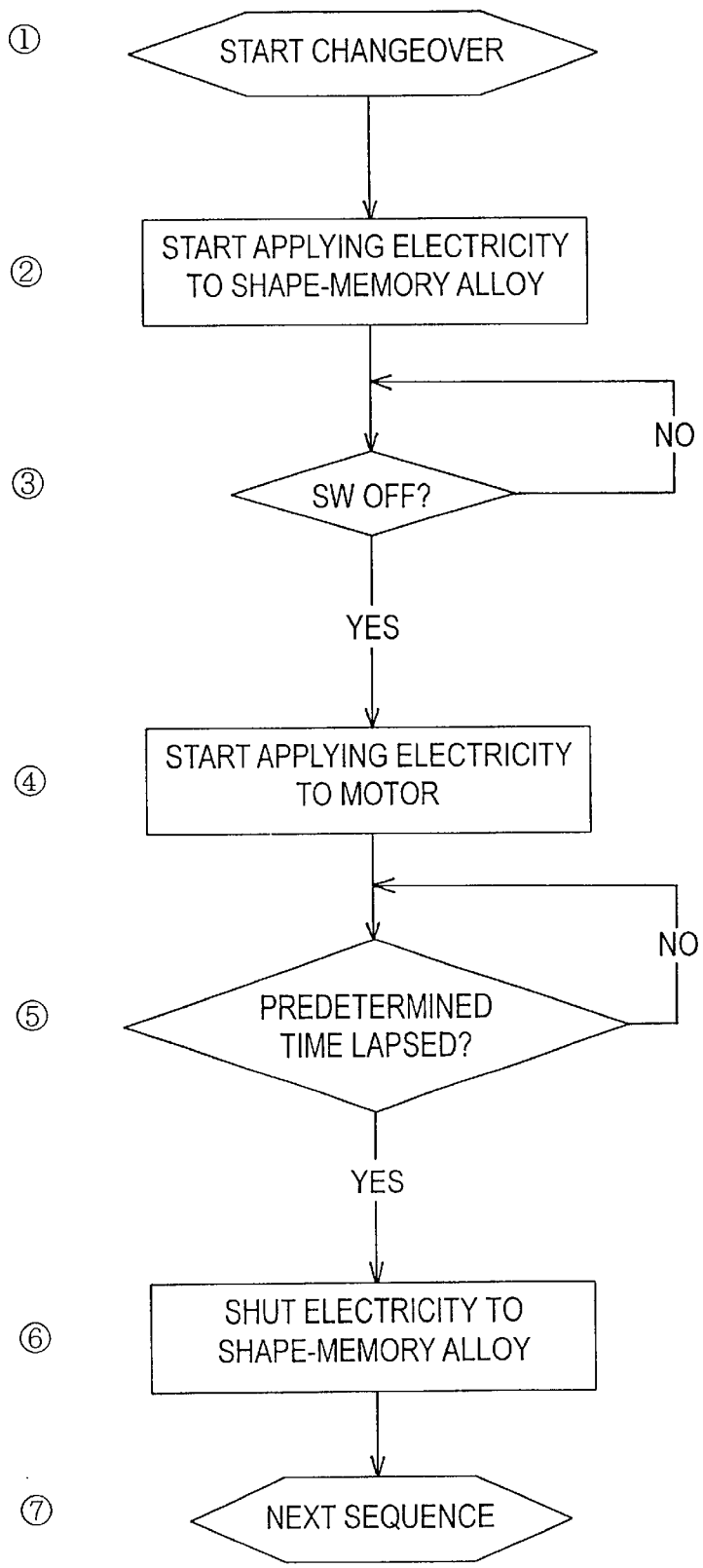
FIG. 18 is a flow chart of a sequence showing a third example of transmission changeover operation.

In a third example of sequence of actions shown in FIG. 18, the camera is in a state shown in FIG. 11 at step ①, and when electricity supply to the shape-memory alloy is started at step ②, the alloy is heated and transforms to the memorized length, with which the lock lever 63 starts to rotate counterclockwise.

At step ③, the lock lever 63 leaves the planet lever 55 and further rotates counterclockwise until the switch 69 is turned off as shown in FIG. 12.

In response to the switch 69 being turned off, the electricity supply to the motor 61 is started at step ④ for rotating the sun gear 47 in a clockwise direction so as to cause the planet lever 55 to rotate clockwise as shown in FIG. 12.

At step ⑤, it is awaited until a predetermined period of time, which is set in the timer, passes after the start of electricity supply to the motor 31. This period may be the time necessary for the planet gear 56 of the planet lever 55 to uncouple the film feed system gear 62 and to mesh with the zoom system gear 61.

At step ⑥, as the predetermined time has passed, the electric current to the shape-memory alloy 64 is shut off, with which the transforming force of the shape-memory alloy 64 decreases as its temperature goes down, and the lock lever 63 starts to rotate clockwise by the force of the spring 65 as shown in FIG. 13.

At step ⑦, the action proceeds to the next sequence. Here, as the planet lever 55 is locked at the zoom system driving position by the lock lever 63 after a predetermined period of time has lapsed since the end of electricity supply to the shape-memory alloy 64, the driving action of the zoom system 33 in both directions is performed after the locking is completed as shown in FIG. 14. This is because the planet lever 55 would be changed over to the film feed system 34 if the sun gear 47 were rotated counterclockwise before the lock lever 63 reaches the position for locking the planet lever 55. The timing of driving in the next sequence may be set such as to be started when the switch 69 is turned on, or according to a timer setting by counting the time from when the electricity supply to the shape-memory alloy 64 is shut off. In the case of using a timer, the timer setting may be altered according to the temperature detected by a temperature sensor (not shown) provided in the camera 1. This is because the cooling time of the shape-memory alloy varies depending on the ambient temperature.

Figure 19:
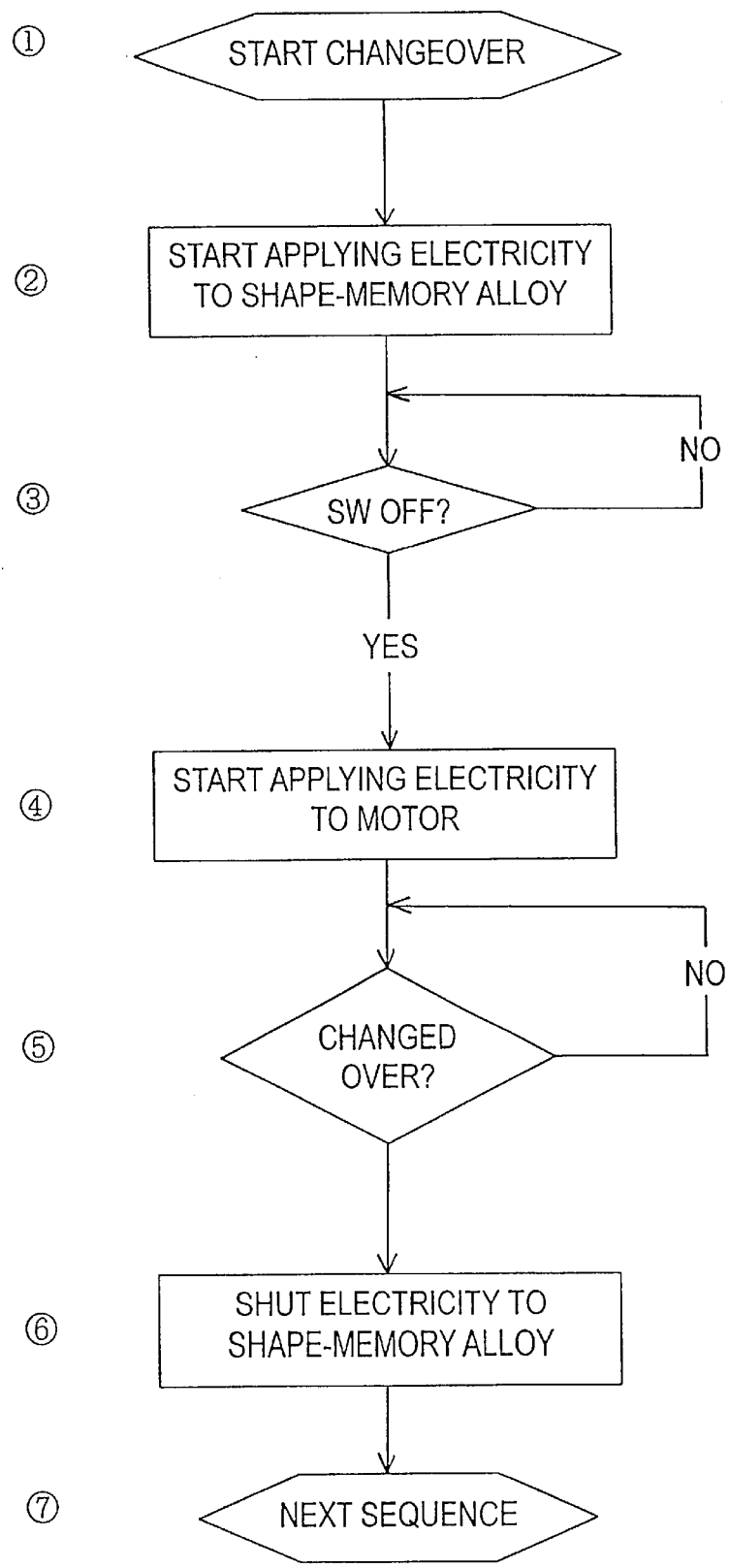
FIG. 19 is a flow chart of a sequence showing a fourth example of transmission changeover operation.

In a fourth example of sequence of actions shown in FIG. 19, the camera is in a state shown in FIG. 11 at step ①, and when electricity supply to the shape-memory alloy is started at step ②, the alloy is heated and transforms to the memorized length, with which the lock lever 63 starts to rotate counterclockwise as shown in FIG. 12.

At step ③, the lock lever 63 leaves the planet lever 55 and further rotates counterclockwise until the switch 69 is turned off as shown in FIG. 12.

In response to the switch 69 being turned off, the electricity supply to the motor 61 is started at step ④ for rotating the sun gear 47 in a clockwise direction so as to cause the planet lever 55 to rotate clockwise as shown in FIG. 13.

At step ⑤, it is detected whether the planet lever 55 has reached a predetermined transmission changeover position shown in FIG. 13 with a sensor (not shown) which detects positions of the planet lever 55.

At step ⑥, when it is detected that the planet lever 55 has reached the predetermined position by the planet lever position sensor (not shown), the electric current to the shape-memory alloy 64 is shut off, with which the transforming force of the shape-memory alloy 64 decreases as its temperature goes down, and the lock lever 63 starts to rotate clockwise by the force of the spring 65 as shown in FIG. 13.

At step ⑦, the action proceeds to the next sequence. Here, as the planet lever 55 is locked at the zoom system driving position by the lock lever 63 after a predetermined period of time has lapsed since the end of electricity supply to the shape-memory alloy 64, the driving action of the zoom system 33 in both directions is performed after the locking is completed as shown in FIG. 14. This is because the planet lever 55 would be changed over to the film feed system 34 if the sun gear 47 were rotated counterclockwise before the lock lever 63 reaches the position for locking the planet lever 55. The timing of driving in the next sequence may be set such as to be started when the switch 69 is turned on, or according to a timer setting by counting the time from when the electricity supply to the shape-memory alloy 64 is shut off. In the case of using a timer, the timer setting may be altered according to the temperature detected by a temperature sensor (not shown) provided in the camera 1. This is because the cooling time of the shape-memory alloy varies depending on the ambient temperature.

The third and fourth examples are different from the first and second examples in that electricity is applied to the motor 31 and the shape-memory alloy 64 at the same time, which is effective when the battery has a sufficient capacity of electric power for such simultaneous electricity supply to both members, and specifically, it is possible to ensure that the transmission changeover is certainly achieved because the lock lever 63 can be retained at its lock release position by the shape-memory alloy 64 even during the switchover action of the planet lever 55.

Although the electricity supply to the motor 31 is started when the switch 69 is turned off in the third and fourth examples, it is also possible to count the timing with a timer from the start of electricity supply to the shape-memory alloy 64, and also to start applying an electric current to the motor 31 at the same time depending on cases. By this means, the motor 31 can be warmed up by electricity from the process in which the transmission changeover is performed by electric heating of the shape-memory alloy 64, which means that the transmission changeover action by the motor 31 can be started simultaneously with the completion of transmission changeover preparation, thus eliminating a delay in transmission changeover actions caused by warming up for driving. In the case of using a timer for counting the timing of starting electricity supply to the motor 31, the timer setting may be altered according to the temperature detected by a temperature sensor (not shown) provided in the camera 1. This is because the cooling time of the shape-memory alloy varies depending on the ambient temperature.

In addition to time counting with a timer as described above, the timing of ending electricity supply to the shape-memory alloy 64 may be determined by detecting resistance value when an electric current is applied to the shape-memory alloy 64 or by detecting temperature.

When the shape-memory alloy 64 heats up by electricity, the resistance value decreases in a certain relationship with this temperature. Also, the increase in temperature by electricity and an amount of shrinkage of the shape-memory alloy 64 have a certain relation. Thus, even more precise control is possible than with the time counting by the timer.

Figure 20:
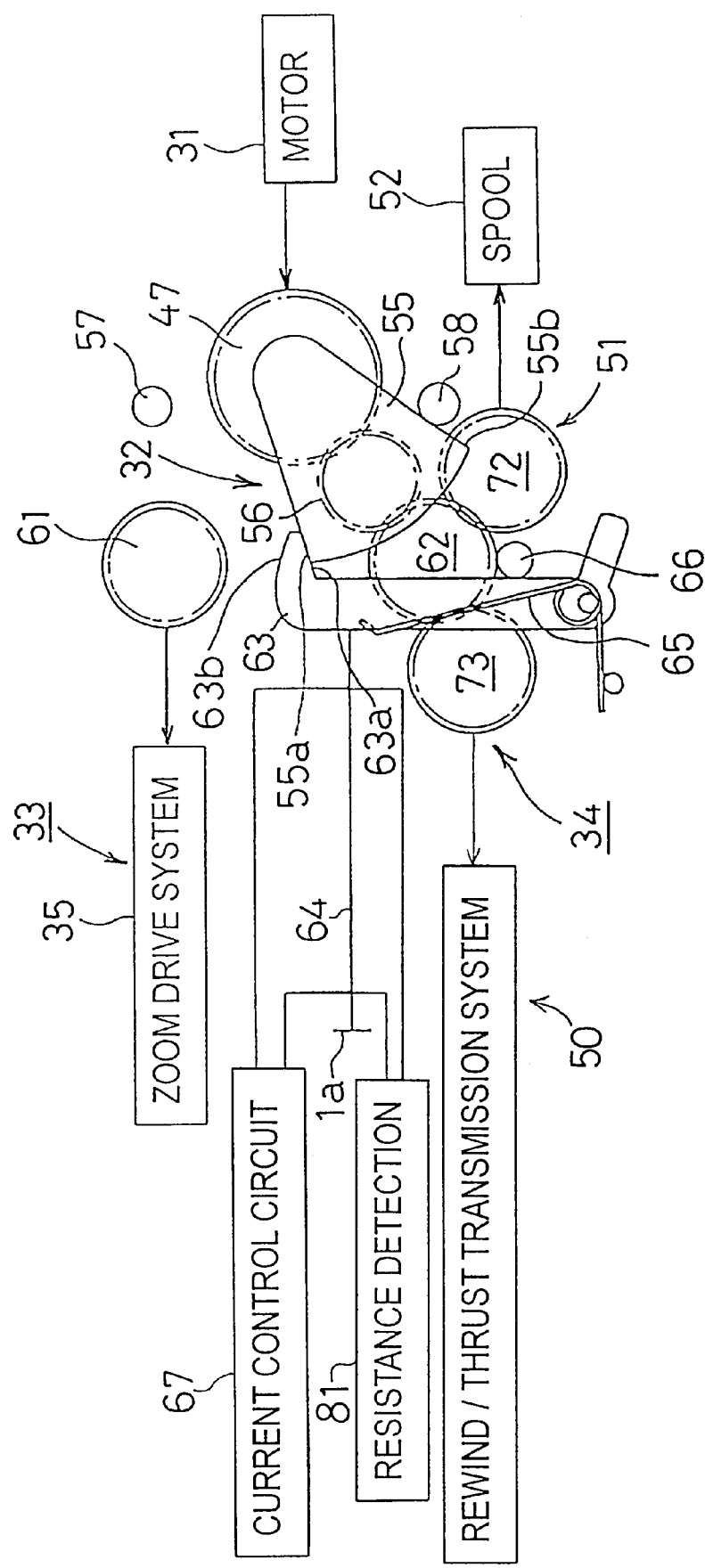
FIG. 20 is a plan view showing a transmission changeover state of a transmission changeover mechanism in a driving mechanism of a fifth example in which the film feed system is selected.
Figure 21:
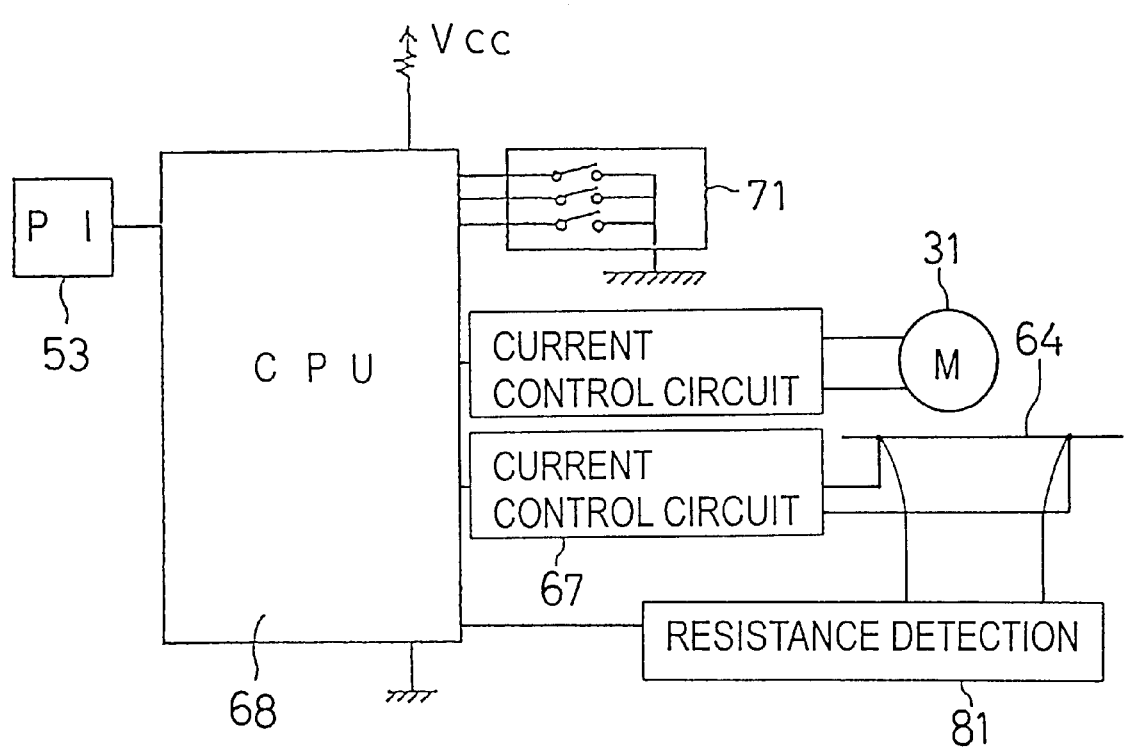
FIG. 21 is a block diagram showing a control unit of the driving mechanism of FIG. 20.
Figure 22:
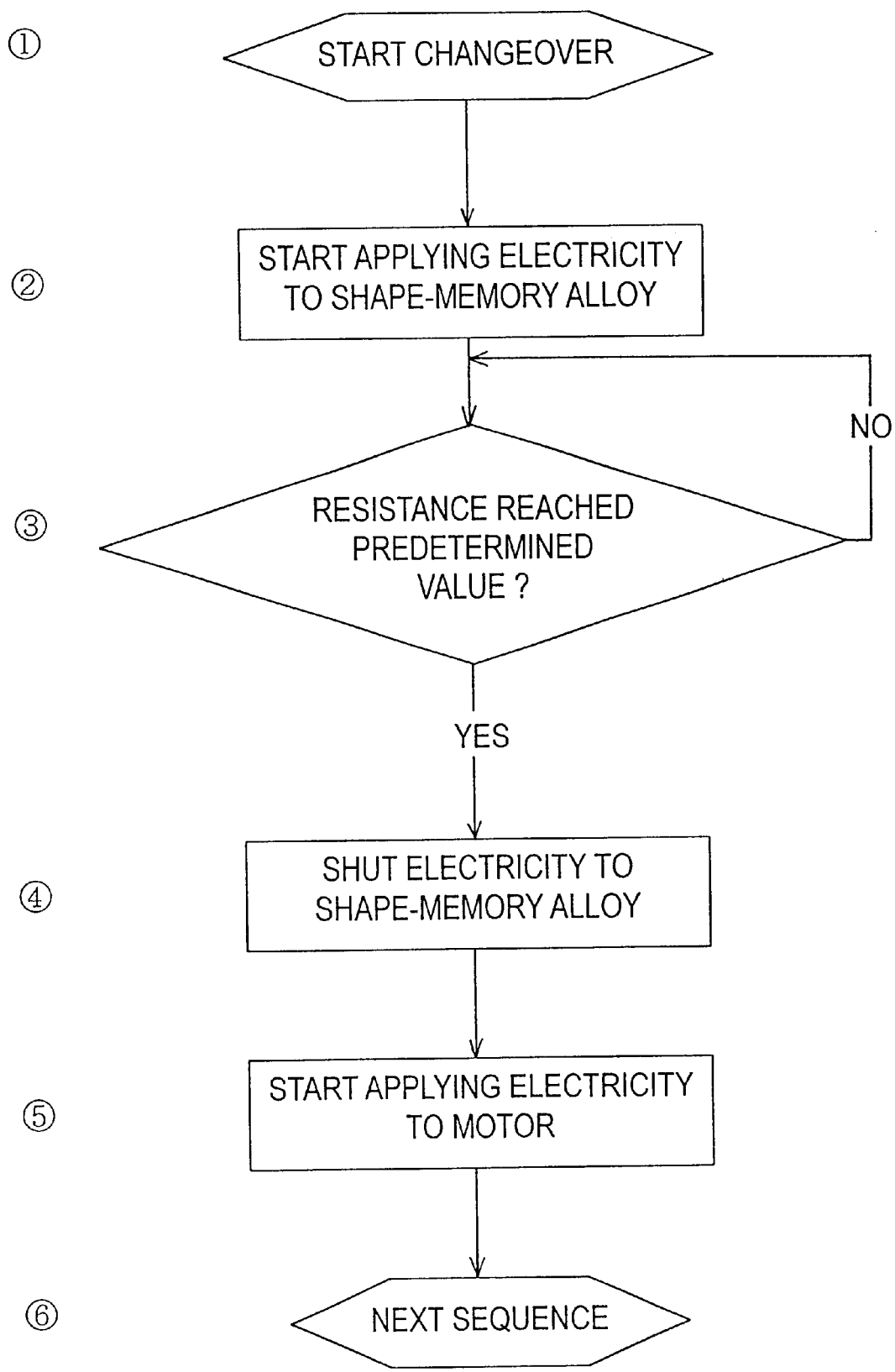
FIG. 22 is a flow chart of a sequence of transmission changeover operation of the control unit shown in FIG. 21.

FIG. 20 to FIG. 22 show a fifth example in which the resistance is detected. As shown in FIG. 20 and FIG. 21, a resistance detection sensor 81 is provided for detecting the resistance of the shape-memory alloy 64, according to which the timing of ending electricity supply to the shape-memory alloy 64 is determined. For this purpose, the resistance outputted from the resistance detection sensor 81 is inputted to the control unit 68 as shown in FIG. 21. The control unit 68 judges whether the resistance inputted from the sensor 81 is a predetermined value as in the step ③ in the flowchart of FIG. 22, and if it is the predetermined value, the electric current to the shape-memory alloy 64 is shut off. The control unit 68 performs such judgment with an inner function such as a microcomputer, but it is not limited to this. As other structures are more or less the same as the first example, like elements are given the same reference numerals, and the description thereof will be omitted.

Figure 23:
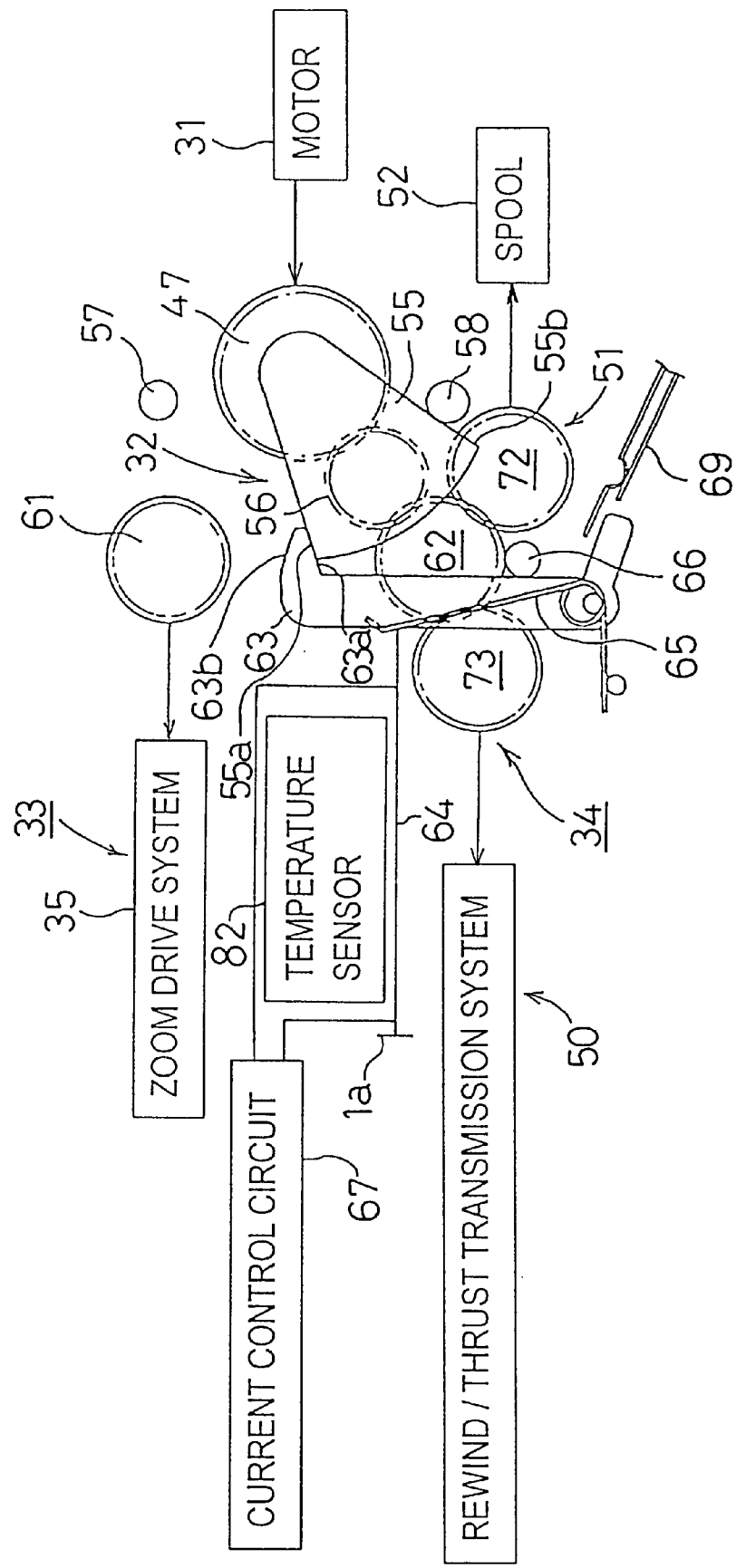
FIG. 23 is a plan view showing a transmission changeover state of a transmission changeover mechanism in a driving mechanism of a sixth example in which the film feed system is selected.
Figure 24:
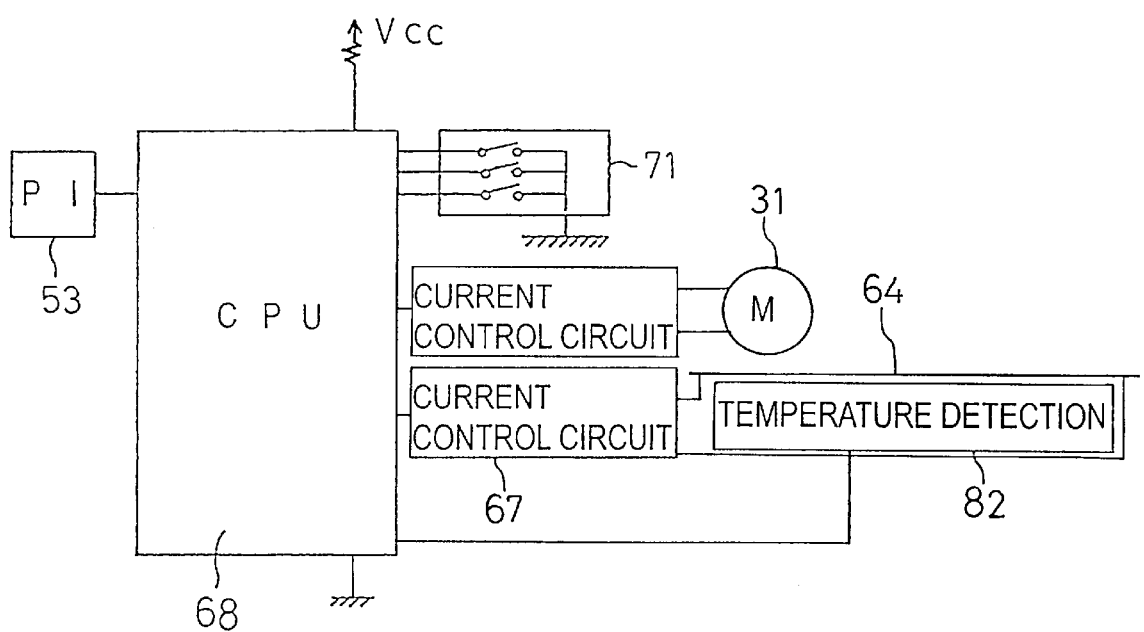
FIG. 24 is a block diagram showing a control unit of the driving mechanism of FIG. 23.
Figure 25:
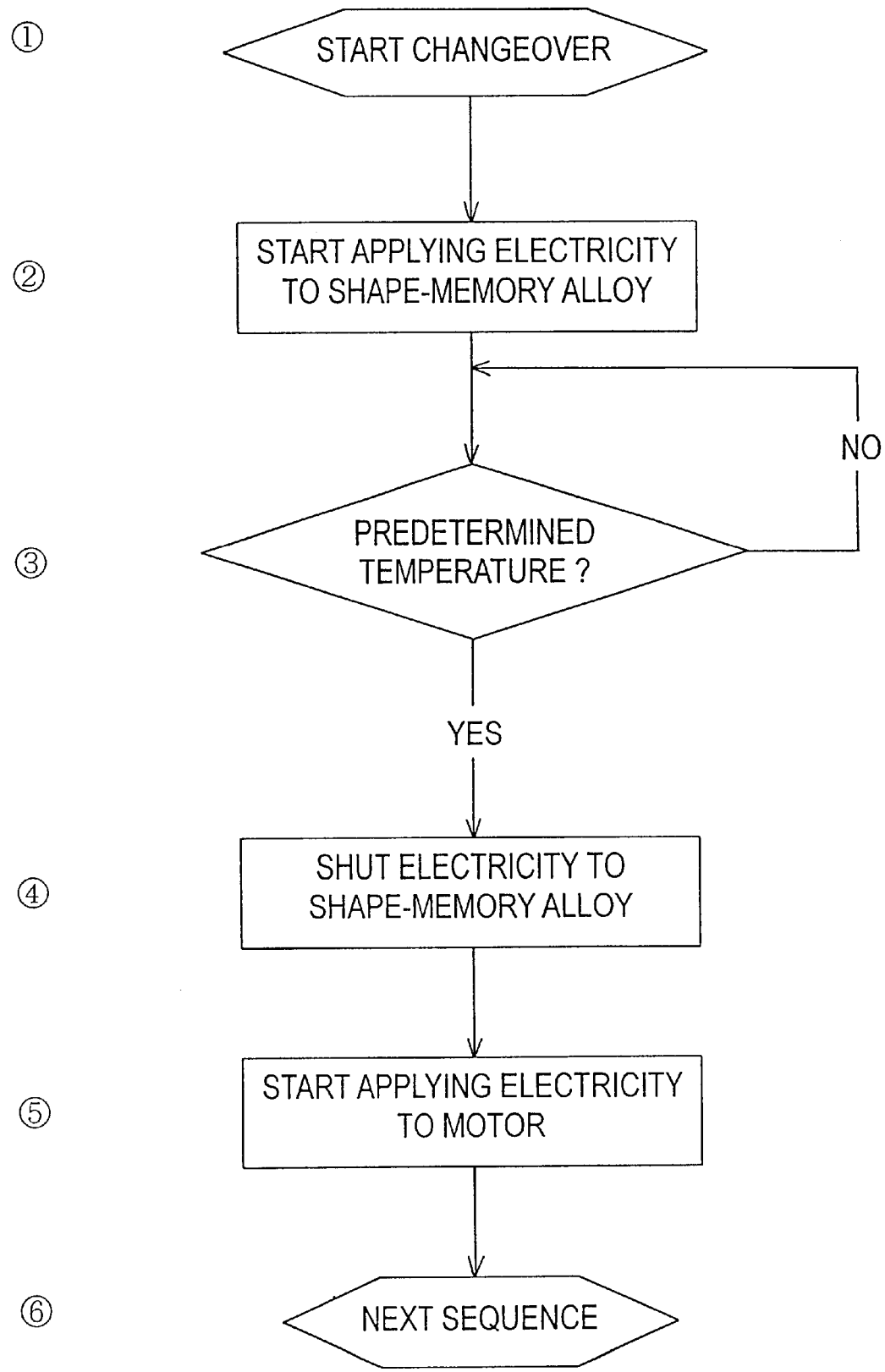
FIG. 25 is a flow chart of a sequence of transmission changeover operation of the control unit shown in FIG. 24.

FIG. 23 to FIG. 25 show a sixth example in which the temperature is detected. As shown in FIG. 23 and FIG. 24, a temperature sensor 82 is provided for detecting the temperature of the shape-memory alloy 64, according to which the timing of ending electricity supply to the shape-memory alloy 64 is determined. For this purpose, the temperature outputted from the temperature sensor 82 is inputted to the control unit 68 as shown in FIG. 24. The control unit 68 judges whether the temperature inputted from the sensor 82 is a predetermined value as in the step ③ in the flowchart of FIG. 25, and if it is the predetermined value, the electric current to the shape-memory alloy 64 is shut off. The control unit 68 performs such judgment with an inner function such as a microcomputer, but it is not limited to this. As other structures are more or less the same as the first example, like elements are given the same reference numerals, and the description thereof will be omitted.

It is of course possible to apply such method of judging a state of transformation of the shape-memory alloy 64 by detection of temperature or resistance in the fifth and sixth examples to the detection of timings in accordance with transformation of the shape-memory alloy 64 in the third and fourth examples.

The member for locking the planet lever for transmission changeover is not limited to a lever, and other members which act linearly may be employed. However, by employing a lever, the transformation stroke of shape-memory alloy 64 can be variously converted by changing the proportion of lever lengths, and it is possible to minimize the necessary transformation stroke of the shape-memory alloy 64. Also, the shape-memory alloy 64 can be disposed along a curved or crooked gap within the camera, as long as there is provided a guide such as a roller or a wall by which a linear transformation thereof can be utilized. Further, the shape-memory alloy 64 may be heated by a heater to which electricity is applied. Such heater may be coiled around the shape-memory alloy 64, arranged in the form of a cylinder, touched at the alloy 64, or disposed in the vicinity of the alloy 64. It is also possible to heat the shape-memory alloy 64 other than by electricity depending on cases.

In the above described examples 1 to 6, the transformation of shape-memory alloy 64 is used for changing over the transmission changeover unit 32 into a state of being able to switch over transmission, and the actual transmission changeover action is performed by the motor 31.

Figure 26:
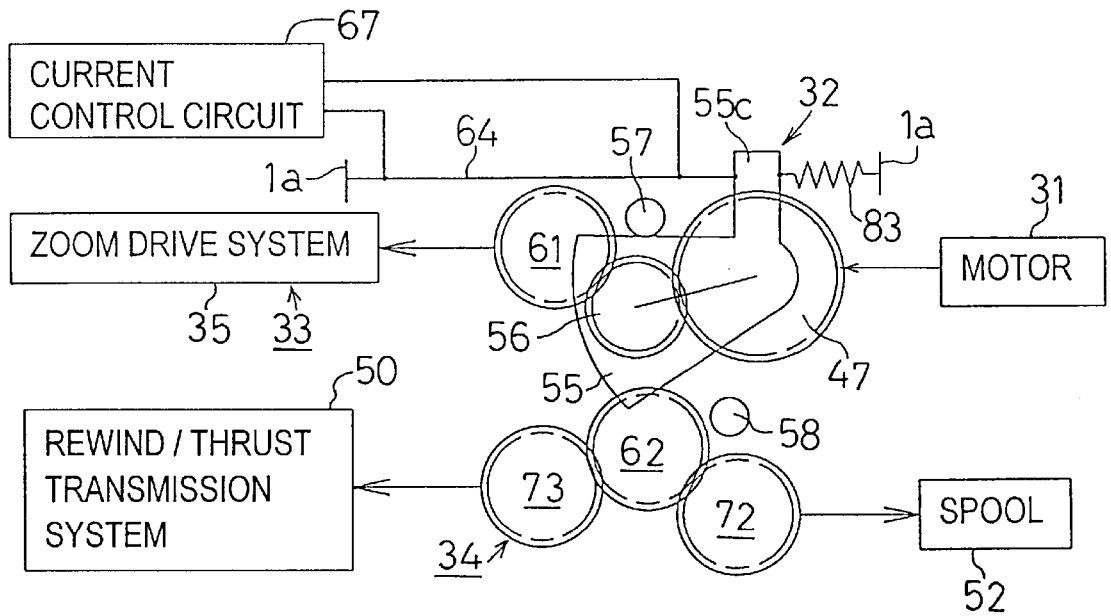
FIG. 26 is a plan view showing a transmission changeover state of a transmission changeover mechanism in a driving mechanism of a seventh example in which the zoom drive system is selected.
Figure 27:
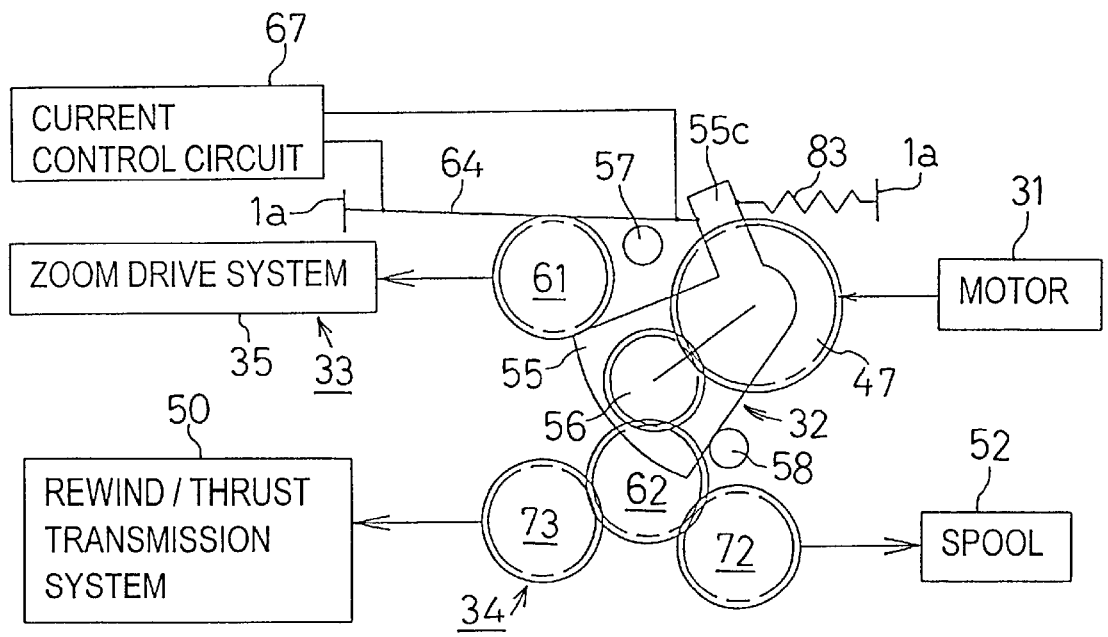
FIG. 27 is a plan view showing a transmission changeover state of a transmission changeover mechanism in the driving mechanism of FIG. 26 in which the film feed system is selected.

On the other hand, in a seventh example shown in FIG. 26 and FIG. 27, transmission changeover is achieved using the transformation of shape-memory alloy 64 for directly driving a transmission changeover means. For this purpose, the shape-memory alloy 64 is connected to the planet lever 55, as well as a spring 83 for restoration is acted between the planet lever 55 and the camera body 1a. The shape-memory alloy 64 and the spring 83 are both connected to a lever piece 55c extending from a base of the planet lever 55, but the way of connection may be freely selected. Other structures are substantially identical to those of the first to sixth examples except for specific action control of transmission changeover. Thus, like elements are given the same reference numerals and the description thereof will be omitted.

In the state shown in FIG. 26, electricity is not supplied to the shape-memory alloy 64 from the electric current control circuit 67. Thus, the shape-memory alloy 64 is in an elongated state, and the planet lever 55 is retained at a position contacting to the stopper 57 by the force of the spring 83 in the clockwise direction so as to cause the planet gear 56 to mesh with the zoom system gear 61. Accordingly, the rotation of the motor 31 in both directions is transmitted to the zoom drive system 35.

In the state shown in FIG. 27, the shape-memory alloy 64 is supplied with electricity from the electric current control circuit 67. Thus, the shape-memory alloy 64 is contracted to the memorized length to cause the planet lever 55 to rotate counterclockwise from the position shown in FIG. 26 against the force of the spring 83. By this rotation, the planet lever 55 is maintained at a position contacting to the stopper 58 so as to cause the planet gear 56 to mesh with the film feed system gear 62. Accordingly, the rotation of the motor 31 in both directions is transmitted to the rewind/thrust transmission system 50 and to the spool 52.

When electricity from the current control circuit 67 to the shape-memory alloy 64 is shutoff under the state shown in FIG. 27, the unit 32 returns to the state shown in FIG. 26 due to the shape-memory alloy 64 stretching back to a predetermined length coupled with the pulling force of the spring 83.

Control timings for starting and ending electricity supply to the shape-memory alloy 64, rotating the motor 31 in both directions or stopping the rotation may be appropriately set according to the cases, where applicable, in the examples 1 to 6 described above.

Figure 30:
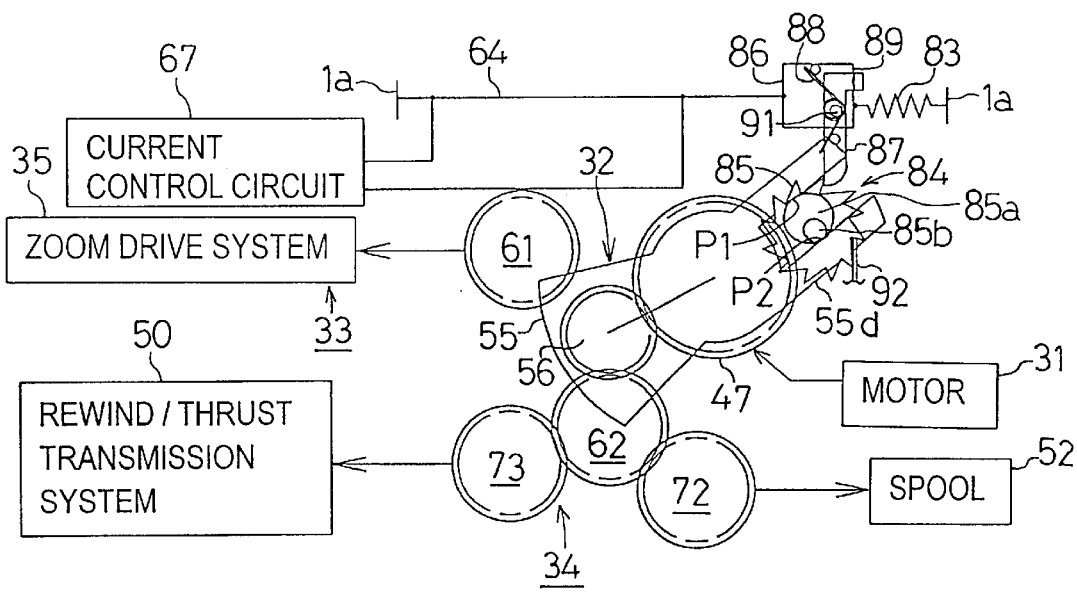
FIG. 30 is a plan view showing a transmission changeover state of a transmission changeover mechanism in a driving mechanism of FIG. 28 in which the film feed system is selected.

In an eighth example shown in FIG. 28 to FIG. 30, transmission changeover is achieved by the transmission changeover unit 32 using extension and contraction of the shape-memory alloy 64 by electricity supply in corporation with the spring 83 via a ratchet mechanism 84. The ratchet mechanism 84 includes a ratchet toothed wheel 85 comprising an eccentric cam 85a which couples to a fork 55d provided at one end of the planet lever 55 without play and a rotation shaft 85b in its center, and a movable table 86 which holds a ratchet lever 87 and is moved leftward and rightward in the figure for driving the ratchet toothed wheel 85 in a counterclockwise direction. For this reciprocating motion, the shape-memory alloy 64 is connected to the movable table 86 on a side toward which the movable table moves from the position shown in FIG. 28 to another shown in FIG. 29, whereas the spring 83 is connected to the other side toward which the movable table 86 returns from the position shown in FIG. 29 to another shown in FIG. 28. Although not shown, it will be favorable for more stable actions if a guide for guiding the reciprocating movement of the movable table 86 is provided. The ratchet lever 87 is supported around a shaft 91 on the movable table 86 and maintained at a position where a hooked portion 87a at one end thereof is contacted to a stopper surface 89 of the movable table 86 by the counterclockwise force of a spring 88 so that the ratchet lever 87 is coupled with the ratchet toothed wheel 85. The ratchet toothed wheel 85 is anyway provided with a proper means for preventing reverse rotation such as a leaf spring 92.

Other structures are substantially identical to those of the first to sixth examples except for specific action control of transmission changeover. Thus, like elements are given the same reference numerals and the description thereof will be omitted.

In the state shown in FIG. 28, electricity is not supplied to the shape-memory alloy 64 from the electric current control circuit 67, and the movable table 86 is located at its returned position. The planet lever 55 is located at a position where the planet gear 56 meshes with the zoom system gear 61, and the eccentric cam 85a is stably retained in the position shown in the figure between the fork 55d of the planet lever 55, contacting at two points P1 and P2 in a rotating direction to the fork 55d. The relation between the contacting positions of the eccentric cam 85a and the fork 55d remains identical irrespective of rotating position of the planet lever 55, so the eccentric cam 85a is held stably throughout the rotation of the planet lever 55. In the state shown in FIG. 28, the rotation of the motor 31 in both directions is transmitted to the zoom drive system 35.

In the state shown in FIG. 28, when the shape-memory alloy 64 is supplied with electricity from the electric current control circuit 67, the shape-memory alloy 64 is contracted to the memorized length to cause the movable table 86 to move leftward against the force of the spring 83. By this movement, the ratchet lever 87 coupling with the ratchet toothed wheel 85 drives it to rotate counterclockwise by one pitch as shown in FIG. 29A. Subsequently, when the electricity to the shape-memory alloy 64 from the current control circuit 67 is shut off, the shape-memory alloy 64 stretches back to its original length from the state shown in FIG. 29A and causes the movable table 86 to return to the position shown in FIG. 28 in corporation with the spring 83. At this time, the ratchet lever 87, with the rotating movement around the shaft 91 against the force of the spring 88, slides over one tooth of the ratchet toothed wheel 85 in a returning direction as shown in FIG. 29B, after which it returns to the position shown in FIG. 28 by the pulling force of the spring 88.

Such rotation drive of the ratchet toothed wheel 85 by one pitch is achieved every time the start and the end of electricity supply to the shape-memory alloy 64 is repeated with the rotation of the eccentric cam 85a, and as the ratchet toothed wheel 85 rotates, the eccentric cam 85a coupling to the fork 55d causes the planet lever 55 to rotate counterclockwise. The planet gear 56 is thereby gradually disengaged from the zoom system gear 61 and comes to mesh with the film feed system gear 62 as shown in FIG. 30 when the ratchet toothed wheel 85 is rotated substantially a half round. At this point, by stopping rotation drive of the ratchet toothed wheel 85, the rotation of the motor 31 in both directions is transmitted to the rewind/thrust transmission system 50 and to the spool 52.

When the ratchet toothed wheel 85 is further driven to rotate counterclockwise as described above from the state shown in FIG. 30, the planet lever 55 is this time rotated clockwise from the position shown in FIG. 30 to cause the planet gear 56 to approach the zoom system gear 61 and eventually mesh therewith when the ratchet toothed wheel 85 is rotated substantially a half round as shown in FIG. 28. At this point, by stopping rotation drive of the ratchet toothed wheel 85, the unit 32 returns to the state where the rotation of the motor 31 in both directions is transmitted to the zoom drive system 35.

Since the ratchet toothed wheel 85 has twelve teeth in the illustrated example, transmission is changed over from the state shown in FIG. 28 to the state shown in FIG. 30 and vice versa repeatedly in sequence by driving the ratchet toothed wheel 85 by six pitches. However, such number of rotation drive of the ratchet toothed wheel 85 for one switchover action may be variously determined, and it is possible to achieve the changeover by one rotation drive depending on cases.

Here, the start and end of the rotation drive of the ratchet toothed wheel 85 in the eighth example correspond to the start and end of electricity supply to the shape-memory alloy 64 in the examples 1 to 6. Thus, by interpreting the start and end of electricity supply to the shape-memory alloy 64 in the examples 1 to 6 as the start and end of the rotation drive of the ratchet toothed wheel 85 in the eight example, the control timings for rotating the motor 31 in both directions or stopping the motor 31 may be set according to the cases, where applicable, in the examples 1 to 6 described above. Further, in this embodiment where the eccentric cam 85a performs a switching over action, the stoppers 57, 58 as in the other examples are unnecessary.

Figure 31:
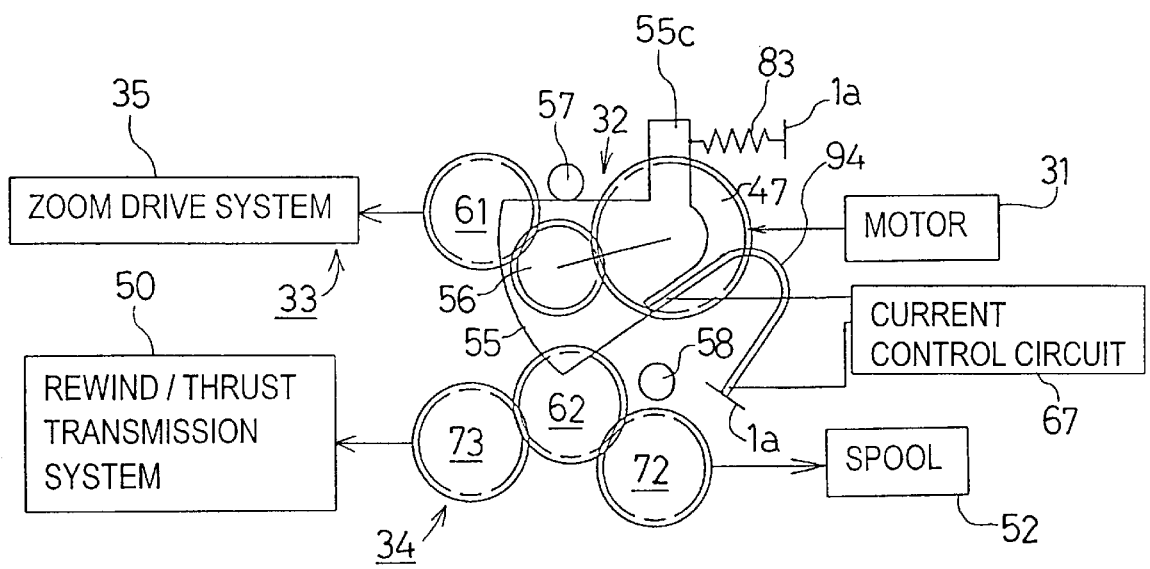
FIG. 31 is a plan view showing a transmission changeover state of a transmission changeover mechanism in a driving mechanism of a ninth example in which the zoom drive system is selected.
Figure 32:
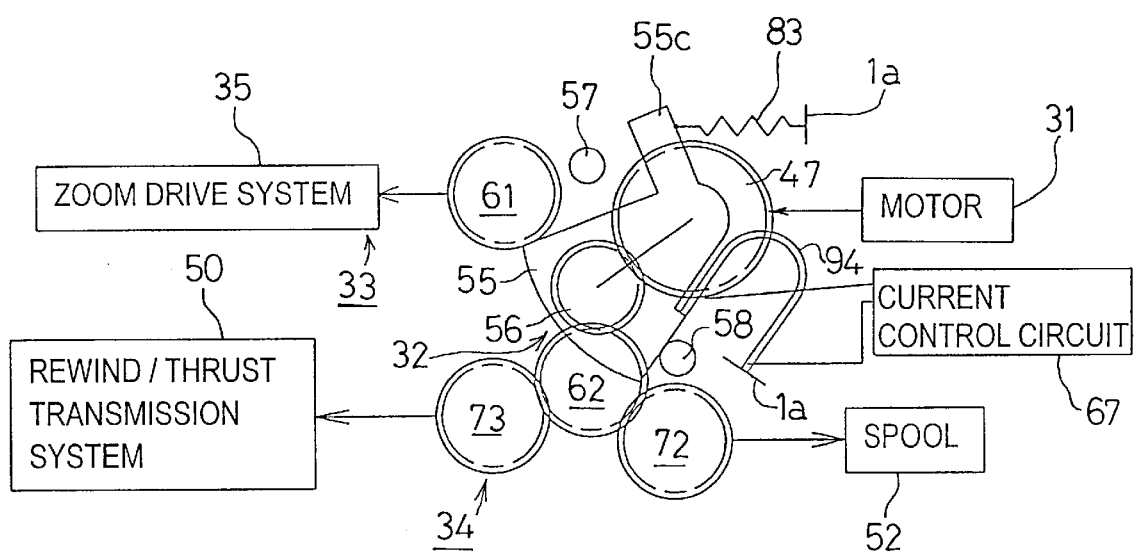
FIG. 32 is a plan view showing a transmission changeover state of a transmission changeover mechanism in a driving mechanism of FIG. 31 in which the film feed system is selected.

In a ninth example shown in FIG. 31 and FIG. 32, transmission changeover is achieved using transformation of a shape-memory alloy 94 which is provided as a part of the transmission changeover unit 32. In the illustrated example, the shape-memory alloy 94 is linked to a part of the planet lever 55 at one end, and its shape change which occurs between the plane t lever 55 side and other mounting portion on the camera body 1a side is used for transmission changeover. For example, shape change in a bending state such as a widened U-shaped form shown in FIG. 31 and a narrowed U-shaped form shown in FIG. 32 is used. A shape-memory alloy 94 of such configuration is also applicable as a part of the lock lever 63 in the first example for performing transmission changeover actions by changing over the lock lever 63 between the locking position and lock release position as required. Other structures are more or less the same as those of the seventh example. Thus, like numerals are given the same reference numerals and the description thereof will be omitted.

In the state shown in FIG. 31, electricity from the current control circuit 67 to the shape-memory alloy 94 is shut off. Thus, the shape-memory alloy 94 is bent in a wider U-shaped form, and the planet lever 55 is maintained at a position contacting to the stopper 57 by the force of the spring 83 in the clockwise direction so as to cause the planet gear 56 to mesh with the zoom system gear 61. Accordingly, the rotation of the motor 31 in both directions is transmitted to the zoom drive system 35.

In the state shown in FIG. 32, electricity is supplied from the current control circuit 67 to the shape-memory alloy 94. Thus, the shape-memory alloy 94 changes its form to the memorized narrower U-shaped state to cause the planet lever 55 to rotate against the force of the spring 83 from the position shown in FIG. 31 in the counterclockwise direction. The planet lever 55 is maintained at a position contacting to the stopper 58 by this rotation to cause the planet gear 56 to mesh with the film feed system gear 62. Accordingly, the rotation of the motor 31 in both directions is transmitted to the rewind/thrust transmission system 50 and to the spool 52.

When electricity from the current control circuit 67 to the shape-memory alloy 94 is stopped under a state shown in FIG. 32, the shape-memory alloy 94 broadens to a predetermined wider U-shaped form, and the transmission changeover unit 32 returns to the state shown in FIG. 31 in corporation with the force of the spring 83.

Control timings for starting and ending electricity supply to the shape-memory alloy 94, rotating the motor 31 in both directions or stopping the rotation may be appropriately set according to the cases, where applicable, in the examples 1 to 6 described above.

The present invention is applicable to cases where more than three driven members are selectively driven by a single motor, and not limited to the above described embodiments or examples. For example, by dividing the shape-memory alloy 64 into a plurality of parts and controlling electricity supply to each part individually, a stroke consisting of several stages can be obtained, whereby it is possible to move the planet lever 55 to a plurality of positions for selectively transmitting a drive force to more than three driven members.

It is also to be noted that the transmission changeover mechanism which has been described above can be employed not only as a mechanism in cameras but also used, for example, for transmission changeover between popping-up and retracting actions and swinging actions of a side mirror in an automobile, and that the mechanism is favorably used in various other devices in which a plurality of driven members are selectively driven by a single drive power source. Also, transformation of the shape-alloy memory to its memorized shape is not limited to the above described cases which are caused by heating depending on its material or properties.

(Fourth Embodiment)

Figure 33:
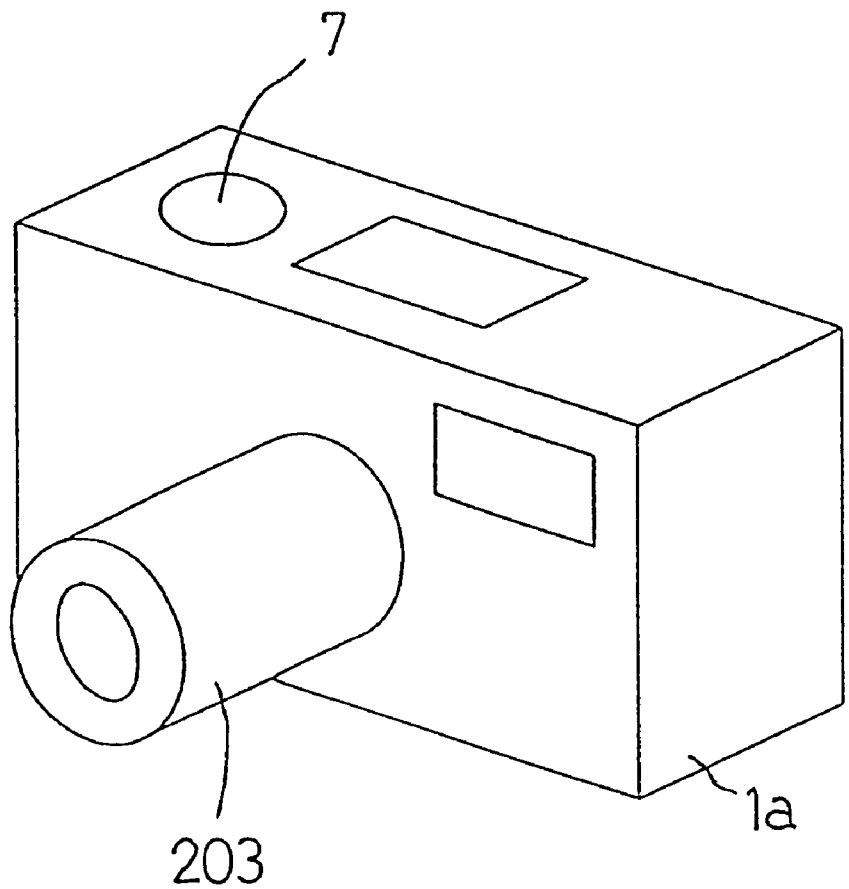
FIG. 33 is a perspective view of a camera to which a fourth embodiment of the present invention is applied.

In a fourth embodiment, the present invention is applied to a lens shutter camera as shown in FIG. 33. With this camera, a picture is taken by operating a shutter release button 7 provided at one end on the upper surface of a camera body 1a through a lens barrel 203 on the front face of the camera body 1a.

Figure 34A:
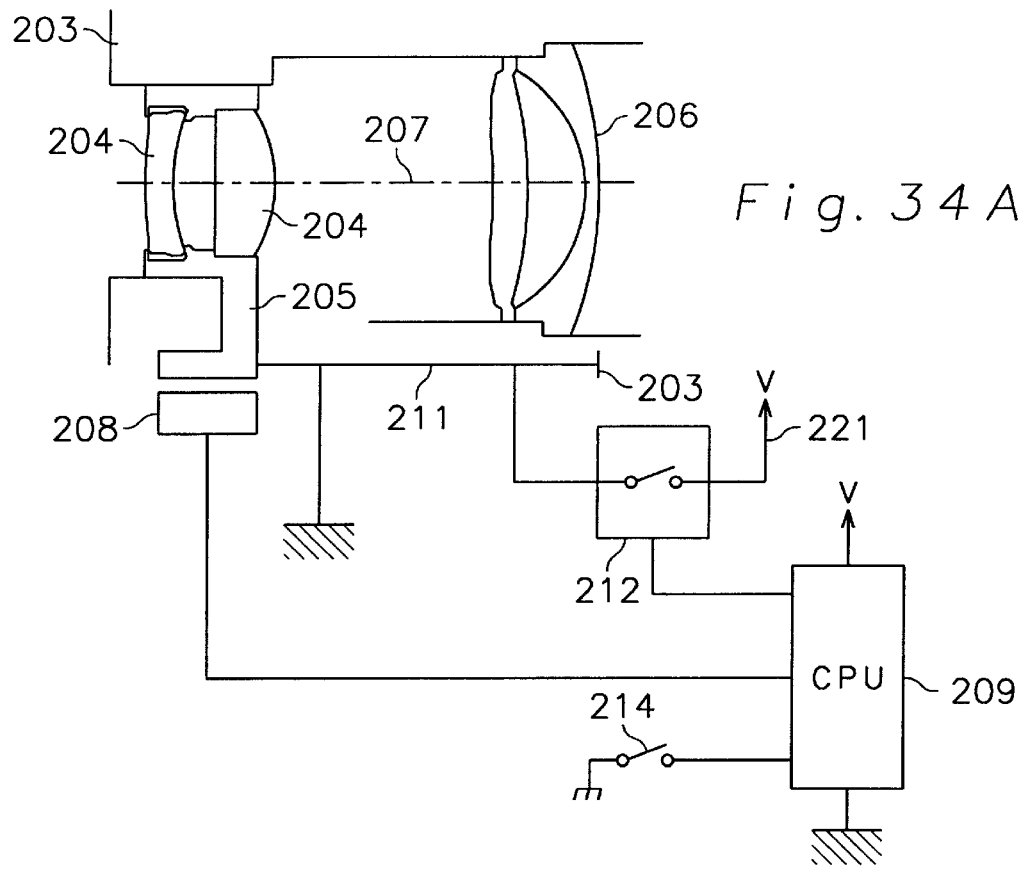
FIGS. 34A and 34B are diagrams showing a focusing mechanism of the camera of FIG. 33.

The lens barrel 203 is provided with a focusing lens 204 as shown in FIG. 34, which is fixedly supported by a focusing lens support 205.

The focusing lens support 205 is supported by the lens barrel 203 in such a way that the focusing lens 204 can move in a direction along an optical axis 207 of a filming lens system 206. Other optical lenses of the filming lens system 206 are fixedly supported with respect to the lens barrel 203.

The position of the focusing lens 204 along the direction of the optical axis 207 is detected by a position sensor 208. The position sensor 208 detects the position of the focusing lens 204 by an optical, electric, or electromagnetic method and inputs data to a control unit 209. The position sensor 208 illustrated in the figure is constructed to detect the position of the focusing lens support 205 with an optical method, and for example, the position of the focusing lens support 205 may be detected by the combination of an optical pattern (not shown) provided to the focusing lens support 205 and an optical sensor (not shown) disposed at a predetermined position of the lens barrel 203. The position of the focusing lens support 205 may be also detected with an electric method, for example, by the combination of an electric pattern provided to a prescribed position of the lens barrel 203 and a brush contact piece provided on the focusing lens support 205 side.

In order to move the focusing lens 204 along the direction of the optical axis 207 for focusing, a shape-memory alloy 211 is directly mounted to the focusing lens support 205 at one end thereof in this embodiment. The other end of the shape-memory alloy 211 is connected to the lens barrel 203 which supports the focusing lens support 205.

Although the shape-memory alloy 211 is directly connected to the focusing lens support 205 in this embodiment, in the case where the direction of displacement of the shape-memory alloy 211 and that of the focusing lens support 205 as a driven member in this embodiment are different from each other due to a restricted layout, the shape-memory alloy 211 may be bent on its middle part using a guide such as a pulley (not shown), or the direction of movement, i.e., the direction of stroke may be converted using a lever (not shown). If the movement of the driven member is a rotation, the direction of the stroke may be converted with a motion converting mechanism such as a rack and pinion. Also, as required, the amount of displacement of the shape-memory alloy 211 may be converted by changing, for example, the proportion of lever lengths in the case of using a lever or of pinion diameter in the case of using a rack and pinion. It is also possible to convert and transmit other motional properties such as displacement speed depending on motion converting mechanisms. The control unit 209 is a CPU which controls actions of the camera, but it is not limited to this, and other various control circuits may be used.

An electric wiring 221 is provided to the shape-memory alloy 211 so as to control application of an electric current to the shape-memory alloy 211 by controlling current on/off switching member 212 such as an electromagnetic switch or a switching element by the control unit 209.

Figure 34B:
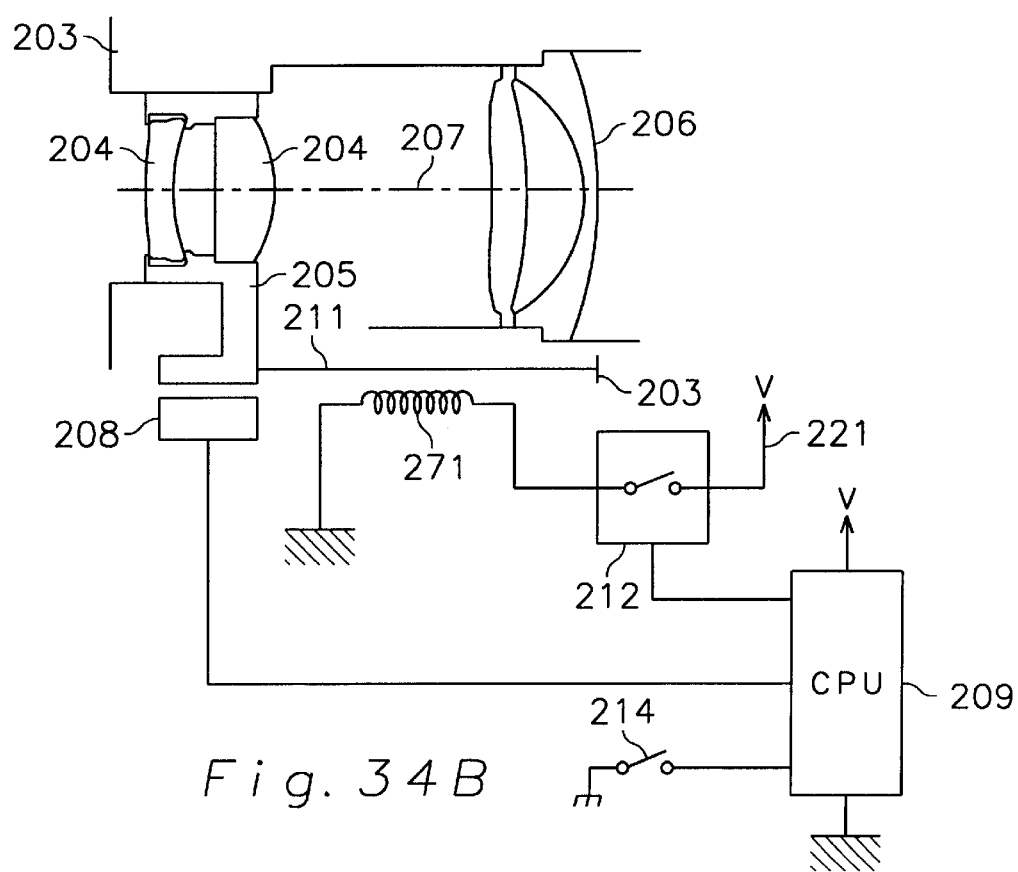

As shown in FIG. 34B, although the shape-memory alloy 211 is heated by directly applying an electric current thereto in this embodiment, a heater 271 such as a Nichrome wire which is heated by applying an electric current may be disposed in the vicinity of the shape-memory alloy 211, and the heating control of the shape-memory alloy 211 may be achieved by controlling electricity supply to such heater. It is also possible to heat the shape-memory alloy 211 other than electricity depending on cases, or to cause the alloy to displace without heating it depending on materials or types of the shape-memory alloy 211.

Figure 35:
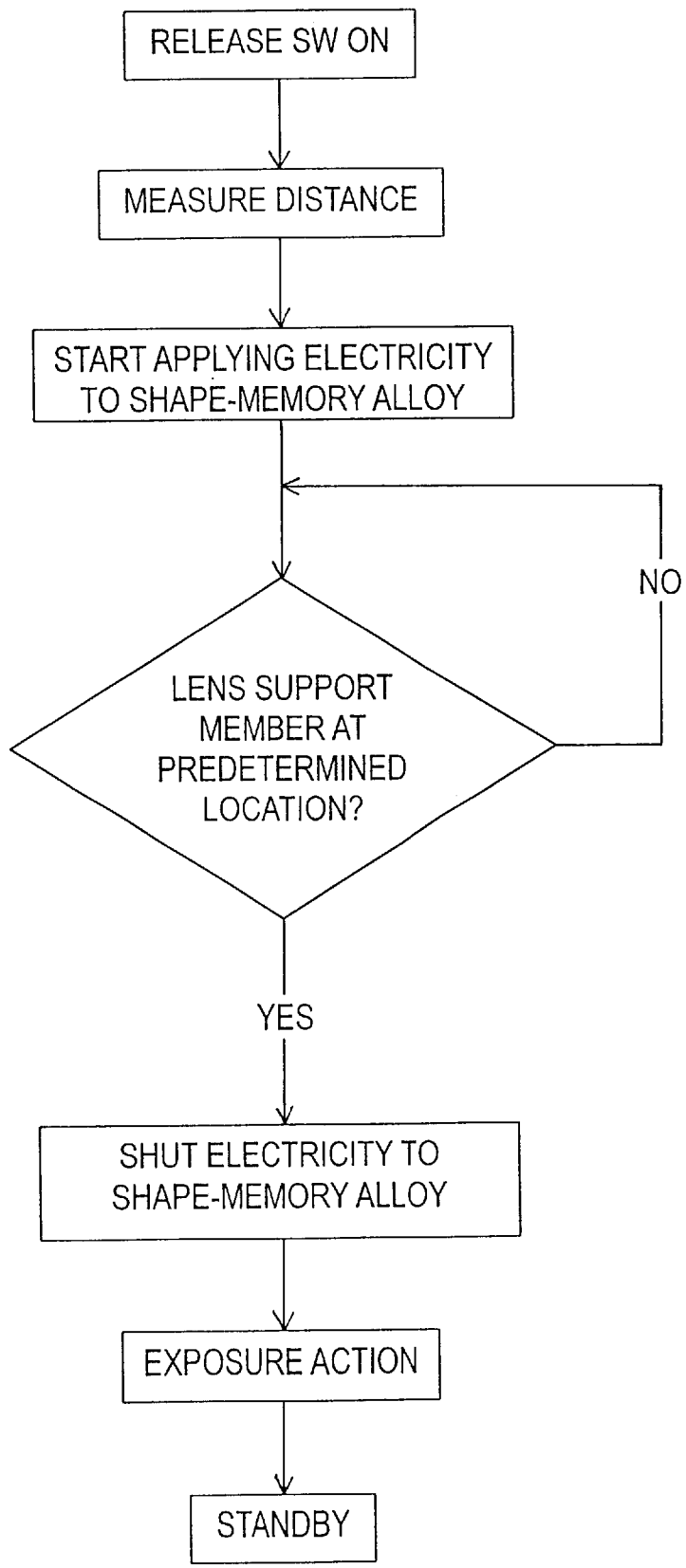
FIG. 35 is a flow chart of shooting action which involves the focusing mechanism of FIG. 34.

Next, a shooting action of the camera with focusing operation is described in accordance with the flow chart of FIG. 35.

When the shutter release button 7 shown in FIG. 33 is operated, a release operation switch 214 is turned on, and this turn-on signal is inputted to the control unit 209. In response to this, the control unit 209 prepares for shooting an object to be photographed, i.e., detects a distance to the object by a measuring means (not shown) and calculates a position where the focusing lens support 205 should be located. When this calculation is completed, the control unit 209 turns on the electric current on/off switching member 212, and starts controlling electric heating of the shape-memory alloy 211. When heated, the shape-memory alloy 211 shrinks so as to cause the focusing lens support 205 to move rightward from its home position shown in FIG. 34. The position of the focusing lens support 205 is detected by the position sensor 208, and when the focusing lens support 205 reaches a prescribed position which has been determined by the data from the measuring means, the electric current on/off switching member 212 is turned off to shut electricity to the shape-memory alloy 211. After that, a shutter (not shown) opens and closes and completes exposure to a film, by which the shooting action is ended.

As set forth above, the focusing lens support 205 as one example of driven member can be driven and moved to a position at which it needs to be located that is determined by measurement of distance, using transformation of the shape-memory alloy 211 by heating. Especially in this case, the condition of the shape-memory alloy 211 heated by the electric wiring 221 as one example of heating means is controlled by the control unit 209 as one example of a controlling means based on data on the position of the focusing lens support 205 with the position sensor 208. Thus, it is possible not only to move the focusing lens support 205 to a requested position by the transformation of the shape-memory alloy 211 by heating, but also to cause the same to remain at the same position, without generating any noises which would be caused by vibration of motors or toothed gears meshing with each other. Also, unlike a gear transmission system, there is no such disadvantage as to errors in position control caused by backlash. Since the transformation of the shape-memory alloy 211 is made linearly, the volume required for the mechanism is small and, for example, the mechanism can be installed between a cover and the main body of the camera, by which the space is saved, permitting the camera to be compact.

Also, as the shape-memory alloy 211 is directly connected at its one end to a lens barrel 203 side which is a support member for movably supporting the focusing lens support 205 as a driven member and directly fixed at the other end to the focusing lens support 205 which is the driven member, the transformation of the shape-memory alloy 211 by heating can be directly acted for driving and moving the focusing lens support 205 to a required position, the structure is simplified, errors in movement will be minimized, and response speed will be increased.

(Fifth Embodiment)

Figure 36:
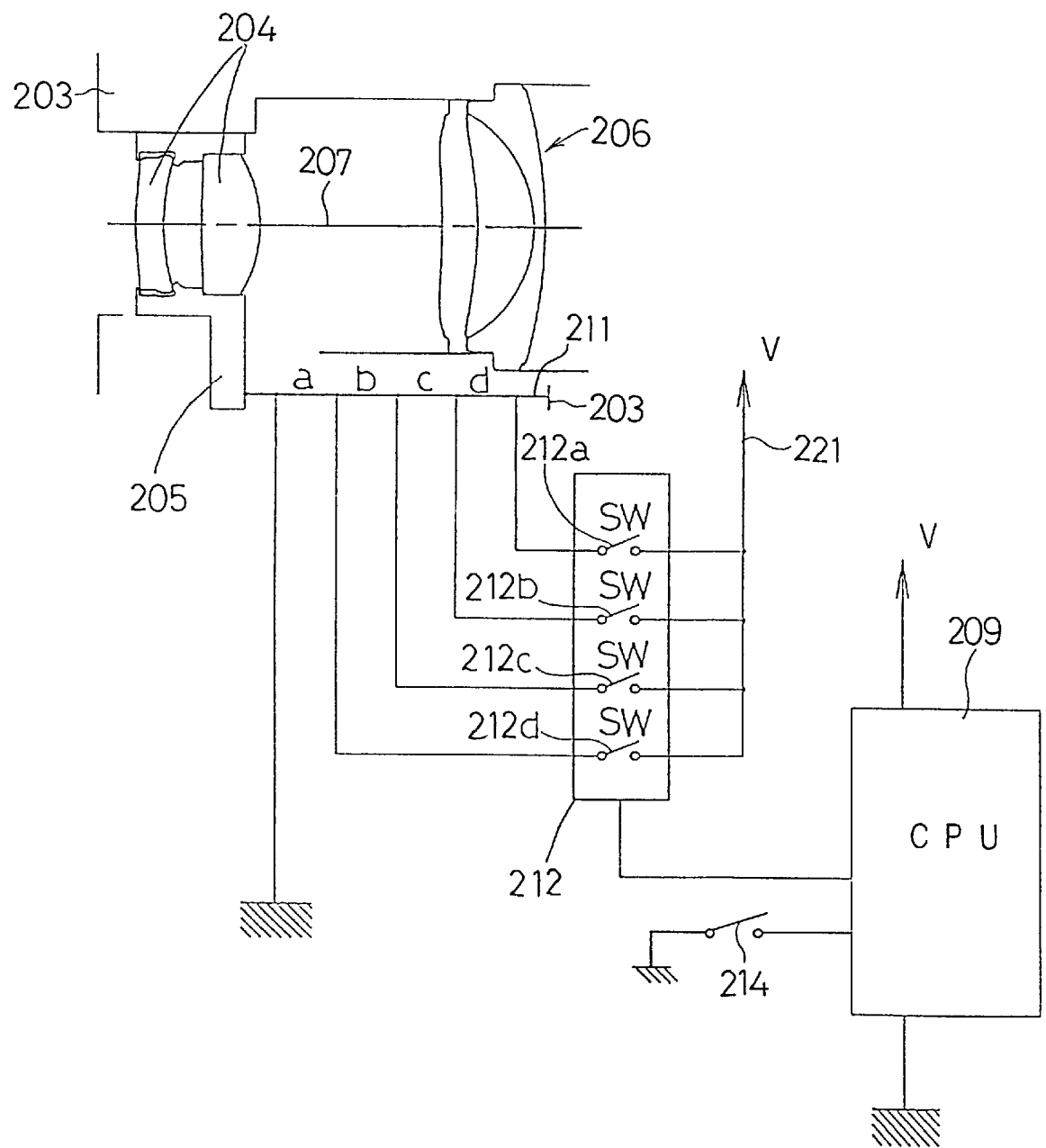
FIG. 36 is a diagram showing a focusing mechanism in a fifth embodiment of the present invention.

In a fifth embodiment, as shown in FIG. 36, the shape-memory alloy 211 between the focusing lens support 205 which fixedly supports the focusing lens 204 and the lens barrel 203 is divided into several parts, and provided with electric wiring 221 for partial electricity supply.

As shown, the shape-memory alloy 211 is divided into four parts a, b, c, and d.

When a first switch 212a of the electric current on/off switching member 212 is turned on, the shape-memory alloy 211 is supplied with an electric current through all the parts a–d, and the shape-memory alloy 211 is shortened by a certain amount $\Delta 1$, to cause the focusing lens support 205 to move rightward by the amount $\Delta 1$.

When a second switch 212b is turned on, parts a to c of the shape-memory alloy 211 are supplied with an electric current, and the shape-memory alloy 211 is shortened by a certain amount $\Delta 2$, to cause the focusing lens support 205 to move rightward by the amount $\Delta 2$.

When a third switch 212c is turned on, parts a to b of the shape-memory alloy 211 are supplied with an electric current, and the shape-memory alloy 211 is shortened by a certain amount $\Delta 3$, to cause the focusing lens support 205 to move rightward by the amount $\Delta 3$.

When a fourth switch 212d is turned on, the part a of the shape-memory alloy 211 is supplied with an electric current, and the shape-memory alloy 211 is shortened by a certain amount $\Delta 4$, to cause the focusing lens support 205 to move rightward by the amount $\Delta 4$.

Since there is a relation of $\Delta 1 > \Delta 2 > \Delta 3 > \Delta 4$ between these parts a to d, a predetermined amount of displacement of the focusing lens support 205 can be obtained by selectively turning on the switches 212a to 212d.

As described above, dividing a shape-memory alloy 211 of a straight form which transforms to its memorized shape linearly into a plurality of parts and heating these parts selectively permit choices of displacement amount of the shape-memory alloy 211. But then, if the shape-memory alloy 211 is divided into parts a to d with different lengths or different transformation amount into a memorized shape, various kinds of displacement amount as many as the number of divided parts can be achieved only by selecting one part to which electricity is supplied. Combining this with the selection of numbers of parts to which electricity is supplied will permit an even wider range of choices of displacement amount.

Other structures and effects are substantially identical to those of the fourth embodiment. Like elements are given the same reference numerals and the description thereof will be omitted.

Figure 37:
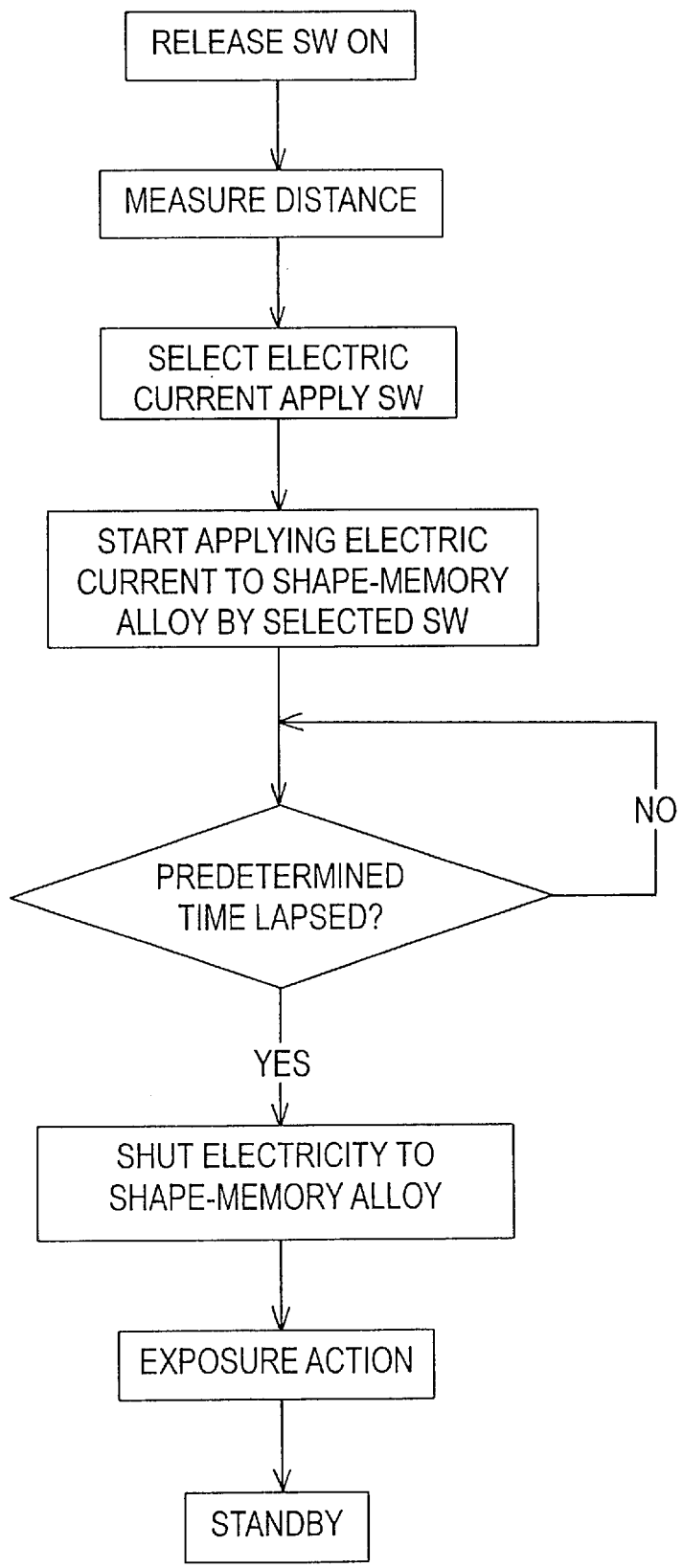
FIG. 37 is a flow chart of shooting action which involves the focusing mechanism of FIG. 36.

Next, a shooting action of the camera with focusing operation is described in accordance with the flow chart of FIG. 37.

When the shutter release button 7 is operated, a distance to the object to be photographed is detected by a measuring means (not shown) and a position where the focusing lens support 205 should be located is calculated, in response to which the control unit 209 decides which switches 212a to 212d of the electric current on/off switching member 212 should be turned on. When the switch which has been selected by the control unit 209 is turned on and electricity is supplied to the shape-memory alloy 211, the part of the alloy to which electricity is supplied shrinks so as to cause the focusing lens support 205 to move rightward from its home position shown in FIG. 36. After a predetermined period of time for allowing the shape-memory alloy 211 to transform has passed, electricity supply to the shape-memory alloy 211 is shut off by controlling the electric current on/off switching member 212. After that, a shutter (not shown) opens and closes and completes exposure to a film, by which the shutter release action is ended.

(Sixth Embodiment)

Figure 38:
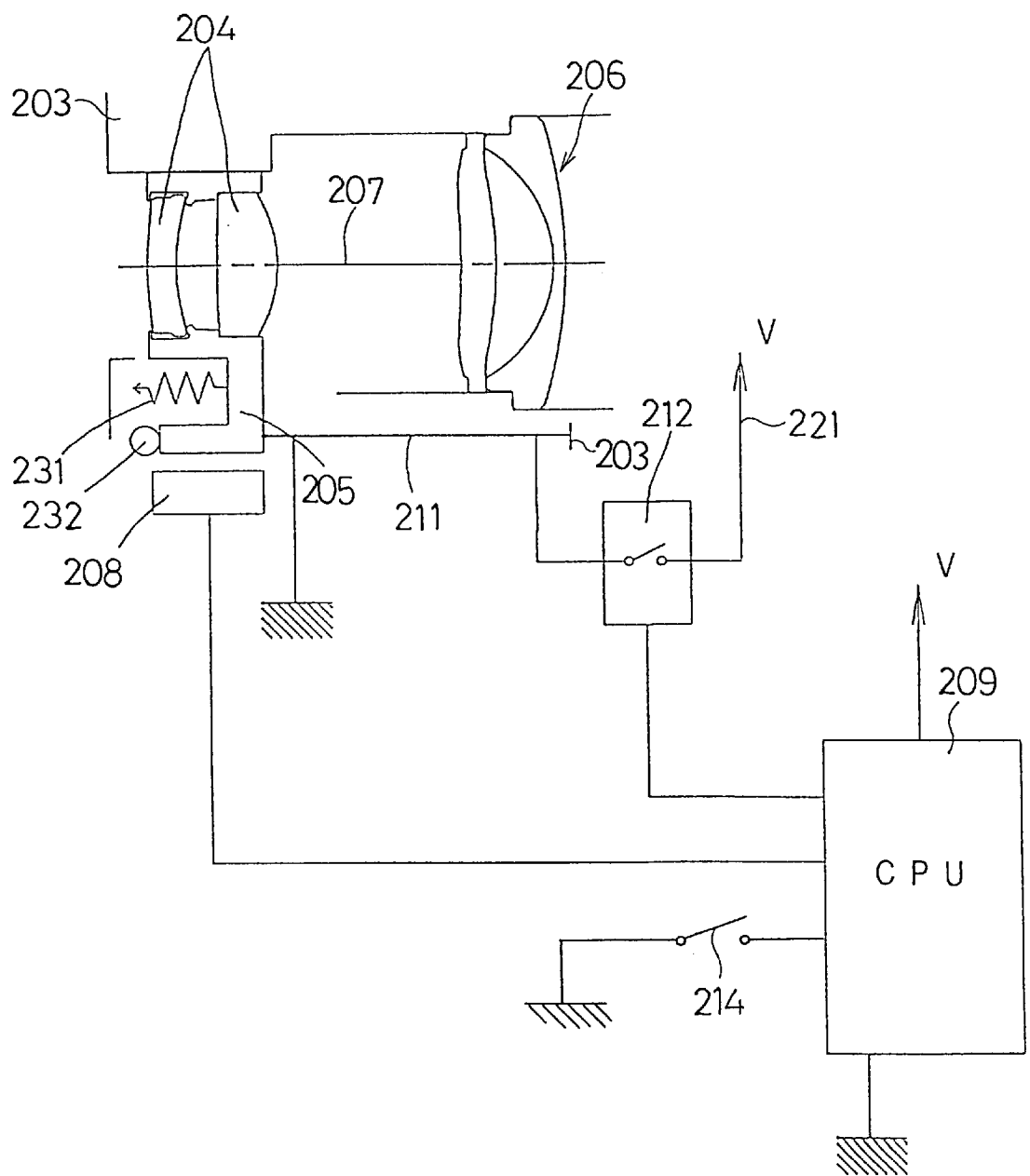
FIG. 38 is a diagram showing a focusing mechanism in a sixth embodiment of the present invention.

In a sixth embodiment shown in FIG. 38, the focusing lens support 205 to which the shape-memory alloy 211 is connected is provided with a spring 231 which biases the support 205 toward a direction opposite to the direction of movement of the shape-memory alloy 211 when transformed by heating. The shape-memory alloy 211 is normally transformed by the pulling force of the spring 231 and stretched longer than the memorized shape, retaining the focusing lens support 205 at its home position contacting to a stopper 232.

Other structures and effects are substantially identical to those of the fourth embodiment. Thus, like elements are given the same reference numerals and the description thereof will be omitted.

Figure 39:
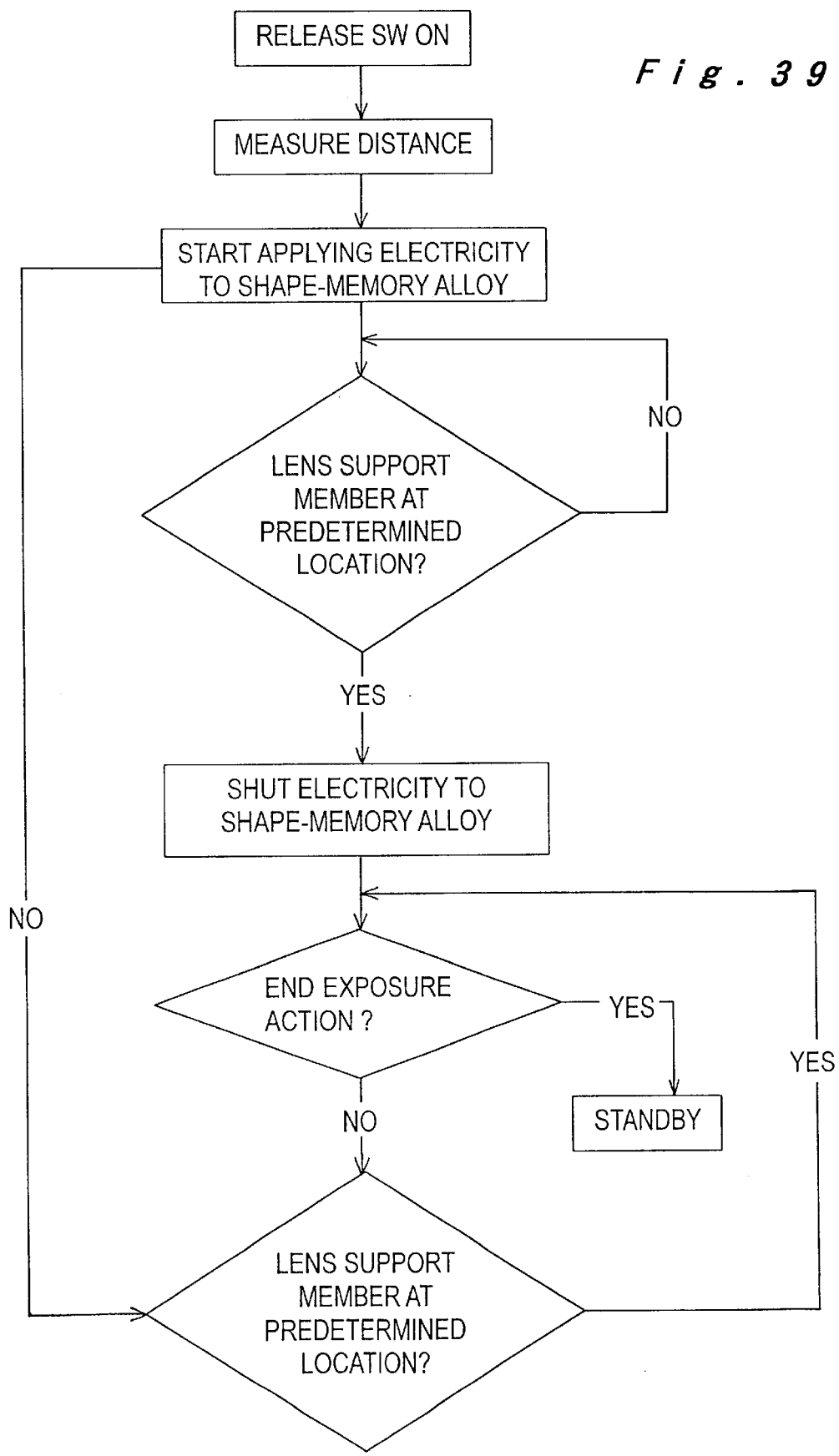
FIG. 39 is a flow chart of shooting action which involves the focusing mechanism of FIG. 38.

Next, a shooting action of the camera with focusing operation is described in accordance with the flow chart of FIG. 39.

When the shutter release button 7 is operated, a distance to the object to be photographed is detected by a measuring means (not shown) and a position where the focusing lens support 205 should be located is calculated, in response to which the control unit 209 starts control of electric heating to the shape-memory alloy 211. When heated, the shape-memory alloy 211 shrinks so as to cause the focusing lens support 205 to move rightward from its home position shown in FIG. 38 against the force of the spring 231. The position of the focusing lens support 205 is detected by the position sensor 208, and when the focusing lens support 205 reaches a prescribed position which has been determined by the data from the measuring means, the electric current on/off switching member 212 is turned off to shut electricity to the shape-memory alloy 211. When electricity is shut off, the shape-memory alloy 211 cools down gradually and decreases its transforming force, in accordance with which the focusing lens support 205 moves leftward in FIG. 38 by the force of the spring 231. Since this movement is detected by the position sensor 208, if the focusing lens support 205 is displaced from a position determined by the data from the measuring means, electricity supply to the shape-memory alloy 211 is restarted by controlling the electric current on/off switching member 212. It is thus possible to maintain the focusing lens support 205 to stay at a predetermined position by controlling on/off switchover of electricity based on the data from the position sensor 208.

There is another such possible method as described below, in which heating element such as the electric wiring 221 is controlled based on the data from a displacement detecting means of the shape-memory alloy 211 such as the position sensor 208.

When the shutter release button 7 is operated, a distance to the object to be photographed is detected by a measuring means (not shown) and a position where the focusing lens support 205 should be located is calculated, in response to which the control unit 209 starts control of electric heating to the shape-memory alloy 211. When heated, the shape-memory alloy 211 shrinks so as to cause the focusing lens support 205 to move rightward from its home position shown in FIG. 38 against the force of the spring 231. The position of the focusing lens support 205 is detected by the position sensor 208, and when the focusing lens support 205 reaches a prescribed position which has been determined by the data from the measuring means, an electric current supply to the shape-memory alloy 211 is adjusted by controlling the electric current on/off switching member 212. Although the focusing lens support 205 is biased leftward in FIG. 38 by the spring 231, the pulling force of the spring 231 and the transforming force of the shape-memory alloy 211 are balanced by adjusting the electric current so as to maintain the focusing lens support 205 to be at a predetermined position. The electric current amount may be varied depending on the position of the focusing lens support 205, i.e., the force of the spring 231.

While the focusing lens support 205 is retained at a predetermined location, a shutter (not shown) opens and closes and completes exposure to a film, by which the shutter release action is ended. After that, electricity supply to the shape-memory alloy 211 is shut off by controlling the electric current on/off switching member 212, by which the shape-memory alloy 211 cools down gradually and decreases its transforming force. In accordance with this, the focusing lens support 205 moves leftward in FIG. 38 by the force of the spring 231, until it strikes the stopper 232, which is its home position.

(Seventh Embodiment)

Figure 40:
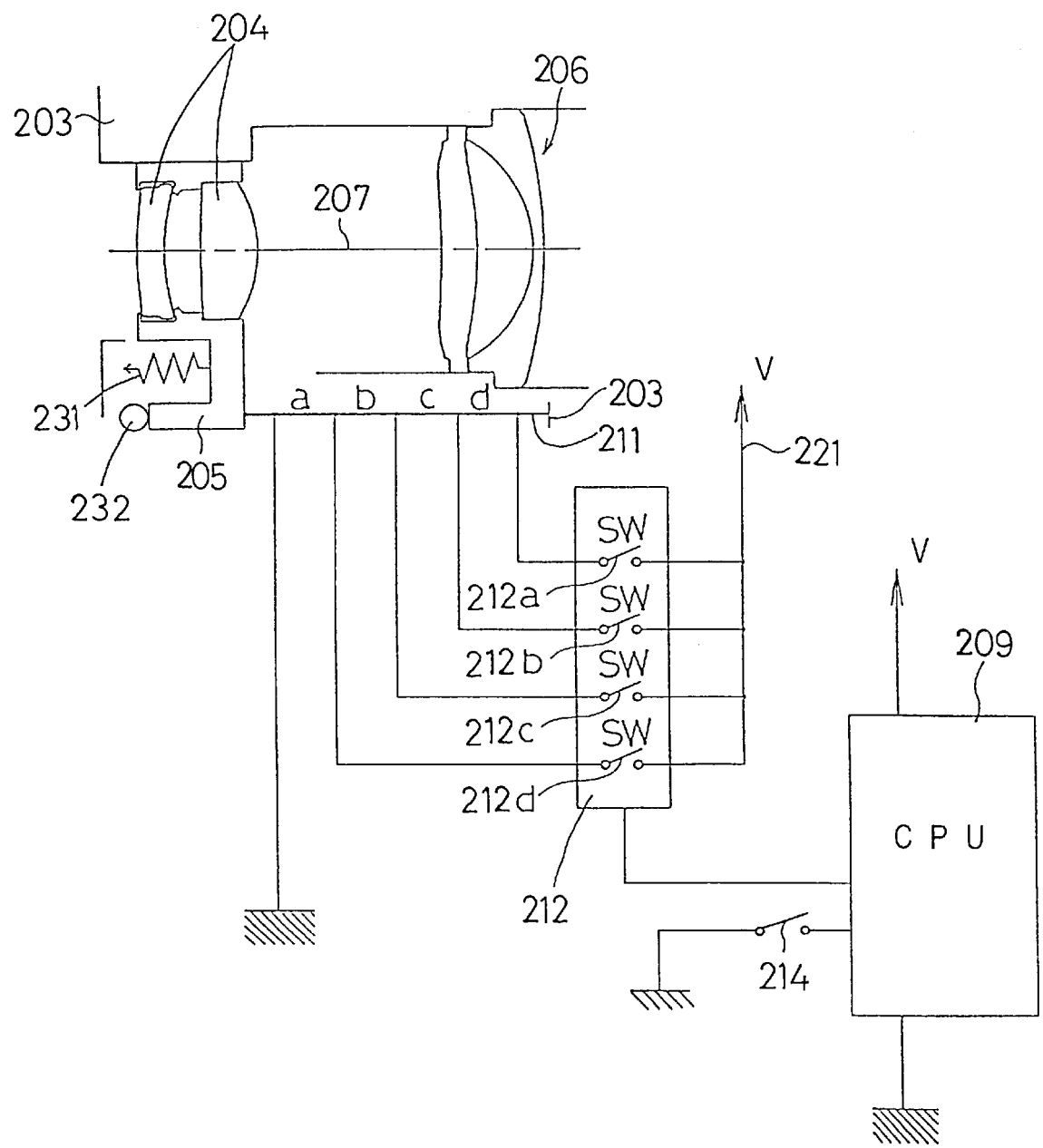
FIG. 40 is a diagram showing a focusing mechanism in a seventh embodiment of the present invention.

In a seventh embodiment shown in FIG. 40, the shape-memory alloy 211 of the fifth embodiment which is divided into parts a to d is employed in the configuration of the sixth embodiment, by which electricity is supplied partially by the switches 212a to 212d of the electric current on/off switching member 212. Other structures and effects are substantially identical to those of the sixth embodiment. Thus, like elements are given the same reference numerals and the description thereof will be omitted.

Figure 41:
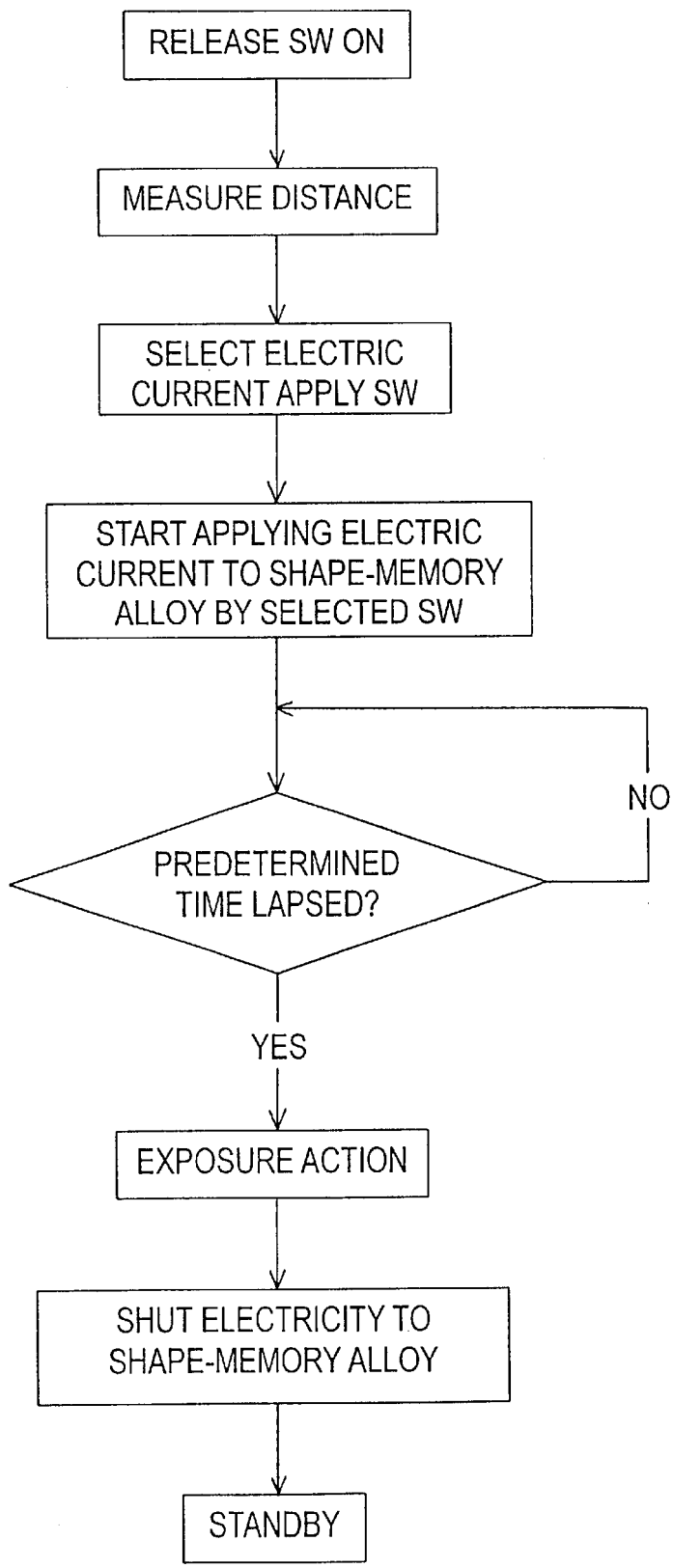
FIG. 41 is a flow chart of shooting action which involves the focusing mechanism of FIG. 40.

Next, a shooting action of the camera with focusing operation is described in accordance with the flow chart of FIG. 41.

When the shutter release button 7 is operated, a distance to the object to be photographed is detected by a measuring means (not shown) and a position where the focusing lens support 205 should be located is calculated, in response to which the control unit 209 decides which switches 212a to 212d of the electric current on/off switching member 212 should be turned on. When the switch which has been selected by the control unit 209 is turned on and electricity is supplied to the predetermined part from a to d of the shape-memory alloy 211, this part of the alloy to which electricity is supplied shrinks so as to cause the focusing lens support 205 to move rightward from its home position shown in FIG. 40. After a predetermined period of time for allowing the shape-memory alloy 211 to transform has passed, a shutter (not shown) opens and closes and completes exposure to a film, by which the shutter release action is ended.

After that, electricity supply to the shape-memory alloy 211 is shut off by controlling the electric current on/off switching member 212, by which the shape-memory alloy 211 cools down gradually and decreases its transforming force. In accordance with this, the focusing lens support 205 moves leftward in FIG. 40 by the force of the spring 231, until it strikes the stopper 232, which is its home position.

(Eighth Embodiment)

Figure 42:
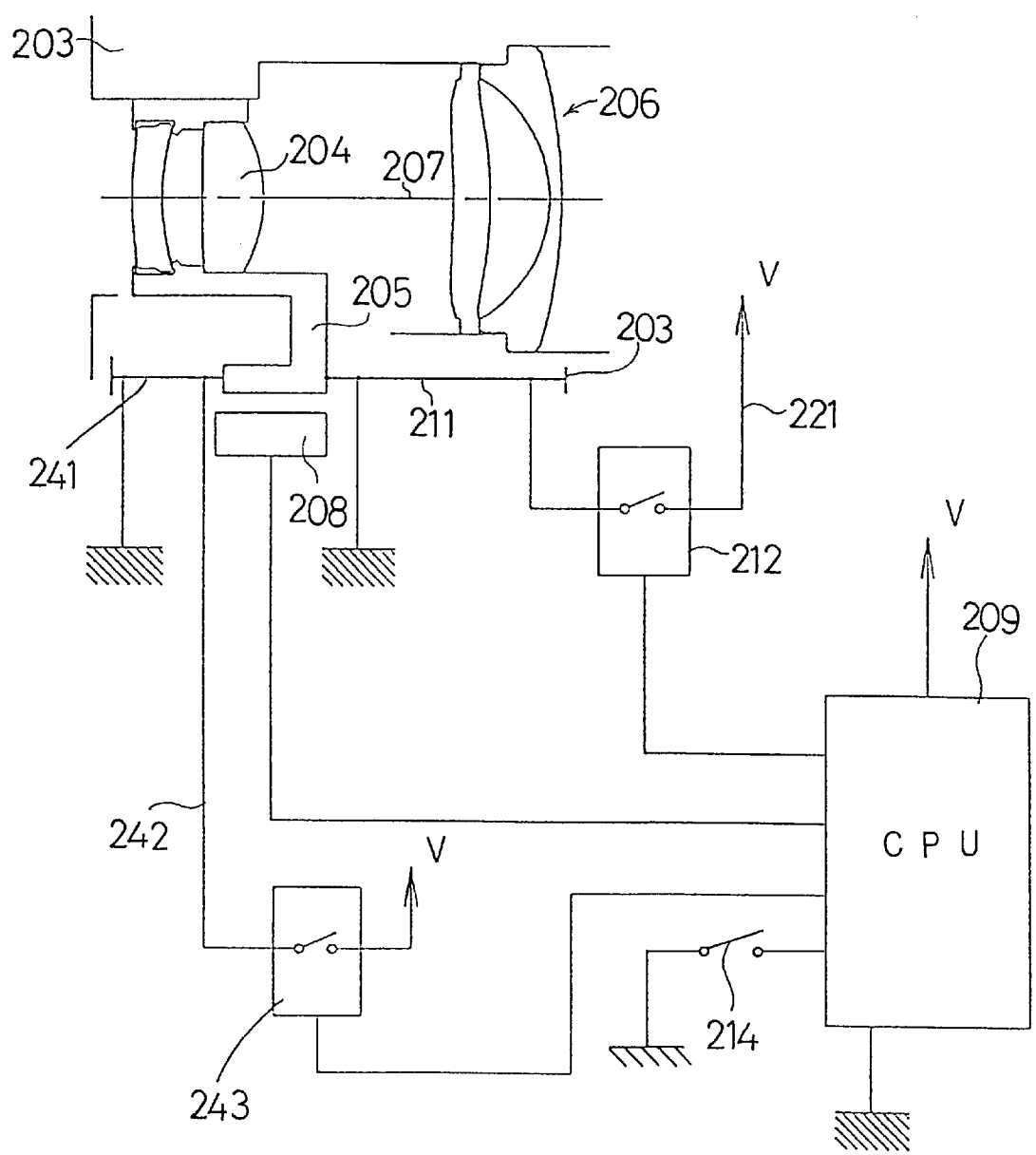
FIG. 42 is a diagram showing a focusing mechanism in an eighth embodiment of the present invention.

In an eighth embodiment shown in FIG. 42, the focusing lens support 205 as the driven member to which the shape-memory alloy 211 is connected is provided with a second shape-memory alloy 241 which transforms by heating such as to drive the focusing lens support 205 in a direction opposite to the driving direction of the shape-memory alloy 211. This second shape-memory alloy 241 is also provided with an electric wiring 242 for supplying electricity, and on/off switchover is controlled by the control unit 209 by controlling an electric current on/off switching member 243 provided to the electric wiring 242, similarly like the first shape-memory alloy 211.

Other structures and effects are substantially identical to those of the fourth embodiment. Thus, like elements are given the same reference numerals and the description thereof will be omitted.

In such a configuration, after heating the shape-memory alloy 211 for driving by its transformation the focusing lens support 205 to move to a predetermined position, the second shape-memory alloy 241 is heated, by which the focusing lens support 205 can be swiftly returned to its home position due to the quick transformation of the alloy. Accordingly, it is possible to prepare promptly for a next shooting action.

(Ninth Embodiment)

Figure 43:
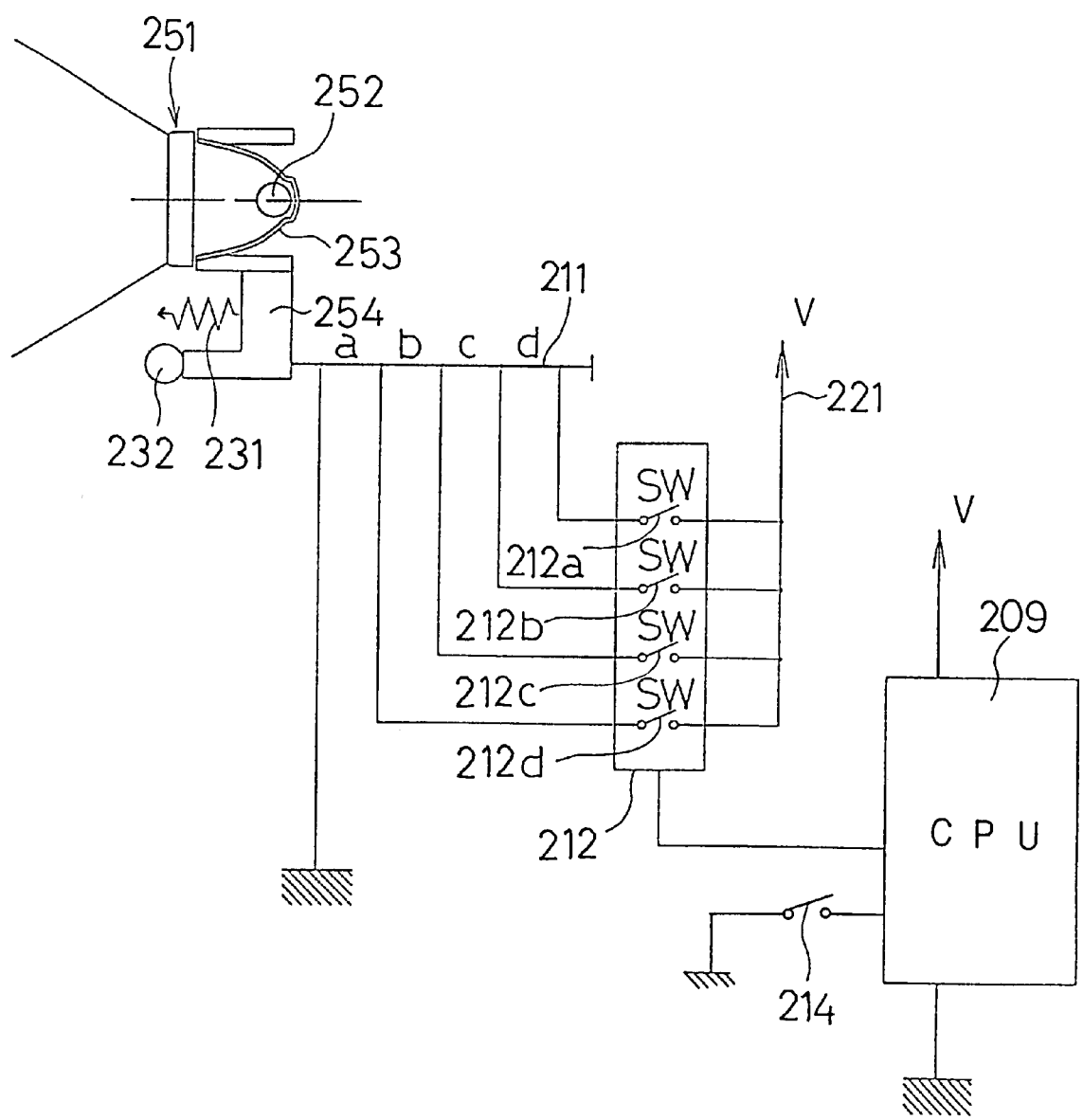
FIG. 43 is a diagram showing a zooming mechanism of a lash in a ninth embodiment of the present invention.

In a ninth embodiment shown in FIG. 43, the driven member is applied to zoom drive of an electronic flash 251 in cameras. A position control driving mechanism which is substantially the same as that provided to the focusing lens support 205 in the seventh embodiment is acted to a zooming flash support 254 which supports a light source 252 for the flash 251 and a reflection umbrella 253. More specifically, the zooming flash support 254 is connected to the shape-memory alloy 211 which is divided into four parts a to d for causing the support 254 from its home position to a position according to a distance to an object to be photographed which is detected by the measuring means, and further provided with the spring 231 for causing the zooming flash support 254 to return to the home position which is defined by the stopper 232. The control unit 209 decides which part of the shape-memory alloy 211 should be supplied with electricity, and controls electricity supply through the electric current on/off switching member 212.

By this configuration, when zooming operation is performed to the camera, a position where the zooming flash support 254 needs to be located is calculated together with the necessary position of the zooming lens support, and the control unit 209 decides which of the switches 212a to 212d of the electric current on/off switching member 212 should be turned on. When the switch which has been selected by the control unit 209 is turned on and electricity is supplied to a predetermined part from a to d of the shape-memory alloy 211, this part of the alloy to which electricity is supplied shrinks so as to cause the zooming flash support 254 to move rightward from its home position shown in FIG. 43 to prepare for the shooting. In this state, a shutter (not shown) opens and closes and completes exposure to the film, by which the shutter release action is ended. At the same time, electricity supply to the shape-memory alloy 211 is shut off and the zooming flash support 254 is returned to the home position by the force of the spring 231.

(Tenth Embodiment)

Figure 44:
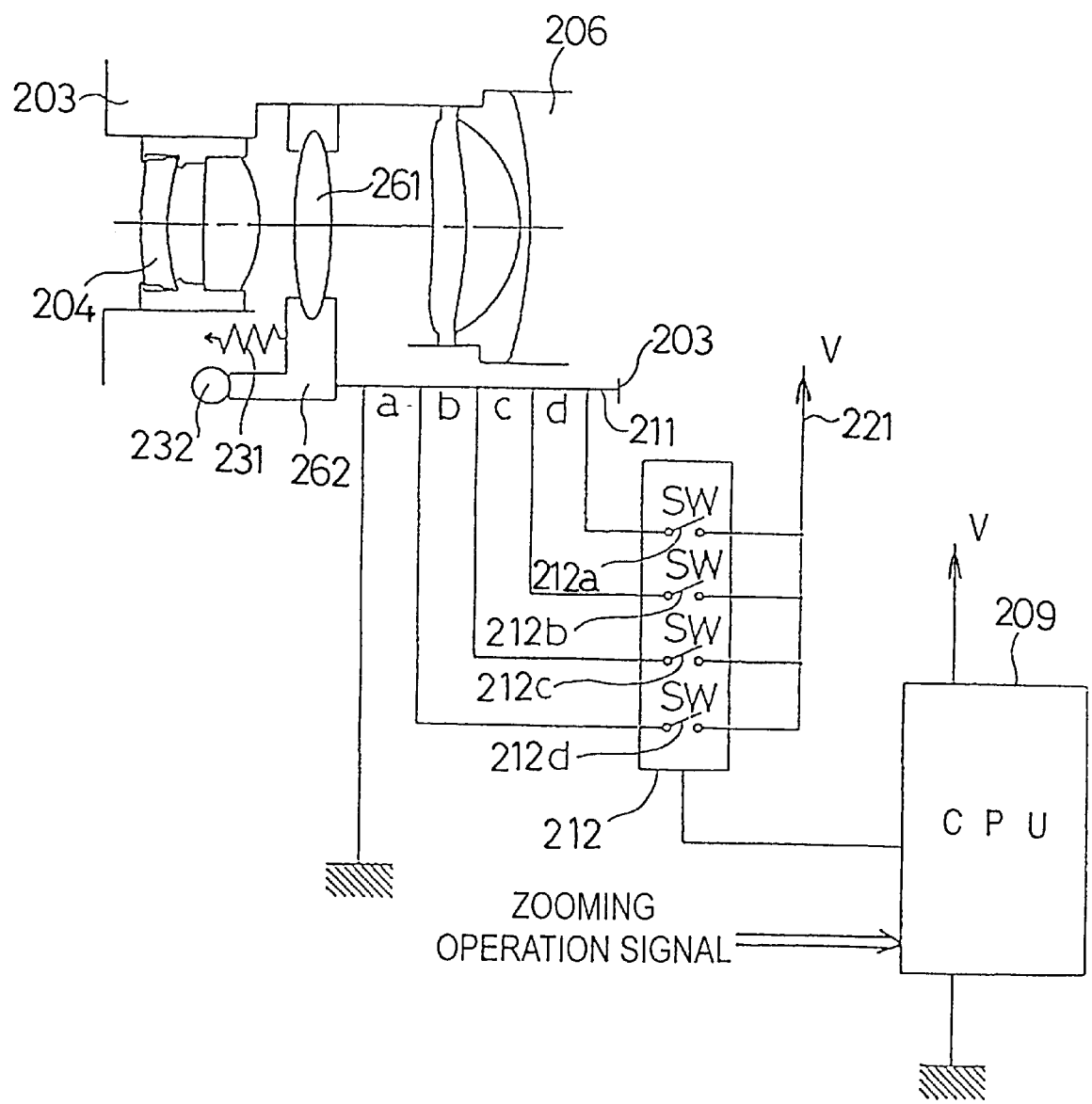
FIG. 44 is a diagram showing a zooming mechanism in a tenth embodiment of the present invention.

In a tenth embodiment shown in FIG. 44, the driven member is applied to zoom drive of a zooming lens system 261 of cameras. A position control driving mechanism which is substantially the same as that provided to the focusing lens support 205 in the seventh embodiment is acted to a zooming lens support 262 which supports the zooming lens system 261. More specifically, the zooming lens support 262 is connected to the shape-memory alloy 211 which is divided into four parts a to d for causing the support 262 from its home position to a position according to a distance to an object to be photographed which is detected by the measuring means, and further provided with the spring 231 for causing the zooming lens support 262 to return to the home position which is defined by the stopper 232. The control unit 209 decides which part of the shape-memory alloy 211 should be supplied with electricity, and controls electricity supply through the electric current on/off switching member 212.

By this configuration, when zooming operation is performed to the camera, a position where the zooming lens support 262 needs to be located is calculated, and the control unit 209 decides which of the switches 212a to 212d of the electric current on/off switching member 212 should be turned on. When the switch which has been selected by the control unit 209 is turned on and electricity is supplied to a predetermined part from a to d of the shape-memory alloy 211, this part of the alloy to which electricity is supplied shrinks so as to cause the zooming lens support 262 to move rightward from its home position shown in FIG. 44 to prepare for the shooting.

In this state, a shutter (not shown) opens and closes and completes exposure to the film, by which the shutter release action is ended. At the same time, electricity supply to the shape-memory alloy 211 is shut off, and the zooming lens support 262 is returned to its home position by the force of the spring 231.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A driving mechanism having a plurality of driven members, comprising:
   first driving power source;
   a second driving power source which is a shape-memory alloy member;
   a transmission changeover mechanism for selectively transmitting a drive force from the first driving power source to a specific one of the plurality of driven members, wherein the transmission changeover mechanism performs a transmission changeover action by utilizing a shape change of the second driving power source; and
   a controller for controlling electrical power to said first and second driving power sources, wherein said electrical power is supplied to the first driving power source only while said electrical power is removed from the second driving power source.

2. A driving mechanism according to claim 1, wherein a shape of the second driving power source is changeable as a result of the second driving power source being heated, and the transmission changeover mechanism performs the transmission changeover action as a result of a drive force from the first driving power source.

3. A driving mechanism according to claim 2, wherein the first driving power source is an electric motor.

4. A driving mechanism according to claim 3, wherein the second driving power source is adapted to be electrically heated and wherein the first driving power source and a current for heating the second driving power source are adapted to have a common battery as a common power source.

5. A driving mechanism according to claim 3, further comprising a sensor for detecting the shape change of the second driving power source, wherein the controller controls a timing for stopping heating of the second driving power source based on an amount of shape change of the second driving power source, said controller stopping heating of the second driving power source when the amount of shape change of the second driving power source has reached at least a predetermined value.

6. A driving mechanism according to claim 3, wherein the controller controls a timing for stopping heating of the second driving power source based on a predetermined period of time from a start of heating of the second driving power source.

7. A driving mechanism according to claim 6, wherein the controller varies the predetermined period of time based on ambient temperature.

8. A driving mechanism according to claim 1, wherein a shape of the second driving power source is changeable upon heating of the second driving power source, and
wherein the transmission changeover mechanism is adapted to perform the transmission changeover action based on a motive force provided by the shape change of the second driving power source.

9. A driving mechanism according to claim 8, wherein the first driving power source is an electric motor.

10. A driving mechanism according to claim 9, further comprising a sensor for detecting the shape change of the second driving power source, wherein for changing over the transmission, the controller controls an electricity supply to the first driving power source so that the electricity supply is started when an amount of shape change of the second driving power source has reached a predetermined value.

11. A driving mechanism according to claim 10, wherein the second driving power source is adapted to be electrically heated and wherein the first driving power source and a current for heating the second driving power source are adapted to have a common battery as a common power source.

12. A driving mechanism according to claim 2, wherein the first driving power source is an electric motor, and wherein the controller controls a start timing of the electricity supply to the first driving power source so as to start the electricity supply to the first driving power source at a time which is a predetermined period of time after a time of starting heating of the second driving power source.

13. A driving mechanism according to claim 12, further comprising a sensor for detecting a position of the transmission changeover mechanism, wherein the controller controls a timing for stopping heating of the second driving power source so that the heating is stopped after the sensor detects that the transmission changeover mechanism has reached at least a predetermined position.

14. A driving mechanism according to claim 12, wherein the controller varies the predetermined period of time based on ambient temperature.

15. A driving mechanism according to claim 1, wherein a shape of the second driving power source is linearly transformable as a result of the second driving power source being heated so as to affect said transmission changeover by the transmission changeover mechanism.

16. A driving mechanism according to claim 1, wherein a shape of the second driving power source is bendable as a result of the second driving source being heated so as to affect said transmission changeover by the transmission changeover mechanism.

17. A driving mechanism according to claim 1, wherein the first driving power source is a motor.

18. A driving mechanism, comprising:
a motor;
a first driven member;
a second driven member;
a transmission changeover mechanism for changing a first transmission which transmits a drive force from the motor to the first driven member into a second transmission which transmits the drive force from the motor to the second driven member, wherein the transmission changeover mechanism utilizes a change in shape of a shape-memory alloy member to affect the transmission changeover; and
a controller for controlling electrical power to the motor and to the shape-memory alloy member, wherein said electrical power is supplied to the motor only while said electrical power is removed from the shape-memory alloy member.

19. A driving mechanism according to claim 18, wherein the motor is an electric motor.

20. A driving mechanism according to claim 18, wherein the shape of the shape-memory alloy member is changeable as a result of being heated.

21. A driving mechanism according to claim 18, further comprising a sensor for detecting the change in the shape of the shape-memory alloy member, wherein the electrical power is removed from the shape-memory alloy member after the shape-memory alloy member is detected to have reached a predetermined shape.

22. A driving mechanism according to claim 18, wherein the electrical power is removed from the shape-memory alloy member after a predetermined period of time from a start of applying electrical power to the shape-memory alloy member.

23. A driving mechanism according to claim 22, wherein said predetermined period of time is based on ambient temperature.

24. A driving mechanism according to claim 18, wherein the electrical power is provided to the motor after a predetermined period of time from a start of applying electrical power to the shape-memory alloy member.

25. A driving mechanism according to claim 24, wherein said predetermined period of time is based on ambient temperature.

26. A method of driving a plurality of driven members comprising the steps of:
providing a driving power source;
providing a shape-memory alloy member;
providing a mechanism for selectively transmitting a drive force from the driving power source to a selected one of the plurality of driven members;
changing a shape of the shape-memory alloy member to effect a transmission changeover of said mechanism to a specific one of the plurality of driven members by providing electrical power to said shape-memory alloy member from an electrical power source;
removing electrical power from the shape-memory alloy member after said step of changing the shape of the shape-memory alloy member; and
providing electrical power to the driving power source from said electrical power source after said step of removing electrical power from the shape-memory alloy member.

27. A method of driving a plurality of driven members according to claim 26, wherein the driving power source is an electric motor.

28. A method of driving a plurality of driven members according to claim 26, wherein, in the step of changing the shape of the shape-memory alloy member, the shape of the shape-memory alloy member is changeable as a result of being heated by an electrical current from said electrical power source.

29. A method of driving a plurality of driven members according to claim 26, further comprising a step of detecting the change in the shape of the shape-memory alloy member, wherein the step of removing electrical power from the shape-memory alloy member is performed after the shape-memory alloy member is detected to have reached a predetermined shape.

30. A method of driving a plurality of driven members according to claim 26, wherein the step of removing electrical power from the shape-memory alloy member is performed after a predetermined period of time from beginning the step of changing the shape of the shape-memory alloy member.

31. A method of driving a plurality of driven members according to claim 30, wherein said predetermined period of time is based on ambient temperature.

32. A method of driving a plurality of driven members according to claim 26, wherein the step of providing electrical power to the driving power source is performed after a predetermined period of time from beginning the step of changing the shape of the shape-memory alloy member.

33. A method of driving a plurality of driven members according to claim 32, wherein said predetermined period of time is based on ambient temperature.

* * * * *